United States Patent
Ji et al.

(10) Patent No.: US 8,791,405 B2
(45) Date of Patent: Jul. 29, 2014

(54) OPTICAL WAVEGUIDE AND COUPLER APPARATUS AND METHOD OF MANUFACTURING THE SAME

(75) Inventors: Ho-chul Ji, Yongin-si (KR); Ki-nam Kim, Seoul (KR); Yong-woo Hyung, Yongin-si (KR); Kyoung-won Na, Seoul (KR); Kyoung-ho Ha, Seoul (KR); Yoon-dong Park, Yongin-si (KR); Dae-lok Bae, Seoul (KR); Jin-kwon Bok, Suwon-si (KR); Pil-kyu Kang, Anyang-si (KR); Sung-dong Suh, Seoul (KR); Seong-gu Kim, Pyeongtaek-si (KR); Dong-jae Shin, Seoul (KR); In-sung Joe, Seoul (KR)

(73) Assignee: Samsung Electronics Co., Ltd. (KR)

( * ) Notice: Subject to any disclaimer, the term of this patent is extended or adjusted under 35 U.S.C. 154(b) by 214 days.

(21) Appl. No.: 12/911,415

(22) Filed: Oct. 25, 2010

(65) Prior Publication Data

US 2011/0133063 A1 Jun. 9, 2011

(30) Foreign Application Priority Data

Dec. 3, 2009 (KR) .......................... 10-2009-0119107
Jan. 11, 2010 (KR) .......................... 10-2010-0002390
Jan. 11, 2010 (KR) .......................... 10-2010-0002391

(51) Int. Cl.
 *G01J 1/04* (2006.01)
(52) U.S. Cl.
 USPC ...................................... 250/227.11; 250/239
(58) Field of Classification Search
 USPC .......... 250/227.11, 216, 551, 239; 385/27, 31, 385/37, 49, 83, 131; 156/275.5, 244.17
 See application file for complete search history.

(56) References Cited

U.S. PATENT DOCUMENTS

| | | | |
|---|---|---|---|
| 4,582,390 A * | 4/1986 | Furuya | 385/131 |
| 5,319,484 A | 6/1994 | Jacob et al. | |
| 5,534,101 A * | 7/1996 | Keyworth et al. | 156/244.12 |
| 5,535,032 A | 7/1996 | Bottle | |
| 5,589,967 A | 12/1996 | Auffret | |
| 5,723,176 A | 3/1998 | Keyworth et al. | |

(Continued)

FOREIGN PATENT DOCUMENTS

| | | |
|---|---|---|
| JP | 2005-502127 | 1/2005 |
| KR | 10-2006-0111639 | 10/2006 |
| KR | 10-0794870 | 1/2008 |

OTHER PUBLICATIONS

"Serializer/Deserializer (SerDes) Solutions", National Semiconductor Website, http://www.national.com/analog/interface/serdes, accessed Jan. 12, 2010.

(Continued)

*Primary Examiner* — Que T Le
(74) *Attorney, Agent, or Firm* — Onello & Mello, LLP

(57) ABSTRACT

Optical waveguide and coupler devices and methods include a trench formed in a bulk semiconductor substrate, for example, a bulk silicon substrate. A bottom cladding layer is formed in the trench, and a core region is formed on the bottom cladding layer. A reflective element, such as a distributed Bragg reflector can be formed under the coupler device and/or the waveguide device. Because the optical devices are integrated in a bulk substrate, they can be readily integrated with other devices on a chip or die in accordance with silicon photonics technology. Specifically, for example, the optical devices can be integrated in a DRAM memory circuit chip die.

20 Claims, 48 Drawing Sheets

(56) References Cited

U.S. PATENT DOCUMENTS

| | | | |
|---|---|---|---|
| 5,892,608 | A | 4/1999 | Suzuki et al. |
| 6,141,127 | A | 10/2000 | Boivin et al. |
| 6,307,658 | B1 | 10/2001 | Chiaroni et al. |
| 6,396,801 | B1 | 5/2002 | Upton et al. |
| 6,570,688 | B2 | 5/2003 | LaGasse |
| 6,624,077 | B2 * | 9/2003 | White ............... 438/692 |
| 6,925,216 | B2 | 8/2005 | Vernon et al. |
| 7,095,959 | B2 | 8/2006 | LoCascio et al. |
| 7,174,105 | B2 | 2/2007 | Shahar |
| 7,474,827 | B2 | 1/2009 | Handelman |
| 2003/0043426 | A1 | 3/2003 | Baker et al. |
| 2004/0028089 | A1 | 2/2004 | Shake et al. |
| 2005/0147414 | A1 | 7/2005 | Morrow et al. |
| 2008/0222351 | A1 | 9/2008 | Verdiell et al. |
| 2009/0154871 | A1 | 6/2009 | Pyo et al. |
| 2012/0070111 | A1 | 3/2012 | Shin et al. |

OTHER PUBLICATIONS

"Serializer/Deserializer (SerDes) Solutions", National Semiconductor Website, http://www.national.com/analog/interface/serdes, accessed Oct. 20, 2010.

Ji, Ho-Chul, et al., "Optical Serializing/Deserializing Apparatus and Method and Method of Manufacturing Same", Specification, Drawings and Prosecution History of United States Patent Application filed Oct. 22, 2010.

Chinese Office Action dated Jan. 22, 2014 issued in corresponding Chinese Application No. 201010578730.1.

* cited by examiner

OPTICAL WAVEGUIDE AND COUPLER APPARATUS AND METHOD OF MANUFACTURING THE SAME

RELATED APPLICATIONS

This application relies for priority under 35 U.S.C. 119 on Korean Patent Application numbers 10-2009-0119107, 10-2010-0002390, and 10-2010-0002391, filed in the Korean Intellectual Property Office on Dec. 3, 2009, Jan. 11, 2010, and Jan. 11, 2010, respectively, the entire contents of which applications are incorporated herein by reference.

BACKGROUND

1. Field of the Invention

The inventive concept relates to optical devices and methods, and, more specifically, to optical waveguides and couplers used to implement optical communications, and methods of manufacturing the optical waveguides and couplers.

2. Description of the Related Art

Optical devices such as optical fibers, optical waveguides and optical couplers are used for high-speed, low-power communication in various devices and systems. Optical interconnections have been used to achieve large-capacity, high-speed and low-power communication in semiconductor memory devices, modules and systems. In such systems, optical fibers can be used to communicate between modules. The optical fibers can be coupled to the memory modules and devices by optical couplers, and the optical signals can be transmitted within modules and memory devices by optical waveguides.

Due to small size requirements, optical interconnections in memory modules, devices and systems typically require that optical waveguides and couplers be integrated into a semiconductor wafer. Conventionally, integrated optical waveguides and couplers are formed on silicon-on-insulator (SOI) substrates, which include a layer of insulating material, such as silicon oxide ($SiO_2$), formed over a single-crystal silicon substrate or wafer. The insulating material layer serves as a bottom cladding layer for the waveguide. A waveguide core material, such as amorphous silicon, having a higher index of refraction than that of the lower cladding layer, is formed on the lower cladding layer. An upper cladding layer, such as a layer of material having a lower index of refraction than that of the core layer, may be formed over and/or around the core layer to complete the waveguide cladding. The upper cladding layer may be another layer of silicon oxide, a layer of polysilicon, or another material having a lower refractive index than the core. For example, in some cases, air may serve as the upper cladding layer.

The SOI wafers in which conventional devices are formed are considerably more expensive than conventional semiconductor wafers. Also, because conventional integrated optical devices are formed in SOI substrates, full integration of the optical devices with other circuitry, such as memory device circuitry, cannot be realized, since such devices are not typically formed on SOI substrates. As a result, the optical devices are typically formed as separate devices on separate chips and/or in separate packages. This results in devices, modules and systems of larger size and complexity, and also of higher relative cost.

As the need for small-size, high-speed, low-power and cost-efficient memory devices, modules and systems continues to increase, there is an increasing need for optical interconnection devices and systems which can be manufactured less expensively, are smaller in size, can operate at high speed and with low power consumption and can be efficiently integrated with the other circuitry on a single chip or wafer.

SUMMARY

One feature of the inventive concept is that it provides an optical waveguide integrated into a bulk semiconductor substrate on which other circuitry is also integrated.

Another feature of the inventive concept is that it provides an optical coupler integrated into a bulk semiconductor substrate on which other circuitry is also integrated.

Another feature of the inventive concept is that it provides an integrated semiconductor device, such as a memory device, with integrated optical interconnection devices such as optical waveguides and optical couplers.

Another feature of the inventive concept is that it provides a module, such as a memory module, having an optical interconnection system with integrated optical interconnection devices, such as optical waveguides and optical couplers.

Another feature of the inventive concept is that it provides an optical interconnection system, such as an optical interconnection system for a memory system, in which memory devices on memory modules include integrated optical interconnection devices, such as optical waveguides and optical couplers.

Another feature of the inventive concept is that it provides methods of manufacturing memory devices, memory modules, memory systems and interconnection systems in which memory devices on memory modules include integrated optical interconnection devices, such as optical waveguides and optical couplers.

According to one aspect, the inventive concept is directed to an optical device comprising a trench disposed in a semiconductor substrate, a first cladding layer disposed in the trench, and at least one core region disposed above the first cladding layer.

In one embodiment, the semiconductor substrate comprises bulk single crystal silicon and the trench includes sidewalls that are substantially perpendicular to a surface of the semiconductor substrate.

In one embodiment, the optical device includes at least one waveguide structure and at least one optical coupler structure, a first sidewall of the core region is a distance d1 from a first sidewall of the trench, and a second sidewall of the core region is a distance d2 from a second sidewall of the trench. In one embodiment, distances d1 and d2 are greater than about 0.27 μm, and a leakage loss in the waveguide is less than 1 dB/mm. In one embodiment, a top surface of the first cladding layer is lower than a top surface of the semiconductor substrate, and distances d1 and d2 are greater than about 0.35 μm, and a leakage loss in the waveguide is less than 1 dB/mm.

In one embodiment, the waveguide structure is coupled to the optical coupler structure, the optical coupler structure comprising at least one of a grating disposed in a portion of a top surface of the first cladding region, a vertical grating coupler, an optical beam direction changing device, an optical transceiver, and an optical-to-electrical conversion device; and the optical coupler structure includes a top surface disposed substantially coplanar with a top surface of the waveguide structure.

In one embodiment, the optical device further includes a reflective element at least one of disposed adjacent to the first cladding layer and disposed in the first cladding layer, and comprising at least one of a metallic reflector, a Bragg reflector, a distributed Bragg reflector, and a structure including at least a first and a second material layer, each contacting a third material layer having a different index of refraction from the first and second material layers.

In one embodiment, the optical device further includes a second cladding layer disposed to cover at least a portion of a top surface and sidewalls of the core region.

In one embodiment, the core region comprises at least one of defective single-crystal silicon, single-crystal silicon, large-grain polycrystalline silicon, and crystallized amorphous silicon.

According to another aspect, the inventive concept is directed to an optical device, comprising: a trench disposed in a bulk single-crystal silicon, the trench sidewalls being one of substantially perpendicular to a surface of the silicon substrate, and sloping outwardly to have a greater trench width at the surface than at a bottom of the trench; a first cladding layer disposed in the trench having a top surface that is one of substantially coplanar with, below, and above the surface of the silicon substrate; a core region comprising at least one of defective single-crystal silicon, single-crystal silicon, large-grain polycrystalline silicon, and crystallized amorphous silicon disposed above the first cladding layer, wherein the core region is disposed to provide at least one waveguide coupled to at least one vertical optical coupler having a top surface substantially coplanar with a top surface of the waveguide; and a second cladding layer disposed to cover at least a portion of a top surface and sidewalls of the core region.

According to another aspect, the inventive concept is directed to a method of manufacturing an optical device, the method comprising: forming a trench in a silicon substrate; forming a first cladding layer substantially inside the trench; and forming a core region on the first cladding layer.

In one embodiment, the first cladding layer is formed of a dielectric material having a general formula of $Si_XN_YO_Z$; a top surface of the first cladding layer is one of substantially coplanar with and lower than a top surface of the silicon substrate; and the silicon substrate comprises bulk single crystal silicon.

In one embodiment, the method further comprises forming at least one waveguide and at least one optical coupler using the core region.

In one embodiment, the method further comprises forming a reflective layer disposed in one of below, above and within the first cladding layer, and disposed adjacent to at least a portion of at least one of the waveguide, the optical coupler, and a region coupling the waveguide to the optical coupler.

In one embodiment, the method further comprises forming a second cladding layer covering at least a portion of a top surface and a side surface of the core region.

In one embodiment, forming the core region further comprises forming a layer of at least one of defective single-crystal silicon, single-crystal silicon, large grain polycrystalline silicon, crystallized polycrystalline silicon and crystallized amorphous silicon.

In one embodiment, the method further comprises forming the trench with substantially vertical sidewalls substantially perpendicular to the top surface of the silicon substrate.

In one embodiment, the method further comprises forming the optical coupler to have a top surface coplanar with a top surface of the waveguide.

In one embodiment, the method further comprises forming at least one of an optical grating, a vertical grating coupler, an optical-to-electrical converter, an electrical-to-optical converter, and an optical transceiver.

In one embodiment, forming the reflective layer comprises forming at least one of a metallic reflective layer, a Bragg reflector, a distributed Bragg reflector, and a structure including at least a first material layer and a second material layer, each of the first and second material layers formed to directly contact a third material layer, the third material layer having a different index of refraction from the first and second material layers.

According to another aspect, the present inventive concept is directed to an optical waveguide. The optical waveguide includes a trench formed in a silicon substrate, a first cladding layer formed in the trench, and a core region formed on the first cladding layer.

In one embodiment, the silicon substrate is a bulk silicon substrate.

In one embodiment, a first sidewall of the core region is a distance d1 from a first sidewall of the trench, a second sidewall of the core region is a distance d2 from a second sidewall of the trench, and the core region has a width w, the width w being a distance between the first sidewall and the second sidewall of the core region, the distances d1 and d2 being selected based on a desired leakage loss in the waveguide due to the substrate. In one embodiment, if both of the distances d1 and d2 are at least 0.27 µm, leakage loss in the waveguide due to the substrate is not more than 1 dB/mm.

In one embodiment, a first sidewall of the core region is a distance d3 from a first sidewall of a second core region adjacent to the core region, and a second sidewall of the core region is a distance d4 from a first sidewall of a third core region adjacent to the core region, the distances d3 and d4 being selected based on a desired leakage loss in the waveguide due to the adjacent core regions. In one embodiment, if the smaller of the distances d3 and d4 is at least 0.35 µm, leakage loss in the waveguide due to adjacent core regions is not more than 1 dB/mm.

In one embodiment, a top surface of the first cladding layer is even with a top surface of the silicon substrate. In one embodiment, a top surface of the first cladding layer is lower than a top surface of the silicon substrate.

In one embodiment, the optical waveguide is coupled to an optical coupler. In one embodiment, the optical coupler is a vertical grating coupler. In one embodiment, at least a portion of a reflective element is disposed in a region in which at least one of the optical coupler and the optical waveguide is formed. In one embodiment, the reflective element is located in the first cladding layer.

In one embodiment, the optical waveguide further includes a second cladding layer covering a top surface and sidewalls of the core region.

In one embodiment, the core region comprises defective single-crystalline silicon formed by crystallizing one of polycrystalline silicon and amorphous silicon.

In one embodiment, the core region has an index of refraction greater than that of the first cladding layer.

According to another aspect, the inventive concept is directed to an optical coupler. The optical coupler includes a trench formed in a silicon substrate, a first cladding layer formed in the trench; a core region formed on the first cladding layer, and a grating formed in a surface of the core region.

In one embodiment, the silicon substrate is a bulk silicon substrate.

In one embodiment, a top surface of the first cladding layer is even with a top surface of the silicon substrate. In one embodiment, a top surface of the first cladding layer is lower than a top surface of the silicon substrate.

In one embodiment, the optical coupler is coupled to an optical waveguide. In one embodiment, at least a portion of a reflective element is disposed in a region in which at least one of the optical coupler and the optical waveguide is formed. In one embodiment, the reflective element is located in the first cladding layer.

In one embodiment, the optical coupler further includes a second cladding layer covering a top surface and sidewalls of the core region.

In one embodiment, the core region comprises defective single-crystalline silicon formed by crystallizing one of polycrystalline silicon and amorphous silicon.

In one embodiment, the core region has an index of refraction greater than that of the first cladding layer.

According to another aspect, the inventive concept is directed to an optical device. The optical device includes an optical waveguide formed in a silicon substrate and an optical coupler coupled to the optical waveguide. The optical waveguide includes a trench formed in a silicon substrate, a first cladding layer formed in the trench, and a core region formed on the bottom cladding layer. The optical coupler is formed in a region of the optical waveguide.

In one embodiment, a top surface of the first cladding layer is even with a top surface of the silicon substrate.

In one embodiment, a top surface of the first cladding layer is lower than a top surface of the silicon substrate. In one embodiment, the optical coupler comprises a grating formed in the core region.

In one embodiment, the optical coupler is a vertical grating coupler.

In one embodiment, at least a portion of a reflective element is disposed in a region in which at least one of the optical coupler and the optical waveguide is formed.

In one embodiment, the reflective element is located in the first cladding layer.

In one embodiment, the optical device further includes a second cladding layer covering a top surface and sidewalls of the core region.

In one embodiment, the core region comprises defective single-crystalline silicon formed by crystallizing one of polycrystalline silicon and amorphous silicon.

In one embodiment, the core region has an index of refraction greater than that of the first cladding layer.

According to another aspect, the inventive concept is directed to an optical device. The optical device includes a trench formed in a silicon substrate, a first cladding layer formed in the trench, a core region formed on the first cladding layer, and a grating formed in a surface of the core region.

In one embodiment, the optical device comprises an optical waveguide which includes at least a portion of the first cladding layer and the core region.

In one embodiment, the optical device comprises an optical coupler which includes at least a portion of the first cladding layer and the core region. In one embodiment, the optical coupler comprises the grating formed in the core region. In one embodiment, the optical device comprises an optical waveguide which includes at least another portion of the first cladding layer and the core region, the optical waveguide being coupled to the optical coupler.

In one embodiment, the optical device further includes a conversion unit for converting between optical and electrical signals.

In one embodiment, the optical device further includes a transceiver for transmitting and receiving optical signals.

In one embodiment, a top surface of the first cladding layer is even with a top surface of the silicon substrate. In one embodiment, a top surface of the first cladding layer is lower than a top surface of the silicon substrate.

In one embodiment, a reflective element is located in the first cladding layer.

In one embodiment, the optical device further includes a second cladding layer covering a top surface and sidewalls of the core region.

In one embodiment, the core region comprises defective single-crystalline silicon formed by crystallizing one of polycrystalline silicon and amorphous silicon.

In one embodiment, the core region has an index of refraction greater than that of the first cladding layer.

According to another aspect, the inventive concept is directed to a method of manufacturing an optical waveguide. According to the method, a trench is formed in a silicon substrate. A first cladding layer is formed in the trench. A core region is formed on the first cladding layer.

In one embodiment, the silicon substrate is a bulk silicon substrate.

In one embodiment, a top surface of the first cladding layer is even with a top surface of the silicon substrate. In one embodiment, a top surface of the first cladding layer is lower than a top surface of the silicon substrate.

In one embodiment, the optical waveguide is coupled to an optical coupler.

In one embodiment, at least a portion of a reflective element is disposed in a region in which at least one of the optical coupler and the optical waveguide is formed.

In one embodiment, the reflective element is located in the first cladding layer.

In one embodiment, the method further includes forming a second cladding layer covering a top surface and sidewalls of the core region.

In one embodiment, the core region comprises defective single-crystalline silicon formed by crystallizing one of polycrystalline silicon and amorphous silicon.

According to another aspect, the inventive concept is directed to a method of manufacturing an optical coupler. According to the method, a trench is formed in a silicon substrate. A first cladding layer is formed in the trench. A core region is formed on the first cladding layer. A grating is formed in a surface of the core region.

In one embodiment, the silicon substrate is a bulk silicon substrate.

In one embodiment, a top surface of the first cladding layer is even with a top surface of the silicon substrate. In one embodiment, a top surface of the first cladding layer is lower than a top surface of the silicon substrate.

In one embodiment, the optical coupler is coupled to an optical waveguide. In one embodiment, at least a portion of a reflective element is formed in a region in which at least one of the optical coupler and the optical waveguide is formed. In one embodiment, the reflective element is formed in the first cladding layer.

In one embodiment, the method further includes forming a second cladding layer covering a top surface and sidewalls of the core region.

In one embodiment, the core region comprises defective single-crystalline silicon formed by crystallizing one of polycrystalline silicon and amorphous silicon.

According to another aspect, the inventive concept is directed to a method of manufacturing an optical device. The method includes forming an optical waveguide in a silicon substrate and coupling an optical coupler to the optical waveguide. Forming the optical waveguide includes forming a trench in a silicon substrate, forming a first cladding layer in the trench, and forming a core region on the bottom cladding layer. The optical coupler is formed in a region of the optical waveguide.

In one embodiment, a top surface of the first cladding layer is even with a top surface of the silicon substrate. In one embodiment, a top surface of the first cladding layer is lower than a top surface of the silicon substrate.

In one embodiment, the optical coupler comprises a grating formed in the core region.

In one embodiment, at least a portion of a reflective element is disposed in a region in which at least one of the optical coupler and the optical waveguide is formed.

In one embodiment, the reflective element is formed in the first cladding layer.

In one embodiment, the method further includes forming a second cladding layer covering a top surface and sidewalls of the core region.

In one embodiment, the core region comprises defective single-crystalline silicon formed by crystallizing one of polycrystalline silicon and amorphous silicon.

According to another aspect, the inventive concept is directed to a method of forming an optical device. The method includes forming a trench in a silicon substrate, forming a first cladding layer in the trench, forming a core region formed on the first cladding layer, and forming a grating in a surface of the core region.

In one embodiment, the optical device comprises an optical waveguide which includes at least a portion of the first cladding layer and the core region.

In one embodiment, the optical device comprises an optical coupler which includes at least a portion of the first cladding layer and the core region. In one embodiment, the optical coupler comprises a grating formed in the core region.

In one embodiment, the optical device comprises an optical waveguide which includes at least another portion of the first cladding layer and the core region, the optical waveguide being coupled to the optical coupler.

In one embodiment, the method further includes forming a conversion unit for converting between optical and electrical signals.

In one embodiment, the method further includes forming a transceiver for transmitting and receiving optical signals.

In one embodiment, a top surface of the first cladding layer is even with a top surface of the silicon substrate. In one embodiment, a top surface of the first cladding layer is lower than a top surface of the silicon substrate.

In one embodiment, a reflective element is located in the first cladding layer.

In one embodiment, the method further comprises forming a second cladding layer covering a top surface and sidewalls of the core region.

In one embodiment, the core region comprises defective single-crystalline silicon formed by crystallizing one of polycrystalline silicon and amorphous silicon.

BRIEF DESCRIPTION OF THE DRAWINGS

The foregoing and other features and advantages of the inventive concept will be apparent from the more particular description of preferred embodiments of the inventive concept, as illustrated in the accompanying drawings in which like reference characters refer to the same parts throughout the different views. The drawings are not necessarily to scale, emphasis instead being placed upon illustrating the principles of the inventive concept. In the drawings, the thickness of layers and regions are exaggerated for clarity.

DETAILED DESCRIPTION

Figure 1A:
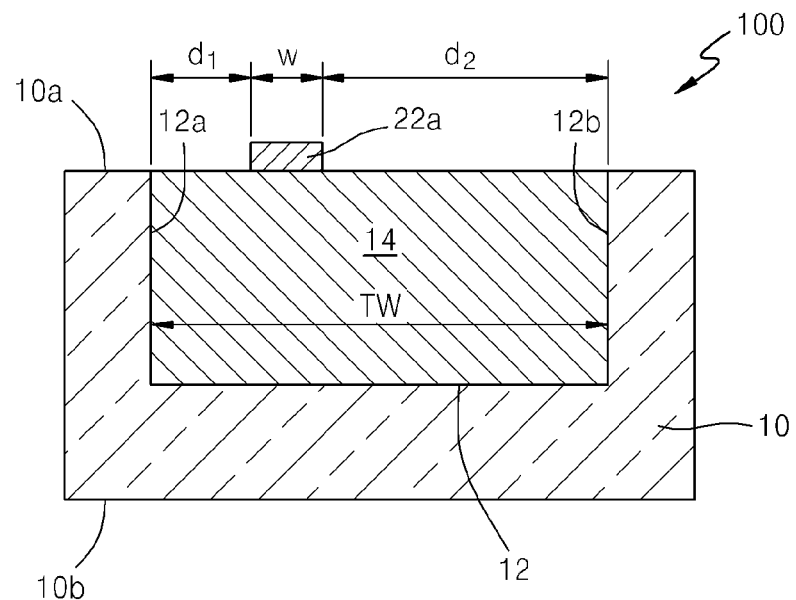
FIG. 1A is a schematic cross-sectional diagram of an optical waveguide structure according to one exemplary embodiment of the inventive concept.

Various exemplary embodiments will be described more fully hereinafter with reference to the accompanying drawings, in which some exemplary embodiments are shown. The present inventive concept may, however, be embodied in many different for is and should not be construed as limited to the exemplary embodiments set forth herein.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

According to the inventive concept, various optical devices, specifically, optical waveguide and optical coupler devices, are provided. Also provided are circuit interconnection systems which use the optical devices of the inventive concept. Specifically, some exemplary embodiments provide optical interconnection systems used with semiconductor memory circuits, e.g., DRAM circuits. The inventive concept also provides modules, e.g., memory modules, DRAM modules, DIMM modules, and DRAM DIMM modules, which use the optical devices and interconnection systems of the inventive concept. Also provided are computing and/or processing systems using the optical devices, interconnection systems and/or modules of the inventive concept.

Hereinafter, various exemplary embodiments of the inventive concept will be described in detail with reference to the accompanying drawings.

FIG. 1A is a schematic cross-sectional diagram of an optical waveguide structure 100 according to one exemplary embodiment of the inventive concept. The optical waveguide structure 100 is formed on or in a bulk semiconductor wafer such as a bulk silicon wafer or substrate 10. The bulk silicon substrate 10 includes a top or front surface 10a and a bottom or back surface 10b. A trench region 12 is formed in the substrate 10 through the front surface 10a. The trench region 12 has sidewalls 12a and 12b and has a trench width TW.

A bottom cladding layer 14 is formed in the trench 12. The bottom cladding layer 14 is made of an insulating material such as silicon oxide, silicon nitride or silicon oxynitride. In this embodiment, the top surface of the bottom cladding layer 14 is even or level with the top surface 10a of the substrate 10. This is accomplished by, for example, chemical mechanical polishing (CMP) after formation of the bottom cladding layer material in the trench 12.

A core region 22a is formed on the top surface of the bottom cladding layer 14. The core region 22a is made of a material having a higher index of refraction than that of the bottom cladding layer 14. For example, according to exemplary embodiments, the core region 22a is formed of defective single-crystalline silicon. That is, the core region 22a is formed of single-crystalline silicon with a lower crystallinity, i.e., higher percentage of crystal defects, than that of the single crystalline bulk silicon substrate. The core region 22a serves as the core of the optical waveguide 100. Light propagates through the core region 22a and is confined to the core region 22a by the refractive index contrast between the core region 22a and the bottom cladding layer 14. That is, the lower index of refraction of the bottom cladding layer 14 confines the propagating light to the interior of the core region 22a, having a higher index of refraction than the bottom cladding layer.

Although not shown in FIG. 1A, the waveguide structure 100 may also include a top or upper cladding layer formed over the top and side surfaces of the core region 22a and over the bottom cladding layer 14. Like the bottom cladding layer 14, the upper cladding layer may be foamed of an insulating material such as silicon oxide, silicon nitride or silicon oxynitride. Alternatively, the upper cladding layer may be omitted. In this case, air may serve as the upper cladding layer of the optical waveguide. The upper cladding layer serves the same purpose as the bottom cladding layer 14. Specifically, the upper cladding layer also serves to confine propagating light in the core region 22a because the index of refraction of the upper cladding layer is lower than that of the core region 22a.

Figure 1B:
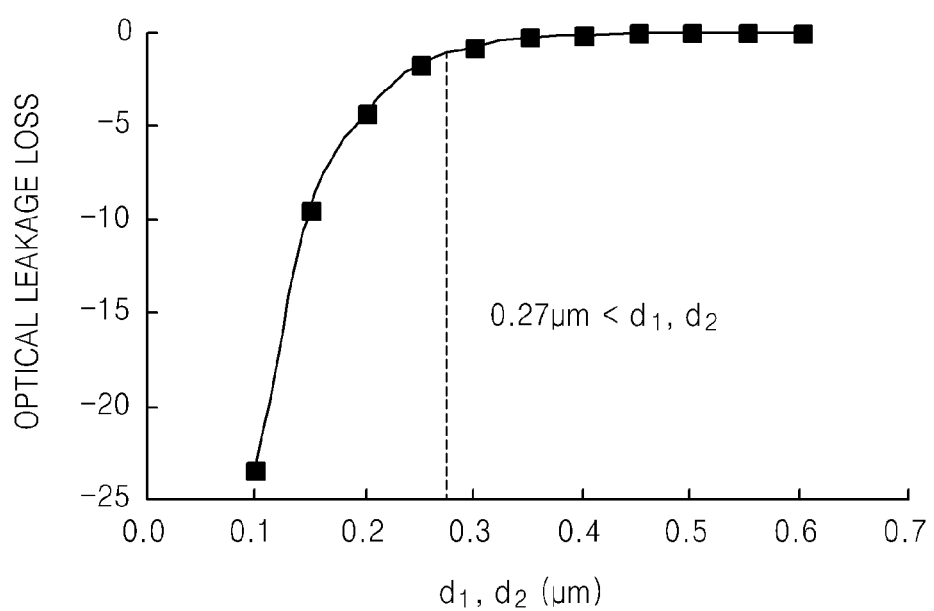
FIG. 1B is a graph of the optical leakage loss through the substrate of the structure of FIG. 1A as a function of distances d1 and d2.

The core region 22a has a width w. The left sidewall of the core region 22a is located a distance d1 from the left sidewall 12a of the trench 12, and the right sidewall of the core region 22a is located a distance d2 from a right sidewall 12b of the trench 12. The distances d1 and d2 are selected according to the inventive concept to reduce or minimize optical leakage losses in the optical waveguide 100 caused by propagation of light through the substrate via the sidewalls 12a and 12b of the trench 12. FIG. 1B is a graph of the optical leakage loss through the substrate 12 of the structure of FIG. 1A as a function of the distances d1 and d2. As illustrated in the graph of FIG. 1B, in some embodiments, when the distances d1 and d2 are greater than or equal to 0.27 μm, the optical leakage loss into the substrate is less than or equal to 1.0 dB/mm. To achieve this acceptable optical leakage loss into the substrate, the distances d1 and d2 can be expressed by the relation: $0.27\ \mu m \leq d1, d2 \leq TW-w-0.27\ \mu m$. In many case, larger optical leakage losses are tolerable. According to the inventive concept, if the distances d1 and d2 are greater than or equal to 0.1 μm, then the optical leakage loss into the substrate is less than or equal to 24 dB/mm. To achieve this acceptable optical leakage loss into the substrate, the distances d1 and d2 can be expressed by the relation: $0.1\ \mu m \leq d1, d2 \leq TW-w-0.1\ \mu m$.

Figure 2:
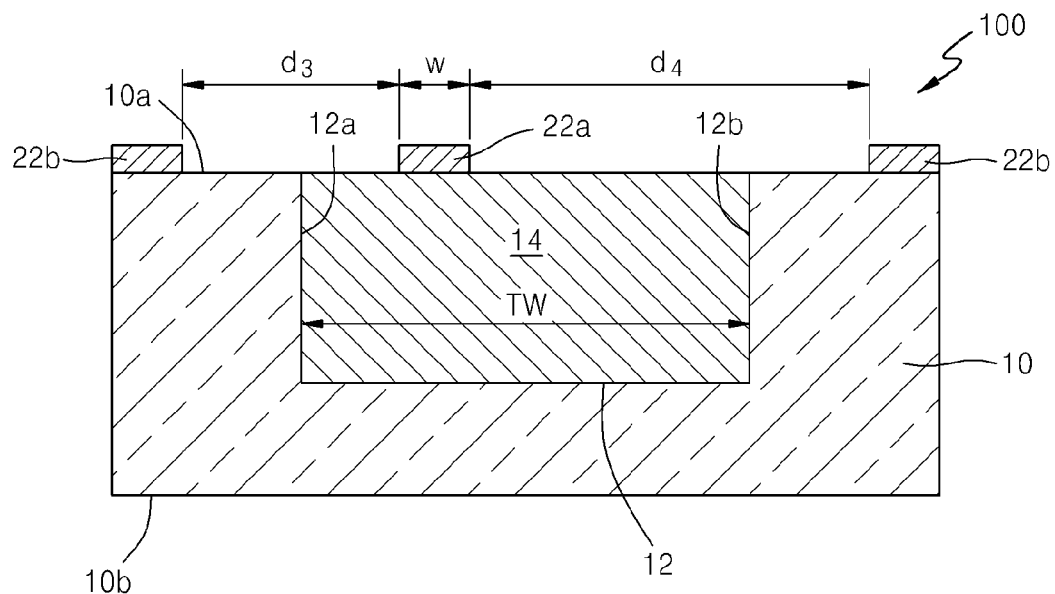
FIG. 2 is a schematic cross-sectional view of a portion of a device which includes the optical waveguide structure of FIG. 1A.

FIG. 2 is a schematic cross-sectional view of a portion of a device which includes the optical waveguide structure 100 of FIG. 1A. Description of features and elements of the structure of FIG. 2 that are the same as those of the structure of FIG. 1A will not be repeated. The portion of the device of FIG. 2 includes, in addition to the optical waveguide structure 100, additional "dummy" core regions 22b, which are formed simultaneously with the core region 22a of FIG. 1A. It should be noted that the dummy core regions 22b can be core regions of optical waveguide structures formed adjacent to the optical waveguide structure 100. The left sidewall of the core region 22a is a distance d3 from a right sidewall of the left dummy core region 22b, and the right sidewall of the core region 22a is a distance d4 from a left sidewall of the right dummy core region 22b. The distances d3 and d4 are selected according to the inventive concept to reduce or minimize optical leakage losses in the optical waveguide 100 due to adjacent core regions. According to the inventive concept, in some embodiments, when the distances d3 and d4 are greater than or equal to 0.35 μm, the optical leakage loss due to adjacent core regions is less than or equal to 1 dB/mm. Than is, $d3, d4 \geq 0.35$ μm, for an optical leakage loss of less than or equal to 1 dB/mm.

Figure 3A:
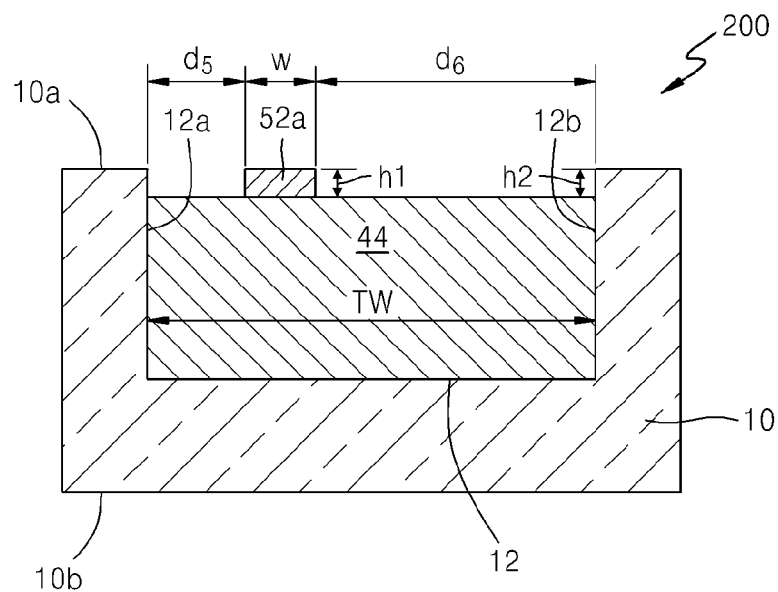
FIG. 3A is a schematic cross-sectional diagram of an optical waveguide structure according to another exemplary embodiment of the inventive concept.

FIG. 3A is a schematic cross-sectional diagram of an optical waveguide structure 200 according to another exemplary embodiment of the inventive concept. Description of features and elements of the structure of FIG. 3A that are the same as those of the structure of FIG. 1A may not be repeated. The optical waveguide structure 200 is formed on or in a bulk semiconductor wafer such as a bulk silicon wafer or substrate 10. The bulk silicon substrate 10 includes a top or front surface 10a and a bottom or back surface 10b. A trench region 12 is formed in the substrate 10 through the front surface 10a. The trench region 12 has sidewalls 12a and 12b and has a trench width TW.

A bottom cladding layer 44 is formed in the trench 12. The bottom cladding layer 44 is made of an insulating material such as silicon oxide, silicon nitride or silicon oxynitride. In this embodiment, the top surface of the bottom cladding layer 44 is lower than the top surface 10a of the substrate 10.

A core region 52a is formed on the top surface of the bottom cladding layer 44. The core region 52a is made of a material having a higher index of refraction than that of the bottom cladding layer 44. For example, according to exemplary embodiments, the core region 52a is formed of defective single-crystalline silicon. That is, the core region 52a is formed of single-crystalline silicon with a lower crystallinity, i.e., higher percentage of crystal defects, than that of the single crystalline bulk silicon substrate 10. The core region 52a serves as the core of the optical waveguide 100. Light propagates through the core region 52a and is confined to the core region 52a by the refractive index contrast between the core region 52a and the bottom cladding layer 44. That is, the lower index of refraction of the bottom cladding layer 44 confines the propagating light to the interior of the core region 52a, having a higher index of refraction than the bottom cladding layer.

Although not shown in FIG. 3A, the waveguide structure 200 may also include a top or upper cladding layer formed over the top and side surfaces of the core region 52a and over the bottom cladding layer 44. Like the bottom cladding layer 44, the upper cladding layer may be formed of an insulating material such as silicon oxide, silicon nitride or silicon oxynitride. Alternatively, the upper cladding layer may be omitted. In this case, air may serve as the upper cladding layer of the optical waveguide. The upper cladding layer serves the same purpose as the bottom cladding layer 44. Specifically, the upper cladding layer also serves to confine propagating light in the core region 52a because the index of refraction of the upper cladding layer is lower than that of the core region 52a.

Figure 3B:
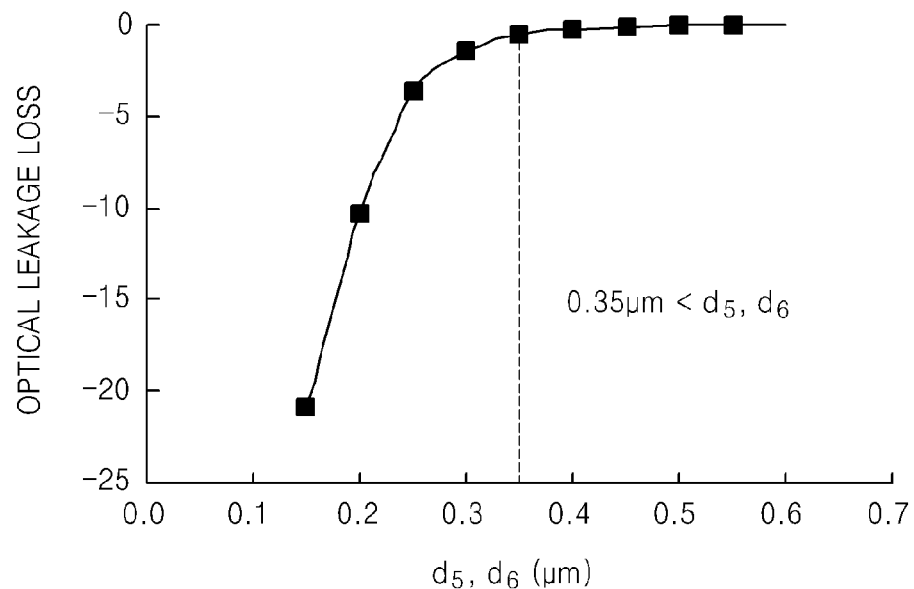
FIG. 3B is a graph of the optical leakage loss through the substrate of the structure of FIG. 3A as a function of distances d5 and d6.

The core region 52a has a width w. The left sidewall of the core region 52a is located a distance d5 from the left sidewall 12a of the trench 12, and the right sidewall of the core region 52a is located a distance d6 from a right sidewall 12b of the trench 12. The distances d5 and d6 are selected according to the inventive concept to reduce or minimize optical leakage losses in the optical waveguide 200 caused by propagation of light through the substrate via the sidewalls 12a and 12b of the trench 12. FIG. 3B is a graph of the optical leakage loss through the substrate 12 of the structure of FIG. 3A as a function of the distances d5 and d6. As illustrated in the graph of FIG. 3B, in some embodiments, when the distances d5 and d6 are greater than or equal to 0.35 μm, the optical leakage loss into the substrate is less than or equal to 1.0 dB/mm. To achieve this acceptable optical leakage loss into the substrate, the distances d5 and d6 can be expressed by the relation: $0.35\ \mu m \le d5, d6 \le TW-w-0.35\ \mu m$. In many cases, larger optical leakage losses are tolerable. According to the inventive concept, if the distances d5 and d6 are greater than or equal to 0.15 μm, then the optical leakage loss into the substrate is less than or equal to 22 dB/mm. To achieve this acceptable optical leakage loss into the substrate, the distances d5 and d6 can be expressed by the relation: $0.15\ \mu m \le d5, d6 \le TW-w-0.15\ \mu m$.

A difference between the embodiments of optical waveguide structures 100 and 200 illustrated in FIGS. 1A and 3A, respectively, is that, in the embodiment of FIG. 1A, the top surface of the bottom cladding layer 14 is even with the top surface of the substrate 10, and, in the embodiment of FIG. 3A, the top surface of the bottom cladding layer 44 is lower than the top surface of the substrate 10. That is, in the embodiment of FIG. 3A, the core region is recessed or buried in the trench. In both embodiments, because the optical waveguide is fabricated in a bulk silicon substrate, the optical waveguide is applicable to silicon photonics and can be readily integrated with other circuitry, such as CMOS circuitry or semiconductor memory circuitry, on a chip or wafer. In some such applications, it is desirable that the waveguide core region be formed above the top of the trench (FIG. 1A) for ease of integration with the other circuitry, and in some such applications, it is desirable that the core region be formed within the trench (FIG. 3A) for ease of integration with the other circuitry. The optical waveguide structures of the inventive concept are applicable to all such applications.

It is also noted that in the waveguide structure 200 of FIG. 3A, the core region 52a is of a particular height h1, and the distance between the top of the bottom cladding layer 44 and the top surface of the substrate is a particular height h2. Although the embodiment of FIG. 3A illustrates h1 and h2 being equal, it is not necessary that this be the case. For example, h1 can be greater than h2, or h2 can be greater than h1. The relative heights h1 and h2 are selected based on the desirable ease of integration of the optical waveguide structure 200 with other circuitry on the same chip or wafer.

Figure 4A:
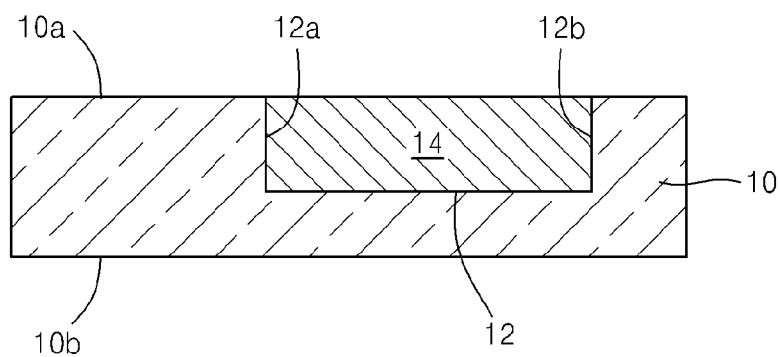
FIGS. 4A through 4G are schematic cross-sectional views illustrating a method of manufacturing the optical waveguide structure of FIG. 1A, according to one exemplary embodiment of the inventive concept.

FIGS. 4A through 4G are schematic cross-sectional views illustrating a method of manufacturing the optical waveguide structure 100 of FIG. 1A, according to one exemplary embodiment of the inventive concept. Referring to FIG. 4A, a substrate 10, such as a bulk semiconductor substrate, e.g., a bulk silicon substrate, is provided. The substrate 10 includes a top or front surface 10a and a bottom or back surface 10b. The substrate 10 is selectively etched to form a trench 12 having sidewalls 12a and 12b in the substrate 10. The depth of the trench 12 is determined based on a desired thickness of a bottom cladding layer to be formed in the trench 12. Next, the bottom cladding layer 14 is formed in the trench 12. The bottom cladding layer 14 is formed of an insulating material having a lower index of refraction than a core region of the optical waveguide to be formed subsequently on the bottom cladding layer 14. The material of the bottom cladding layer 14 can be, for example, silicon oxide, silicon nitride or silicon oxynitride. In this embodiment, the top surface of the bottom cladding layer is even or level with the top surface 10a of the substrate 10. This can be accomplished by using a polishing procedure, such as chemical mechanical polishing (CMP), on the bottom cladding layer material after it is formed to fill the trench 12.

Figure 4B:
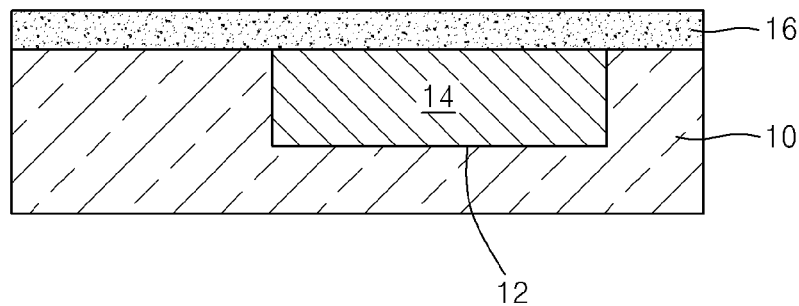
Figure 4C:
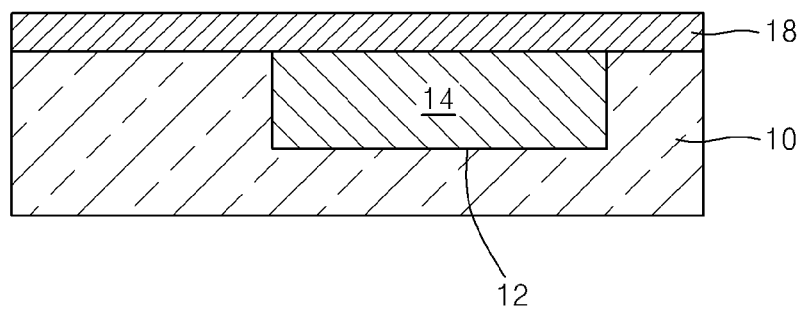

Referring to FIG. 4B, next, a layer 16 of amorphous semiconductor material, e.g., amorphous silicon, is formed over the bottom cladding layer 14 and the top surface 10a of the substrate 10. The amorphous silicon layer 16 can be formed by, for example, chemical vapor deposition (CVD), atomic layer deposition (ALD) or other similar process. Next, referring to FIG. 4C, the layer 16 of amorphous silicon is at least partially crystallized to transform the layer 16 of amorphous silicon into a layer 18 of defective single-crystalline silicon. That is, the layer 18 is formed of single-crystalline silicon with a lower crystallinity, i.e., higher percentage of crystal defects, than that of the single crystalline bulk silicon substrate 10. The crystallization of the amorphous silicon layer 16 can be performed by, for example, one of laser epitaxial growth (LEG), solid phase epitaxy (SPE), epitaxial lateral overgrowth (ELO), selective epitaxial growth (SEG), solid phase crystallization (SPC), or other similar method.

Figure 4D:
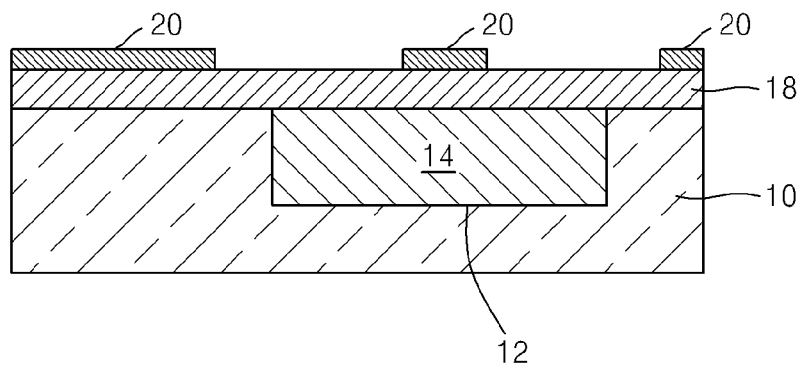
Figure 4E:
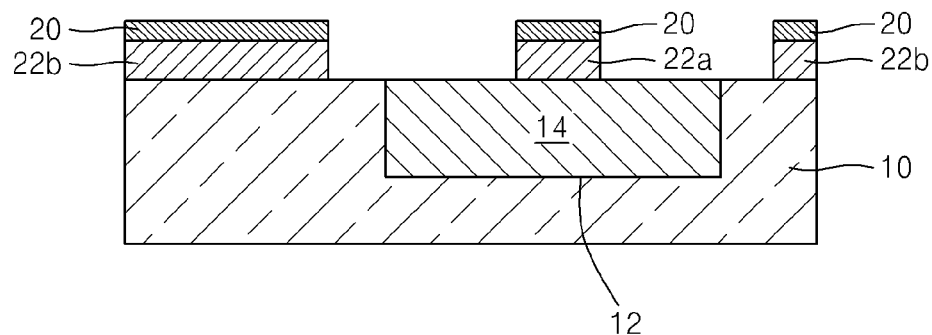

Next, referring to FIG. 4D, a mask pattern 20 is formed on the layer 18 of defective single-crystalline silicon to define the core region of the optical waveguide. The mask pattern 20 can be formed of, for example, photoresist and/or a combination of photoresist and a hard mask material. Next, referring to FIG. 4E, the structure is selectively etched using the mask pattern 20 as an etching mask, to remove unmasked portions of the layer 18 to form the core region 22a of the optical waveguide structure 100. Also formed simultaneously are additional regions 22b of the same material as that of the core region 22a. These other regions 22b can be core regions of other adjacent optical waveguide structures or other such regions.

Figure 4F:
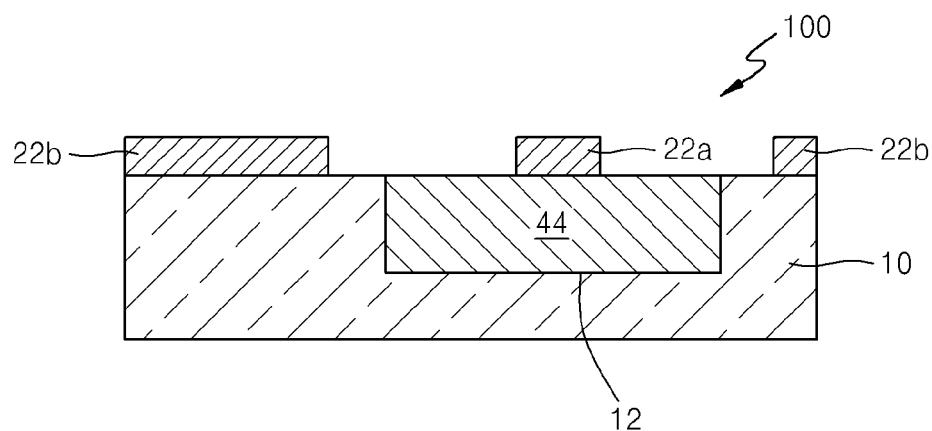
Figure 4G:
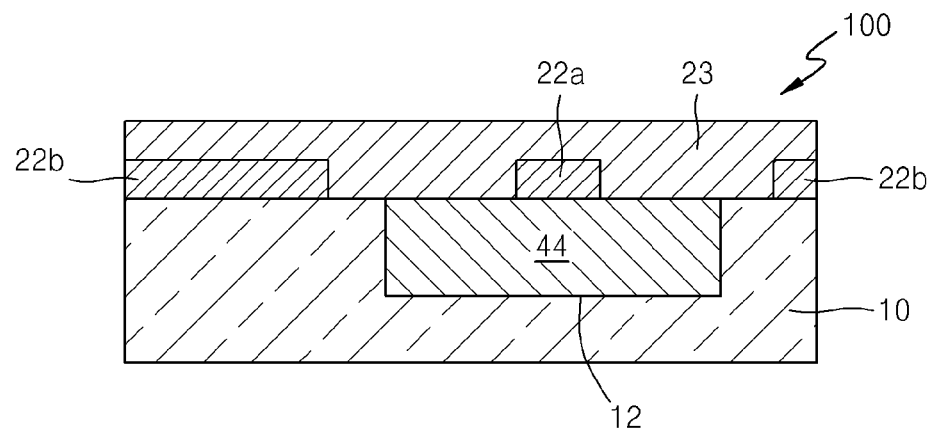

Next, referring to FIG. 4F, the mask pattern 20 is removed. Next, referring to FIG. 4G, an upper or top cladding layer 23 may be formed over the top and side surfaces of the core region 22a and over the bottom cladding layer 14. Like the bottom cladding layer 14, the upper cladding layer 23 may be formed of an insulating material such as silicon oxide, silicon nitride or silicon oxynitride. Alternatively, the upper cladding layer 23 may be omitted. In this case, air may serve as the upper cladding layer of the optical waveguide. The upper cladding layer serves the same purpose as the bottom cladding layer 14. Specifically, the upper cladding layer also serves to confine propagating light in the core region 22a because the index of refraction of the upper cladding layer is lower than that of the core region 22a.

Figure 5A:
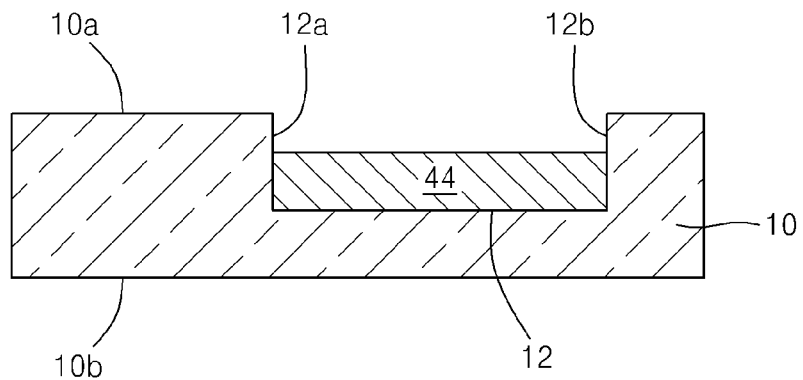
FIGS. 5A through 5G are schematic cross-sectional views illustrating a method of manufacturing the optical waveguide structure of FIG. 3A, according to one exemplary embodiment of the inventive concept.

FIGS. 5A through 5G are schematic cross-sectional views illustrating a method of manufacturing the optical waveguide structure 200 of FIG. 3A, according to one exemplary embodiment of the inventive concept. Referring to FIG. 5A, a substrate 10, such as a bulk semiconductor substrate, e.g., a bulk silicon substrate, is provided. The substrate 10 includes a top or front surface 10a and a bottom or back surface 10b. The substrate 10 is selectively etched to form a trench 12 having sidewalls 12a and 12b in the substrate 10. The depth of the trench 12 is determined based on a desired thickness of a bottom cladding layer to be formed in the trench 12. Next, the bottom cladding layer 44 is formed in the trench 12. The bottom cladding layer 44 is formed of an insulating material having a lower index of refraction than a core region of the optical waveguide to be formed subsequently on the bottom cladding layer 44. The material of the bottom cladding layer 44 can be, for example, silicon oxide, silicon nitride or silicon oxynitride. In this embodiment, the top surface of the bottom cladding layer 44 is lower than the top surface 10a of the substrate 10.

Figure 5B:
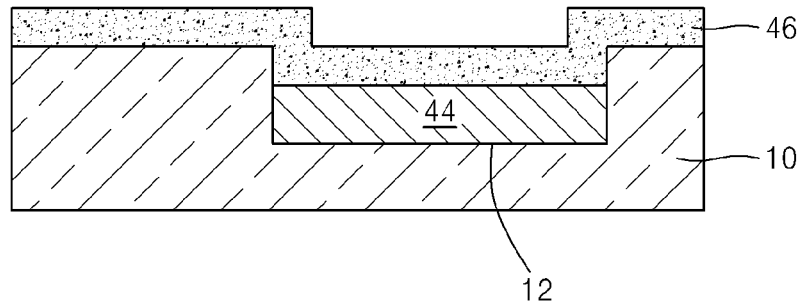
Figure 5C:
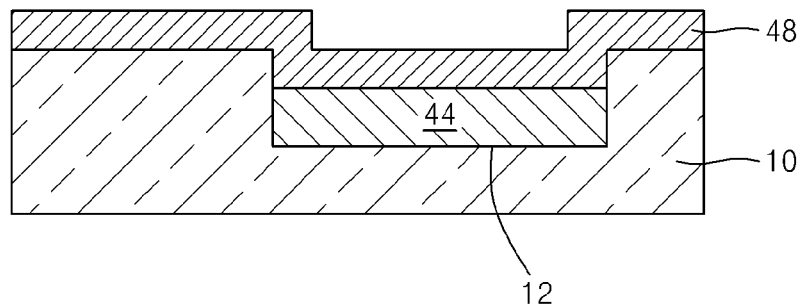

Referring to FIG. 5B, next, a layer 46 of amorphous semiconductor material, e.g., amorphous silicon, is formed over the bottom cladding layer 44 and the top surface 10a of the substrate 10. The amorphous silicon layer 46 can be formed by, for example, chemical vapor deposition (CVD), atomic layer deposition (ALD) or other similar process. Next, referring to FIG. 5C, the layer 46 of amorphous silicon is at least partially crystallized to transform the layer 46 of amorphous silicon into a layer 48 of defective single-crystalline silicon. That is, the layer 48 is formed of single-crystalline silicon with a lower crystallinity, i.e., higher percentage of crystal defects, than that of the single crystalline bulk silicon substrate 10. The crystallization of the amorphous silicon layer 46 can be performed by, for example, one of laser epitaxial growth (LEG), solid phase epitaxy (SPE), epitaxial lateral overgrowth (ELO), selective epitaxial growth (SEG), solid phase crystallization (SPC), or other similar method.

Figure 5D:
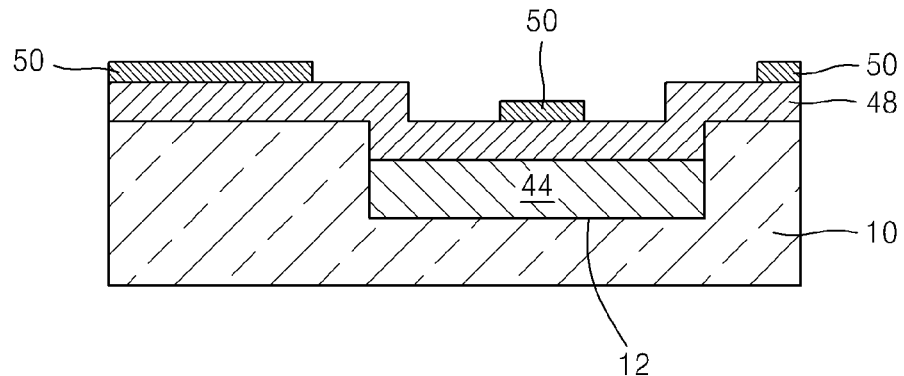
Figure 5E:
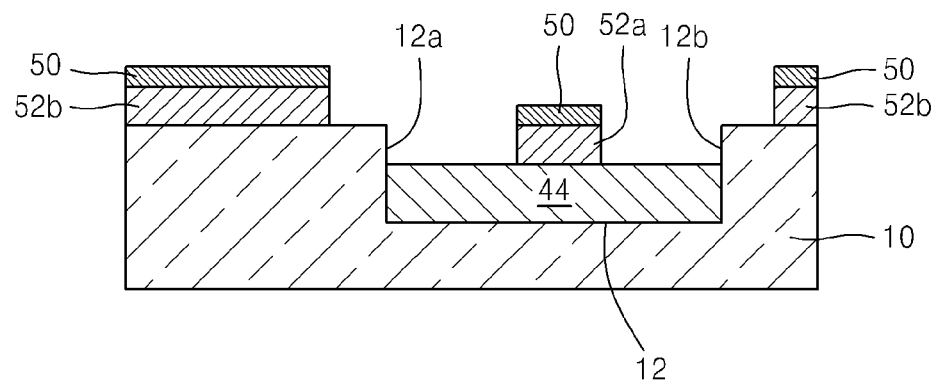

Next, referring to FIG. 5D, a mask pattern 50 is formed on the layer 48 of defective single-crystalline silicon to define the core region of the optical waveguide. The mask pattern 50 can be formed of for example, photoresist and/or a combination of photoresist and a hard mask material. Next, referring to FIG. 5E, the structure is selectively etched using the mask pattern 50 as an etching mask, to remove unmasked portions of the layer 48 to form the core region 52a of the optical waveguide structure 200. Also formed simultaneously are additional regions 52b of the same material as that of the core region 52a. These other regions 52b can be core regions of other adjacent optical waveguide structures or other such regions.

Figure 5F:
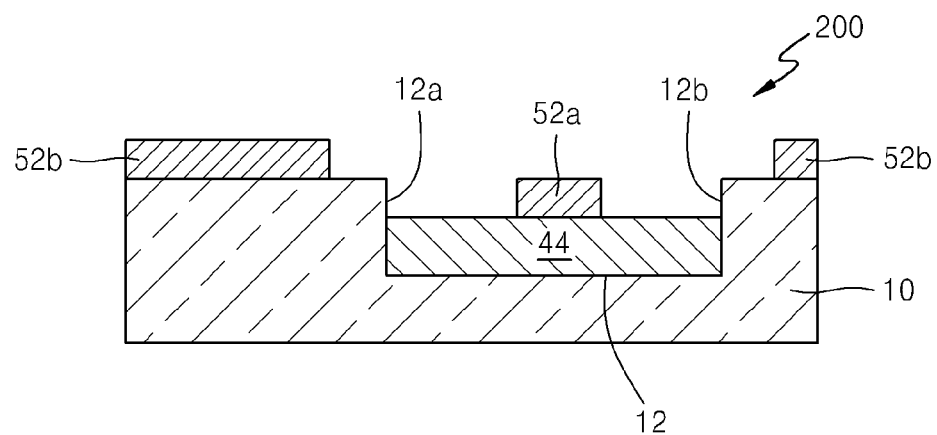
Figure 5G:
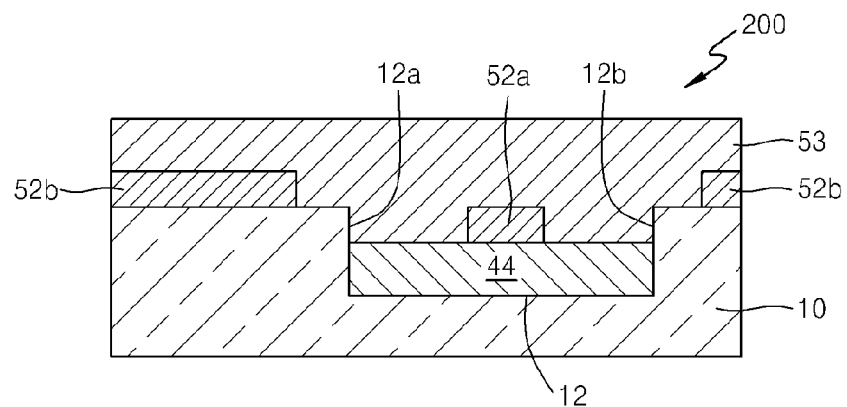

Next, referring to FIG. 5F, the mask pattern 50 is removed. Next, referring to FIG. 5G, an upper or top cladding layer 53 may be formed over the top and side surfaces of the core region 52a and over the bottom cladding layer 44. Like the bottom cladding layer 44, the upper cladding layer 53 may be formed of an insulating material such as silicon oxide, silicon nitride or silicon oxynitride. Alternatively, the upper cladding layer 53 may be omitted. In this case, air may serve as the upper cladding layer of the optical waveguide. The upper cladding layer serves the same purpose as the bottom cladding layer 44. Specifically, the upper cladding layer also serves to confine propagating light in the core region 52a because the index of refraction of the upper cladding layer is lower than that of the core region 52a.

Figure 6:
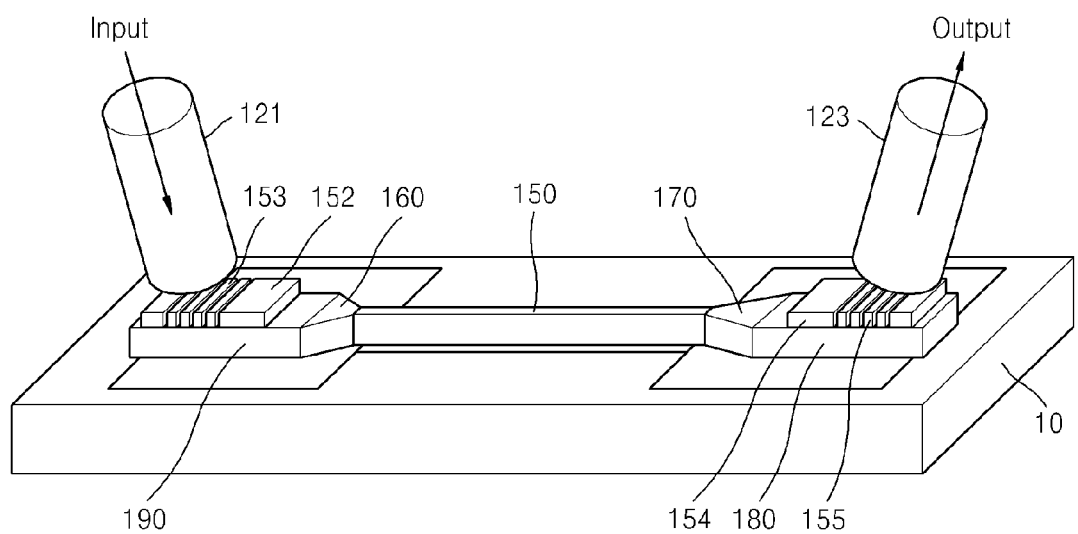
FIG. 6 is a schematic perspective view illustrating vertical optical coupling to an integrated optical waveguide structure, according to embodiments of the inventive concept.

The integrated optical waveguide structure of the inventive concept is optically coupled to other devices, such as external devices, by an optical coupler structure according to various embodiments of the inventive concept described herein. FIG. 6 is a schematic perspective view illustrating vertical optical coupling to an integrated optical waveguide structure, according to embodiments of the inventive concept.

Referring to FIG. 6, according to embodiments of the inventive concept, an optical waveguide structure 150 can be integrated on or in a semiconductor substrate 10, such as a silicon substrate, as described above in connection with various embodiments of the inventive concept. To couple the waveguide 150 to transmit and receive optical energy to and from other external devices, ends of the waveguide 150 are coupled to optical fibers, illustrated in FIG. 6 as a first input fiber 121 and a second output fiber 123. According to embodiments of the inventive concept, the ends of the waveguide 150 are tapered in the horizontal dimension, and not in the vertical dimension, as illustrated by 160 and 170, to accommodate the larger size of the fiber ends. The tapered sections 160 and 170 are connected to wider coupling end portions 190 and 180, respectively, where the optical coupling devices are formed.

According to embodiments of the inventive concept, in the vertical grating coupler (VGC) of FIG. 6, light emitted at the end of the input fiber 121 impinges on a grating 153 formed in a region 152 at the wide coupling end portion 190. The light is coupled by the grating 153 into the core of the waveguide 150 such that it propagates through the waveguide 150. Likewise, light propagating to the output end of the waveguide 150 impinges on a grating 155 formed in a region 154 at the wide coupling end portion 180. The grating 155 couples the light out of the waveguide 150 and into the end of the output fiber 123. The grating structure in the coupling device converts the propagation direction of the light between the vertical direction and the horizontal direction.

In vertical coupling according to embodiments of the inventive concept, as illustrated in FIG. 6, the waveguide ends taper only in the horizontal dimensions and are relatively flat in the vertical dimension. As a result, the fiber ends need only couple to the waveguide ends vertically. This vertical coupling is especially desirable to improve the ability to integrate the optical waveguide and optical couplers with other circuits formed on or in the substrate. It also results in reduced device size, and process time, complexity and cost. Also, test and packaging costs are reduced.

Various embodiments of optical coupling devices according to the inventive concept are described below. The optical coupling devices of the inventive concept are novel and nonobvious types of vertical grating couplers in which the grating is formed in the core region at a coupling region of the optical waveguide structure. Like the optical waveguide structures described above, the optical coupler structures of the inventive concept are formed in a trench in a bulk semiconductor substrate such as a bulk silicon substrate. The bottom cladding layer for the coupler is formed in the bottom of the trench to a desired thickness determined by the desired performance characteristics of the device. The bottom cladding layer can be formed of, for example, an insulating material such as silicon oxide, silicon nitride or silicon oxynitride. The core layer is formed by depositing amorphous silicon or polysilicon on the bottom cladding layer. The amorphous silicon or polysilicon is crystallized to transform the core layer into defective single-crystalline silicon. The defective single-crystalline silicon is selectively etched both to size the core region of the coupler and to form the grating in the core region. According to the inventive concept, the coupler structure, like the waveguide structures described above, can be integrated into a single wafer or chip with other circuitry such as CMOS circuitry or memory circuitry, compatible with the requirements of silicon photonics. As a result, electrical connections on a wafer or chip are replaced with optical connections, resulting in devices and systems with higher speed, reduced size, lower power consumption and higher capacity.

Figure 7:
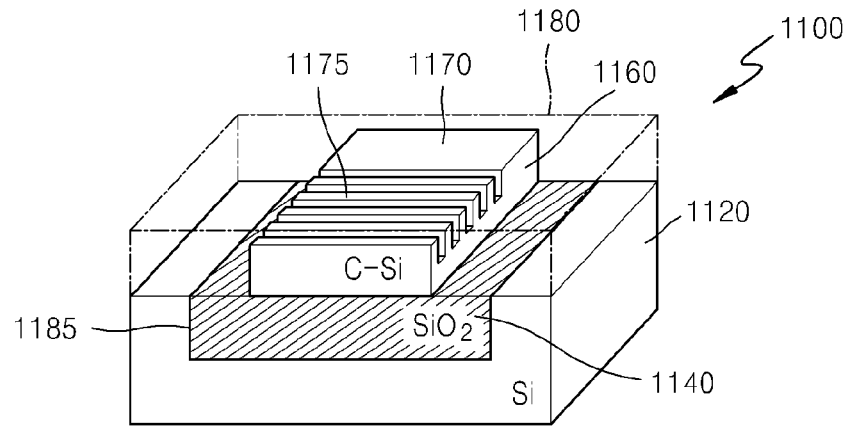
FIG. 7 contains a schematic perspective view of an optical coupler structure or device according to one embodiment of the inventive concept.

FIG. 7 contains a schematic perspective view of an optical coupler structure or device 1100 according to one embodiment of the inventive concept. Referring to FIG. 7, the optical coupler device 1100 is formed in a bulk semiconductor substrate 1120, such as a bulk silicon substrate. A trench 1185 is formed in the substrate 1120. A bottom cladding layer 1140, made of an insulating material such as silicon oxide, silicon nitride or silicon oxynitride, is formed in the trench 1140. A core region 1160 of the coupler 1100, which is also the core region of the connected optical waveguide structure 1170, is formed over the bottom cladding layer 1140. In this embodiment, the core region 1160 is formed of defective single-crystalline silicon. In one embodiment, the defective single-crystalline silicon is made by crystallizing amorphous silicon. A grating 1175 is formed in the top of the core region 1160. A top or upper cladding layer 1180, which in one embodiment is made of an insulating material such as silicon oxide, silicon nitride or silicon oxynitride, is formed over the coupler structure 1100. It should be noted that the upper cladding layer 1180 may be omitted, in which case air may serve as the upper cladding of the coupler 1100 and/or the waveguide 1170.

Figure 8:
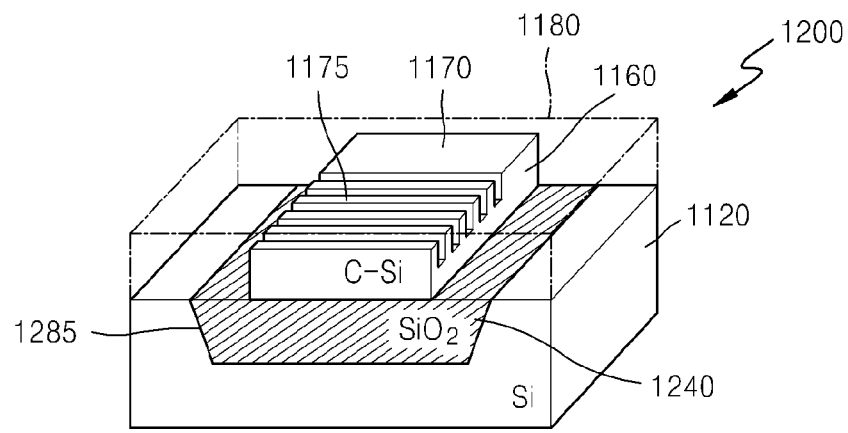
FIG. 8 contains a schematic perspective view of an optical coupler structure or device according to another embodiment of the inventive concept.

FIG. 8 contains a schematic perspective view of an optical coupler structure or device 1200 according to another embodiment of the inventive concept. The embodiment of FIG. 8 is substantially similar to the embodiment of FIG. 7, except that the sidewalls of the trench 1285 and the bottom cladding layer 1240 are sloped instead of vertical. The sloped walls of the trench 1285 and bottom cladding layer 1240 are used to facilitate fabrication of the device 1200, particularly when the trench 1285 is formed to be deep. The sloped trench walls reduce the complexity and cost of the process of forming the trench, particularly when the trench is relatively deep. The coupler structure 1200 includes the core region 1160, which is also the core region of the connected optical waveguide 1170, and which has formed thereon the grating 1175. The structure also may include the upper or top cladding layer 1180. It should be noted that the upper cladding layer 1180 may be omitted, in which case air may serve as the upper cladding of the coupler 1200 and/or the waveguide 1170.

Figure 9:
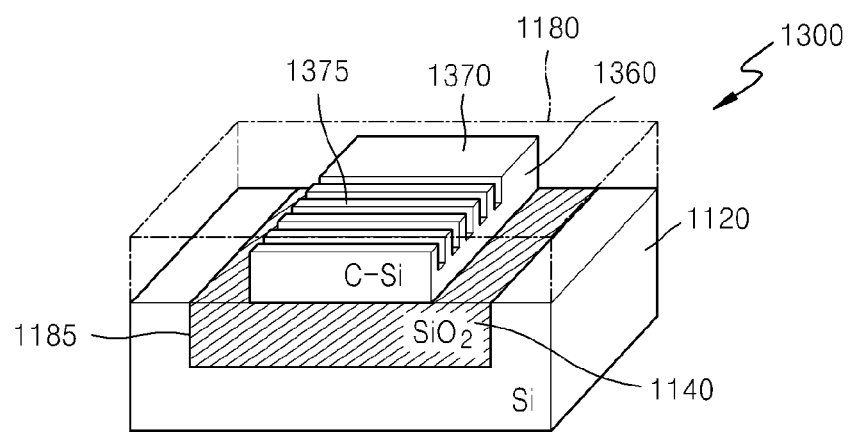
FIG. 9 contains a schematic perspective view of an optical coupler structure or device according to another embodiment of the inventive concept.

FIG. 9 contains a schematic perspective view of an optical coupler structure or device 1300 according to another embodiment of the inventive concept. The embodiment of FIG. 9 is substantially similar to the embodiment of FIG. 7, except that the core region 1360, which is made of defective single-crystalline silicon, is formed by crystallizing polysilicon instead of amorphous silicon. The core of the connected optical waveguide 1370 may also be formed by crystallizing polysilicon instead of amorphous silicon. The structure 1300 includes the bottom cladding layer 1140 formed in the trench 1185, which is formed in the bulk silicon substrate 1120. Although not shown in the figure, the top or upper cladding layer 1180 may be formed over the structure, or it may be omitted, such that air may serve the purpose of the upper cladding layer 1180.

Figure 10:
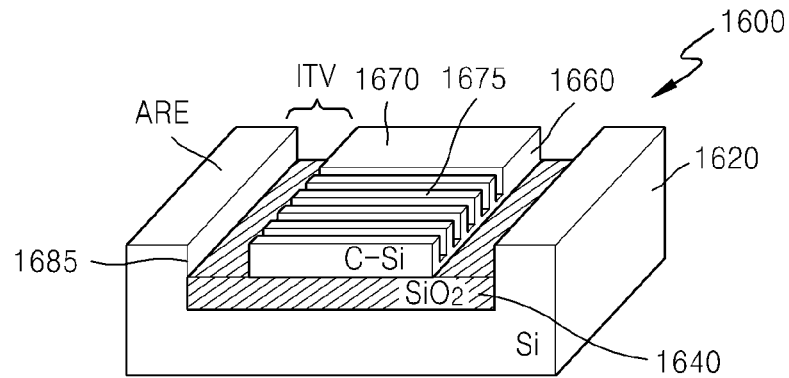
FIG. 10 contains a schematic perspective view of an optical coupler structure or device according to another embodiment of the inventive concept.

FIG. 10 contains a schematic perspective view of an optical coupler structure or device 1600 according to another embodiment of the inventive concept. The embodiment of FIG. 10 is substantially similar to the embodiment of FIG. 7, except that the trench 1685 is not completely filled with the material of the bottom cladding layer 1640. That is, the top surface of the bottom cladding layer 1640 is below the top surface of the substrate 1620. The result is that the core region 1660, which includes the grating 1675, and the waveguide 1670 are recessed with respect to the substrate 1620. Although not shown in the figure, the top or upper cladding layer 1180 may be formed over the structure, or it may be omitted, such that air may serve the purpose of the upper cladding layer 1180.

In the embodiment of the coupler device 1600 of FIG. 10, because the top surface of the bottom cladding layer 1640 is recessed with respect to the substrate 1620, a substrate remainder region ARE remains adjacent to the trench 1685. The sidewall of the region ARE is a distance identified as ITV from the sidewall of the core region 1660. The region ARE is formed of the same material as the substrate 1920 having a relatively high refractive index. With the core region 1660 recessed into the substrate 1920, the distance ITV is selected to maintain the leakage loss into the ARE region of the substrate at a desired level.

It is noted that the height of the core region 1660 is determined by the thickness of the bottom cladding layer 1640 and the depth of the trench 1685. As a result of these two features, the core region 1660 may be completely recessed within the trench 1685, or a portion of the core region 1660 may protrude above the top of the trench 1685. A benefit of the recessed bottom cladding layer is in reducing the cost and complexity of monolithic integration of the optical devices of the inventive concept with other circuitry such as CMOS transistors fabricated together on the same substrate. In the case of, for example, a CMOS transistor, because the height of the transistor is relatively low compared to that of conventional optical devices, the optical devices of the inventive concept can be buried in the trench below the top surface of the substrate to facilitate integration.

Figure 11:
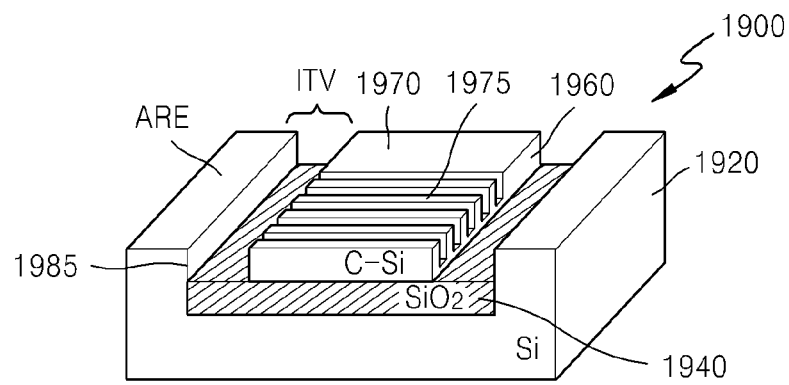
FIG. 11 contains a schematic perspective view of an optical coupler structure or device according to another embodiment of the inventive concept.

FIG. 11 contains a schematic perspective view of an optical coupler structure or device 1900 according to another embodiment of the inventive concept. The structure of the device 1900 of the embodiment of FIG. 11 is substantially similar to the embodiment of the device 1600 of FIG. 10 and, generally, may be identical to the structure of the device 1600 of the embodiment of FIG. 10. The difference between these two embodiments is primarily in the processes used to fabricate the devices 1600 and 1900, as described below in connection with FIGS. 23A through 23F and FIGS. 24A through 24F.

Figure 12:
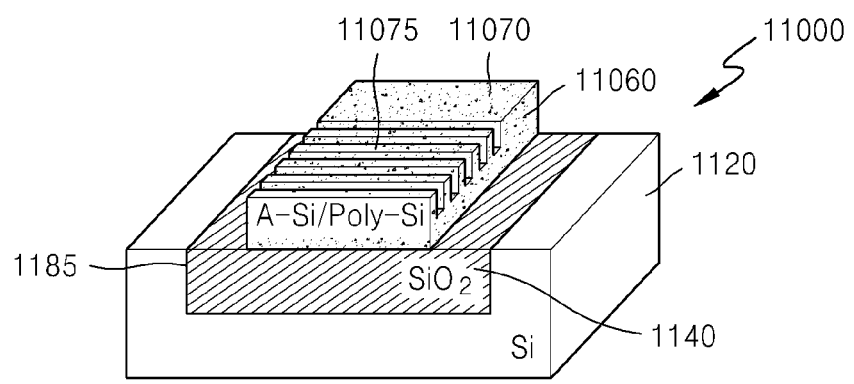
FIG. 12 contains a schematic perspective view of an optical coupler structure or device according to another embodiment of the inventive concept.

FIG. 12 contains a schematic perspective view of an optical coupler structure or device 11000 according to another embodiment of the inventive concept. The embodiment of FIG. 12 is substantially similar to the embodiment of FIG. 7 except that the core region 11060 of the coupler 11000 and the waveguide 11070 is formed of amorphous silicon or polysilicon instead of defective single-crystalline silicon. During fabrication, after deposition of the core layer of amorphous silicon or polysilicon, the layer is not crystallized as in the other embodiments to form the defective single-crystalline silicon core region. The structure 11000 includes the bottom cladding layer 1140 formed in the trench 1185, which is formed in the bulk silicon substrate 1120. Although not shown in the figure, the top or upper cladding layer 1180 may be formed over the structure, or it may be omitted, such that air may serve the purpose of the upper cladding layer 1180.

It will be noted that although the use of amorphous silicon or polysilicon for the core region is described in connection with only the embodiment of FIG. 12, it is applicable to any of the embodiments described herein. That is, in any of the described embodiments, the core region can be amorphous silicon or polysilicon instead of defective single-crystalline silicon.

In some embodiments of the inventive concept, a reflective element is included under the optical coupler device and may also be included under the integrated optical waveguide. The reflective element is provided to improve the optical efficiency, i.e., reduce the optical loss, of the coupler and, in some embodiments, the waveguide. In some embodiments, the reflective element is a Distributed Bragg Reflector (DBR) formed in the bottom cladding layer. A DBR is a multiple-layer structure formed by alternating materials with different refractive indices. In the exemplary embodiments of the inventive concept described herein, the DBR structures are shown to have three layers, two of which are labelled as A and B and are separated by a third layer having a different index of refraction than the layers A and B. It will be understood that any number of layers can be used for the DBR, depending on the desired reflectivity of the DBR. The refractive indices of layers A and B are typically identical, but they can also be different, depending on the desired performance of the DBR.

In some embodiments, the DBR is formed on a portion of the bottom cladding layer isolating the DBR from the substrate. Another portion of the bottom cladding immediately under the core layer is formed on the DBR. This portion of the bottom cladding layer performs the same function as the bottom cladding in some embodiments in which the DBR is not formed. This layer is also used to make the optical wave reflected from the DBR constructively interfere with the optical wave directly outcoupled from the grating coupler by adjusting its thickness.

FIGS. 13 through 18 are schematic perspective views of the embodiments of the inventive concept of FIGS. 7 through 12, respectively, modified to include a DBR. The DBR of each embodiment of FIGS. 13 through 18 is shown including the layers A and B, which can be made of a material of the same or similar index of refraction, separated by a layer of material having an index of refraction different than that of the layers A and B. It should be noted that the use of a three-layer DBR is for illustration only. As noted above, the DBR can be any number of layers, depending on the desired reflectivity of the DBR. It should also be noted that each of FIGS. 13 though 18 is intended to illustrate, and does illustrate, that the DBR is not necessarily under only the coupler portion of the device. It can also be located under the waveguide to reduce optical losses in the waveguide. Description of features and elements that are the same as those previously described will not be repeated. It should also be noted that some of the embodiments in FIGS. 13 through 17 are shown with the upper cladding layer 1180, and some are shown without it. This is intended to illustrate that any of the embodiments described herein may have the upper cladding layer 1180 or may have the upper cladding layer 1180 omitted. Where it is omitted, air may serve the purpose of an upper cladding layer.

Figure 13:
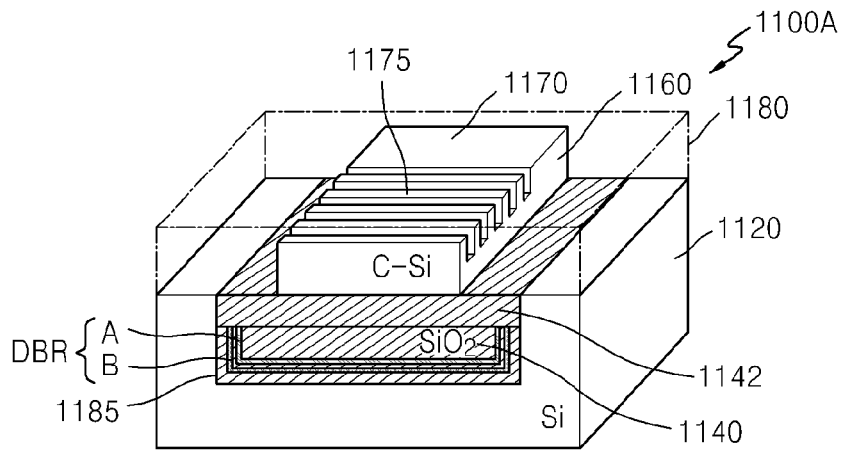
FIGS. 13 through 18 are schematic perspective views of the embodiments of the inventive concept of FIGS. 7 through 12, respectively, modified to include a distributed Bragg reflector.

Referring to FIG. 13, the coupler structure or device 1100A includes the DBR structure within the bottom cladding layer 1140. An additional layer 1142 is formed over the DBR and the lower cladding layer 1140. The additional layer can be made of the same material as the lower cladding layer 1140.

Figure 14:
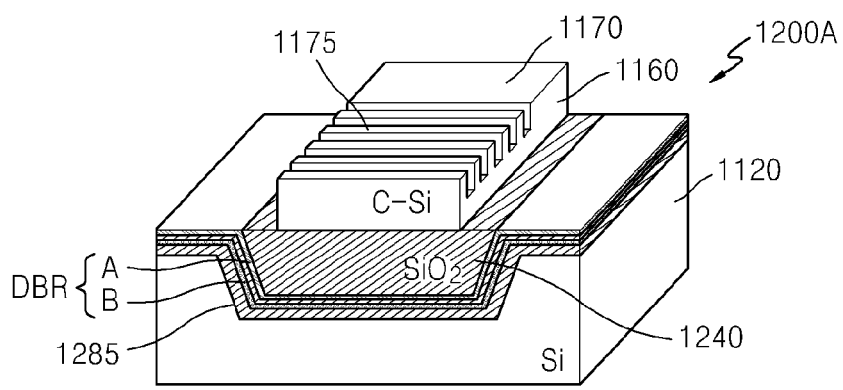

Referring to FIG. 14, the coupler structure or device 1200A includes the DBR structure within the bottom cladding layer 1240 having sloped sidewalls.

Figure 15:
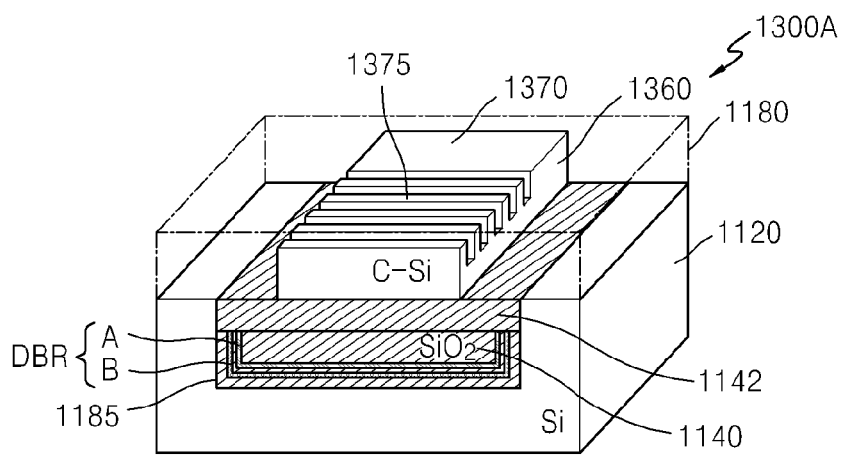

Referring to FIG. 15, the coupler structure or device 1300A includes the DBR structure within the bottom cladding layer 1140. An additional layer 1142 is formed over the DBR and the lower cladding layer 1140. The additional layer can be made of the same material as the lower cladding layer 1140.

Figure 16:
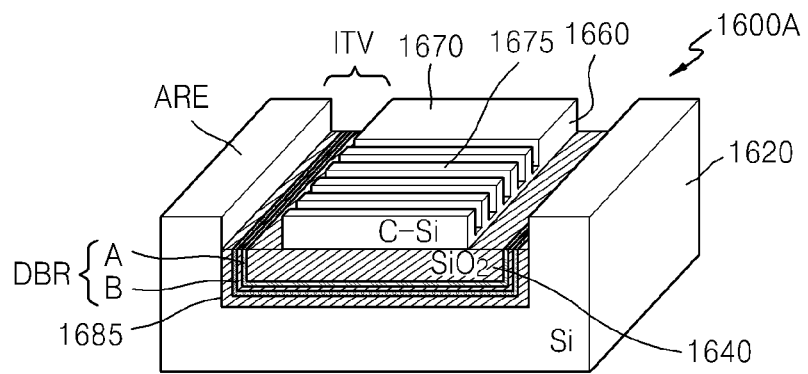

Referring to FIG. 16, the coupler structure or device 1600A includes the DBR structure within the bottom cladding layer 1640.

Figure 17:
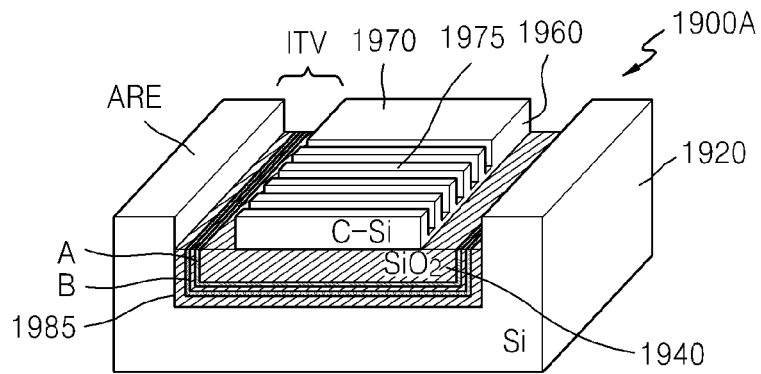

Referring to FIG. 17, the coupler structure or device 1900A includes the DBR structure within the bottom cladding layer 1940.

Figure 18:
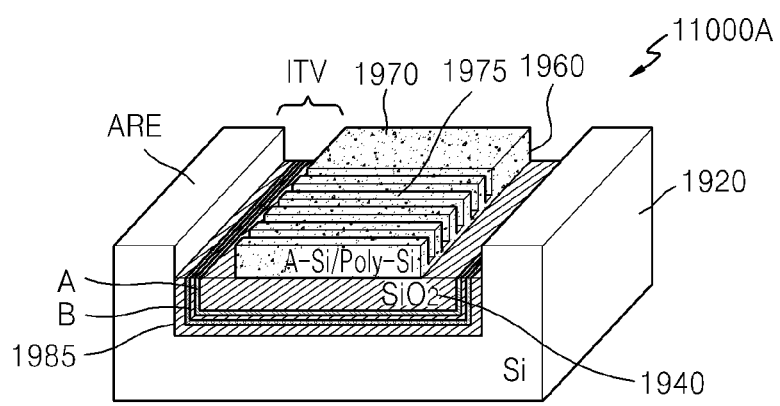

Referring to FIG. 18, the coupler structure or device 11000A includes the DBR structure within the bottom cladding layer 1940.

Figure 19:
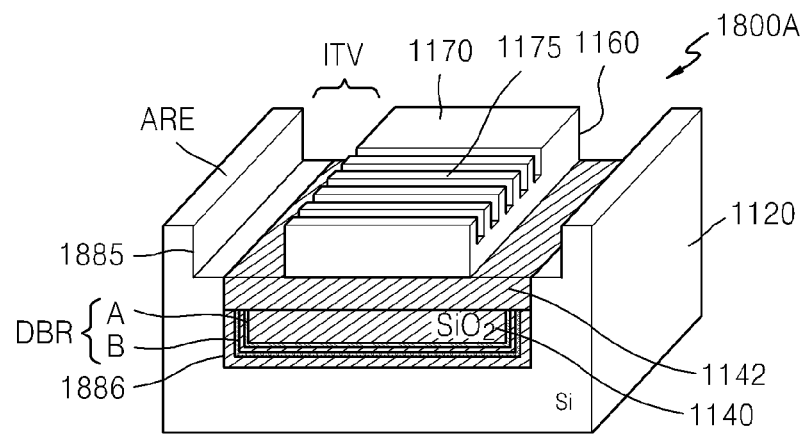
FIG. 19 is a schematic perspective view of another embodiment of a coupler structure or device according to the inventive concept.

FIG. 19 is a schematic perspective view of another embodiment of a coupler structure or device 1800A according to the inventive concept. Referring to FIG. 19, the coupler structure or device 1800A includes the DBR structure below the bottom cladding layer 1140. The coupler 1800A is substantially similar to the embodiments 1100A and 1300A illustrated in FIGS. 13 and 15, respectively, except that, in the embodiment of FIG. 19, the spacing between adjacent waveguides is selected such that the remaining portion ARE of the substrate is comparatively narrow, as defined by the sidewalls 1885. This is done by setting the distance between adjacent waveguide structures to be greater than the width of the waveguide trench 1886. The DBR and the bottom cladding layer 1140 are formed in the trench 1886, and the core region 1160 is formed over the bottom cladding layer 1140. The sidewalls 1885 are spaced such that a narrow remaining portion ARE and increased ITV distance are created. This results in reduced optical loss of the device due to proximity to the substrate 1120.

Figure 20A:
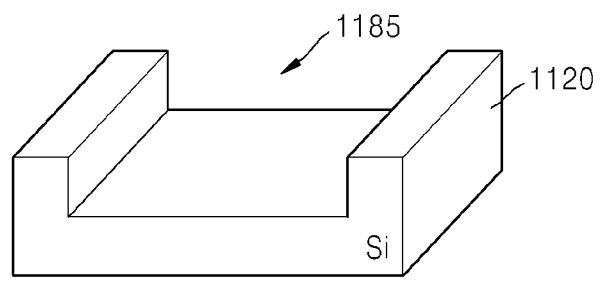
FIGS. 20A through 20F are schematic perspective views illustrating a method of manufacturing the coupler structure or device illustrated in FIG. 7, according to an embodiment of the inventive concept.

FIGS. 20A through 20F are schematic perspective views illustrating a method of manufacturing the coupler structure or device 1100 illustrated in FIG. 7, according to an embodiment of the inventive concept. Referring to FIG. 20A, a bulk semiconductor substrate 1120, such as a bulk silicon substrate, is provided. A trench 1185 having vertical sidewalls is formed in the bulk silicon substrate 1120 by selective etching. The depth of the trench 1185 is selected based on a desired thickness of the bottom cladding layer to be formed in the trench, which thickness is determined based on desired performance characteristics of the coupler and the waveguide connected to the coupler.

Figure 20B:
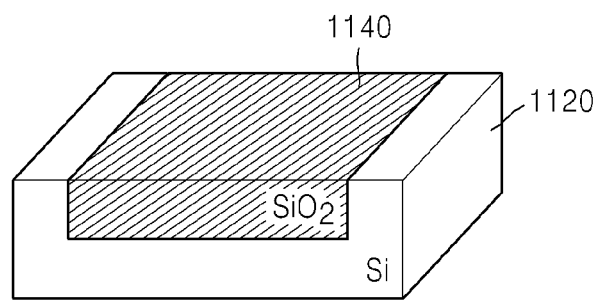

Referring to FIG. 20B, the bottom cladding layer 1140 is formed in the trench 1185 such that its top surface is even or level with the top surface of the substrate 1120. The bottom cladding layer 1140 can be formed of for example, an insulating material such as silicon oxide, silicon nitride, or silicon oxynitride.

Figure 20C:
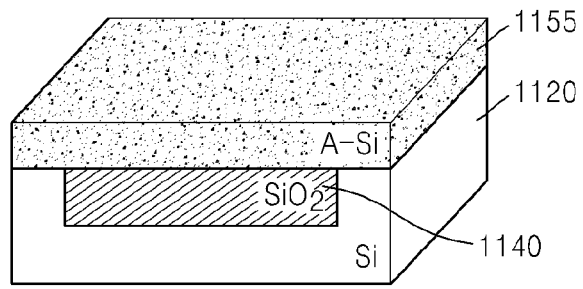
Figure 20D:
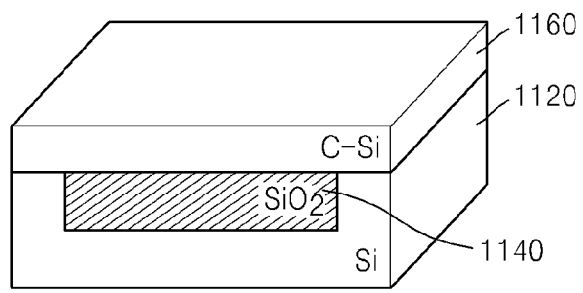

Referring to FIG. 20C, a layer of amorphous silicon 1155 is formed on the bottom cladding layer 1140 and the top surface of the substrate 1120. Referring to FIG. 20D, the layer of amorphous silicon 1155 is crystallized to transform the layer 1155 into a layer 1160 of defective single-crystalline silicon used for the core region of the coupler and the connected waveguide. The crystallization method used can be one of laser epitaxial growth (LEG), solid phase epitaxy (SPE), epitaxial lateral overgrowth (ELO), selective epitaxial growth (SEG) or solid phase crystallization (SPC).

Figure 20E:
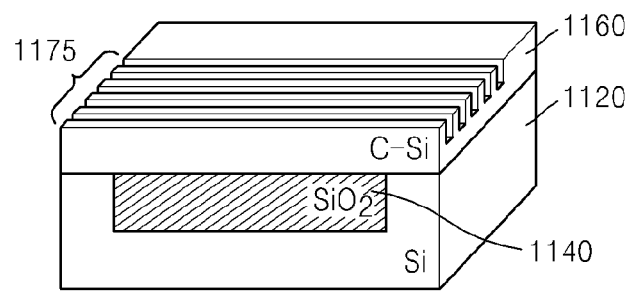

Referring to FIG. 20E, a mask made of photoresist and/or a hard mask material is formed on the crystallized silicon layer 1160 and patterned to the desired pattern of the grating 1175 to be formed on the core region of the coupler. The core region layer 1160 is etched using the patterned mask to form the grating 1175 in the core region layer 1160.

Figure 20F:
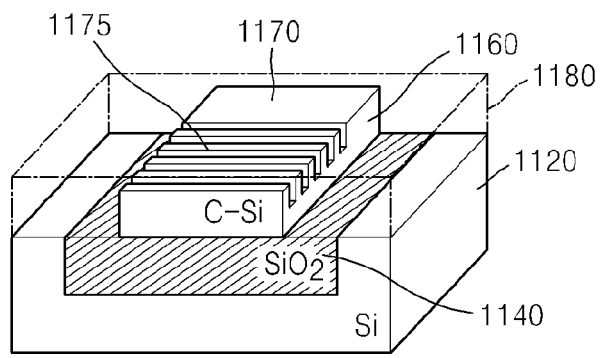

Referring to FIG. 20F, the core region layer 1160 is selectively etched to produce the final core region 1160 having the grating 1175 for the coupler. At the same time, the core region for the connected waveguide 1170 may be formed. The optional upper cladding layer 1180 may then be formed over the structure. The upper cladding layer 1180 may be made of the same material of which the bottom cladding layer 1140 is made.

Figure 21A:
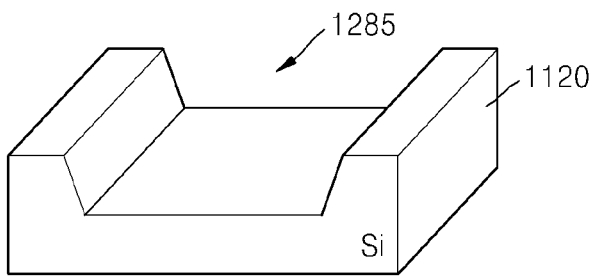
FIGS. 21A through 21F are schematic perspective views illustrating a method of manufacturing the coupler structure or device illustrated in FIG. 8, according to an embodiment of the inventive concept.

FIGS. 21A through 21F are schematic perspective views illustrating a method of manufacturing the coupler structure or device 1200 illustrated in FIG. 8, according to an embodiment of the inventive concept. Referring to FIG. 21A, a bulk semiconductor substrate 1120, such as a bulk silicon substrate, is provided. A trench 1285 having sloped sidewalls is formed in the bulk silicon substrate 1120 by selective etching. The depth of the trench 1285 is selected based on a desired thickness of the bottom cladding layer to be formed in the trench, which thickness is determined based on desired performance characteristics of the coupler and the waveguide connected to the coupler.

Figure 21B:
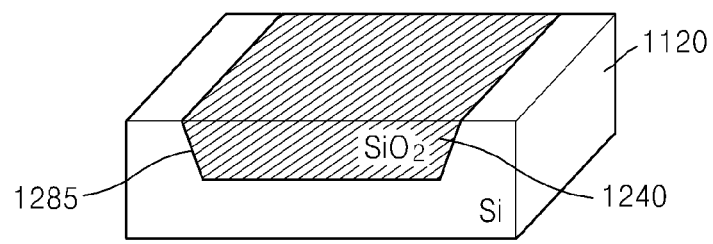

Referring to FIG. 21B, the bottom cladding layer 1240 is formed in the trench 1285 such that its top surface is even or level with the top surface of the substrate 1120. The bottom cladding layer 1240 can be formed of, for example, an insulating material such as silicon oxide, silicon nitride, or silicon oxynitride.

Figure 21C:
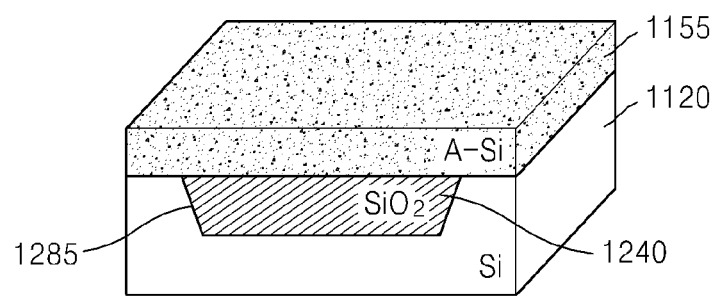
Figure 21D:
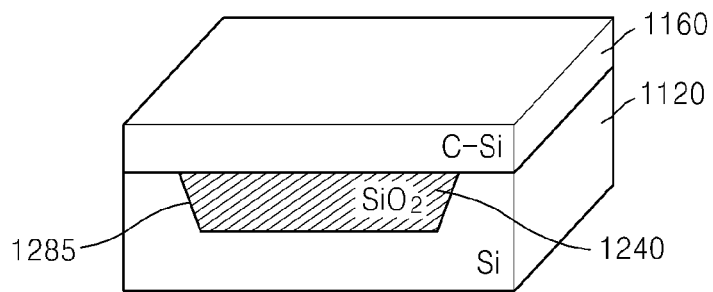

Referring to FIG. 21C, a layer of amorphous silicon 1155 is formed on the bottom cladding layer 1240 and the top surface of the substrate 1120. Referring to FIG. 21D, the layer of amorphous silicon 1155 is crystallized to transform the layer 1155 into a layer 1160 of defective single-crystalline silicon used for the core region of the coupler and the attached waveguide. The crystallization method used can be one of laser epitaxial growth (LEG), solid phase epitaxy (SPE), epitaxial lateral overgrowth (ELO), selective epitaxial growth (SEG) or solid phase crystallization (SPC).

Figure 21E:
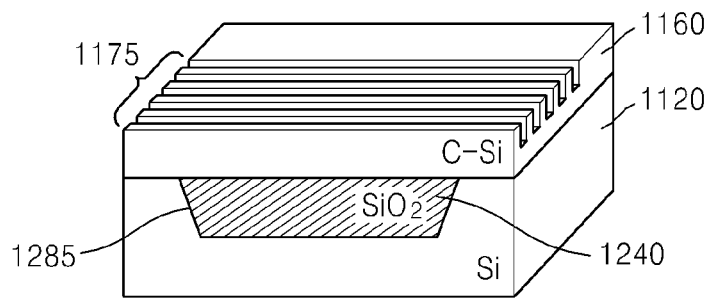

Referring to FIG. 21E, a mask made of photoresist and/or a hard mask material is formed on the crystallized silicon layer 1160 and patterned to the desired pattern of the grating 1175 to be formed on the core region of the coupler. The core region layer 1160 is etched using the patterned mask to form the grating 1175 in the core region layer 1160.

Figure 21F:
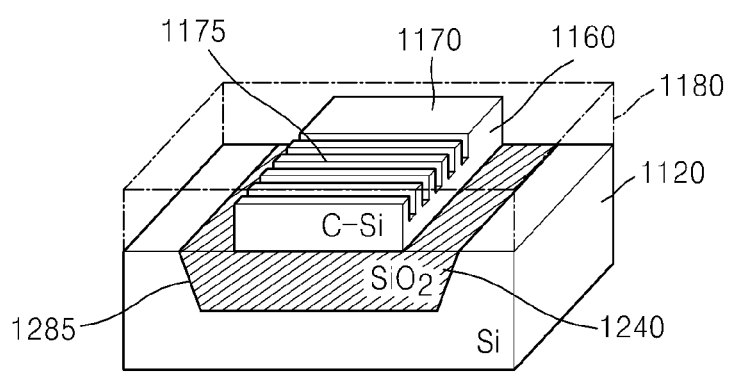

Referring to FIG. 21F, the core region layer 1160 is selectively etched to produce the final core region 1160 having the grating 1175 for the coupler. At the same time, the core region for the connected waveguide 1170 may be formed. The optional upper cladding layer 1180 may then be formed over the structure. The upper cladding layer 1180 may be made of the same material of which the bottom cladding layer 1240 is made.

Figure 22A:
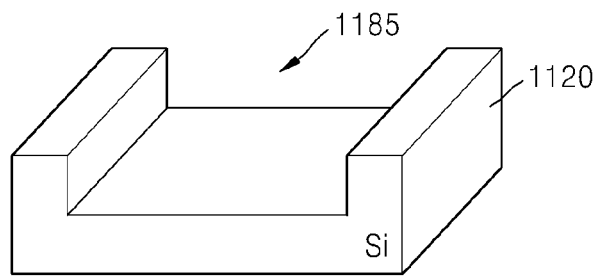
FIGS. 22A through 22F are schematic perspective views illustrating a method of manufacturing the coupler structure or device illustrated in FIG. 9, according to an embodiment of the inventive concept.

FIGS. 22A through 22F are schematic perspective views illustrating a method of manufacturing the coupler structure or device 1300 illustrated in FIG. 9, according to an embodiment of the inventive concept. Referring to FIG. 22A, a bulk semiconductor substrate 1120, such as a bulk silicon substrate, is provided. A trench 1185 having vertical sidewalls is formed in the bulk silicon substrate 1120 by selective etching. The depth of the trench 1185 is selected based on a desired thickness of the bottom cladding layer to be formed in the trench, which thickness is determined based on desired performance characteristics of the coupler and the waveguide connected to the coupler.

Figure 22B:
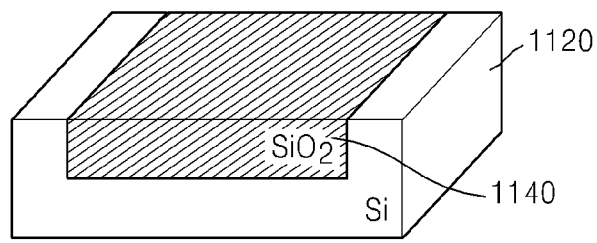

Referring to FIG. 22B, the bottom cladding layer 1140 is formed in the trench 1185 such that its top surface is even or level with the top surface of the substrate 1120. The bottom cladding layer 1140 can be formed of for example, an insulating material such as silicon oxide, silicon nitride, or silicon oxynitride.

Figure 22C:
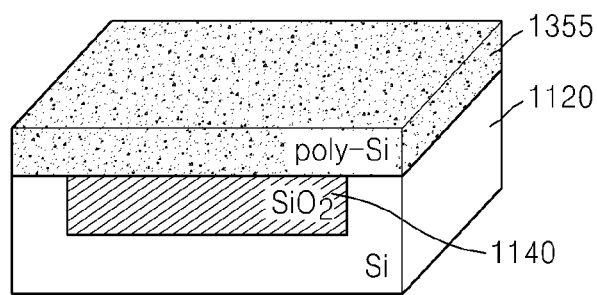
Figure 22D:
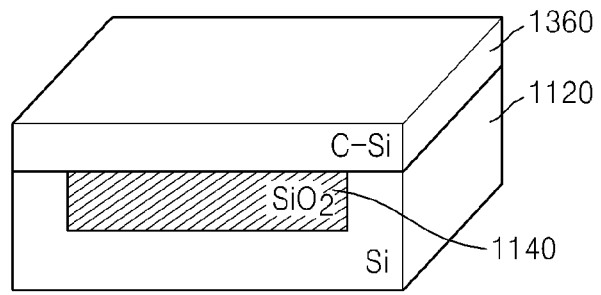

Referring to FIG. 22C, a layer of polysilicon 1355 is formed on the bottom cladding layer 1140 and the top surface of the substrate 1120. Referring to FIG. 22D, the layer of polysilicon 1355 is crystallized to transform the layer 1355 into a layer 1360 of defective single-crystalline silicon used for the core region of the coupler and the attached waveguide. The crystallization method used can be one of laser epitaxial growth (LEG), solid phase epitaxy (SPE), epitaxial lateral overgrowth (ELO), selective epitaxial growth (SEG) or solid phase crystallization (SPC).

Figure 22E:
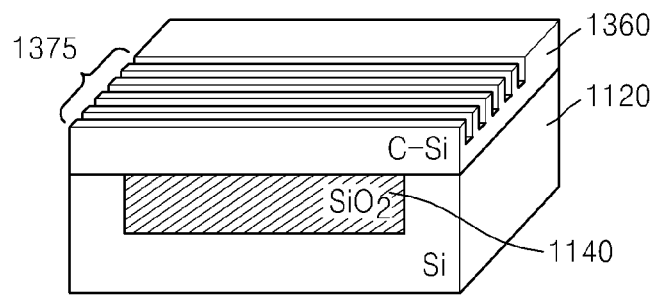

Referring to FIG. 22E, a mask made of photoresist and/or a hard mask material is formed on the crystallized silicon layer 1360 and patterned to the desired pattern of the grating 1375 to be formed on the core region of the coupler. The core region layer 1360 is etched using the patterned mask to form the grating 1375 in the core region layer 1360.

Figure 22F:
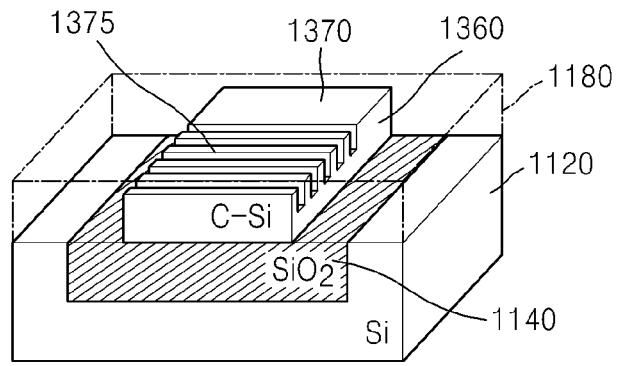

Referring to FIG. 22F, the core region layer 1360 is selectively etched to produce the final core region 1360 having the grating 1375 for the coupler. At the same time, the core region for the connected waveguide 1370 may be formed. The optional upper cladding layer 1180 may then be formed over the structure. The upper cladding layer 1180 may be made of the same material of which the bottom cladding layer 1140 is made.

Figure 23A:
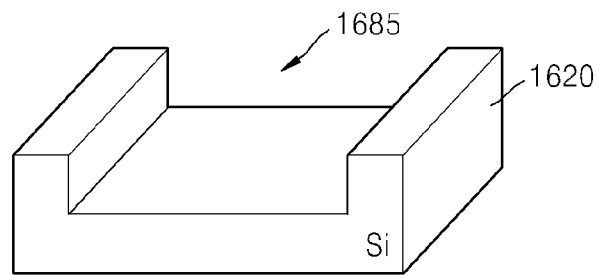
FIGS. 23A through 23F are schematic perspective views illustrating a method of manufacturing the coupler structure or device illustrated in FIG. 10, according to an embodiment of the inventive concept.

FIGS. 23A through 23F are schematic perspective views illustrating a method of manufacturing the coupler structure or device 1600 illustrated in FIG. 10, according to an embodiment of the inventive concept. Referring to FIG. 23A, a bulk semiconductor substrate 1620, such as a bulk silicon substrate, is provided. A trench 1685 having vertical sidewalls is formed in the bulk silicon substrate 1620 by selective etching. The depth of the trench 1685 is selected based on a desired thickness of the bottom cladding layer to be formed in the trench, and the desired height of the coupler and connected waveguide relative to the top surface of the substrate 1620.

Figure 23B:
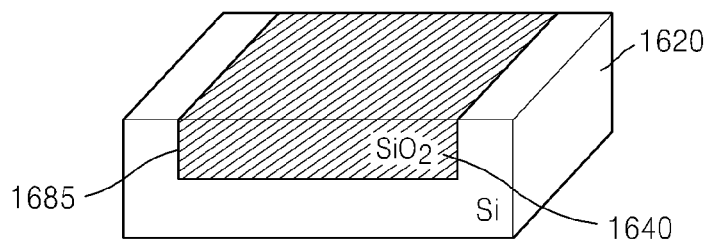
Figure 23C:
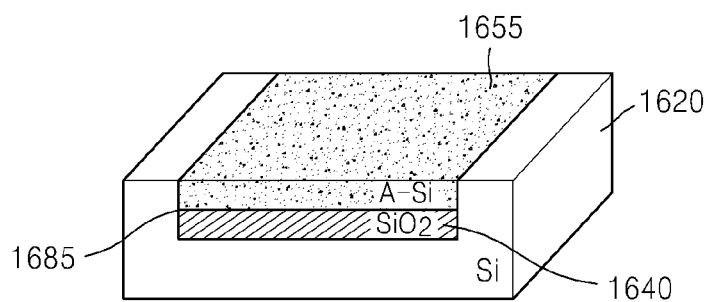

Referring to FIG. 23B, the bottom cladding layer 1640 is formed in the trench 1685 such that its top surface is even or level with the top surface of the substrate 1620. The bottom cladding layer 1640 can be formed of, for example, an insulating material such as silicon oxide, silicon nitride, or silicon oxynitride. Referring to FIG. 23C, the bottom cladding layer 1640 is etched to a predetermined thickness within the trench 1685 such that the top surface of the bottom cladding layer 1640 is below the top surface of the substrate 1620, such that the coupler structure and connected waveguide are recessed within the trench 1685. The thickness of the bottom cladding layer 1640 is determined based on desired performance characteristics of the coupler and the waveguide connected to the coupler. Next, a layer of amorphous silicon 1655 is formed on the bottom cladding layer 1640 in the trench 1685.

Figure 23D:
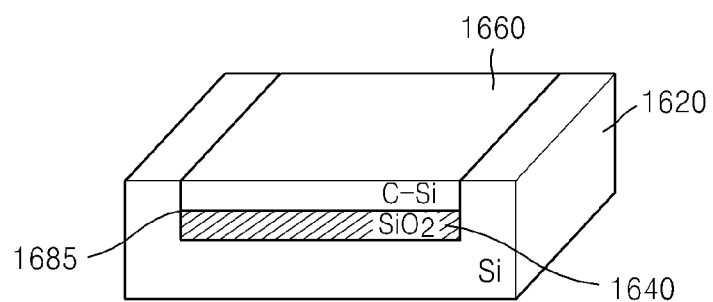

Referring to FIG. 23D, the layer of amorphous silicon 1655 is crystallized to transform the layer 1655 into a layer 1660 of defective single-crystalline silicon used for the core region of the coupler and the attached waveguide. The crystallization method used can be one of laser epitaxial growth (LEG), solid phase epitaxy (SPE), epitaxial lateral overgrowth (ELO), selective epitaxial growth (SEG) or solid phase crystallization (SPC).

Figure 23E:
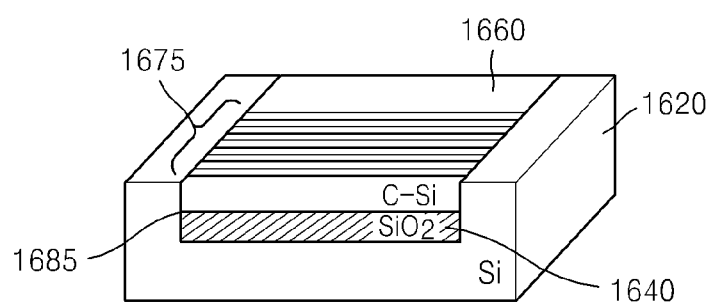

Referring to FIG. 23E, a mask made of photoresist and/or a hard mask material is formed on the crystallized silicon layer 1660 and patterned to the desired pattern of the grating 1675 to be formed on the core region of the coupler. The core region layer 1660 is etched using the patterned mask to form the grating 1675 in the core region layer 1660.

Figure 23F:
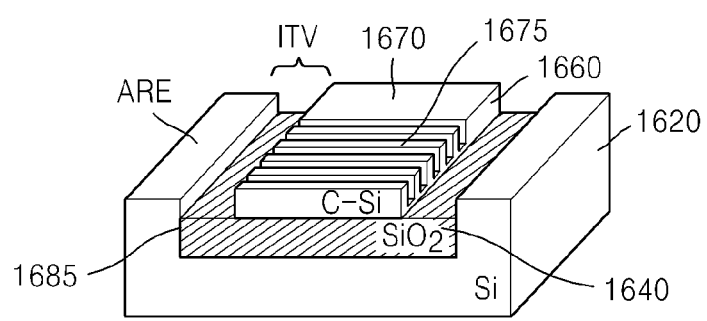

Referring to FIG. 23F, the core region layer 1660 is selectively etched to produce the final core region 1660 having the grating 1675 for the coupler. At the same time, the core region for the connected waveguide 1670 may be formed. The optional upper cladding layer 1180 may then be formed over the structure. The upper cladding layer 1180 may be made of the same material of which the bottom cladding layer 1640 is made.

Figure 24A:
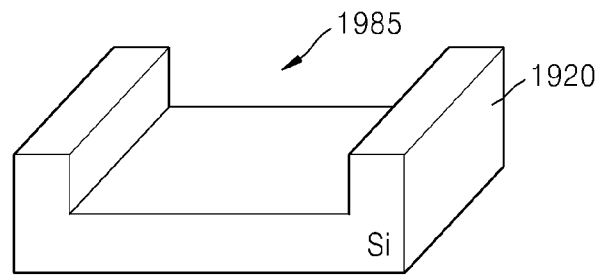
FIGS. 24A through 24F are schematic perspective views illustrating a method of manufacturing the coupler structure or device illustrated in FIG. 11, according to an embodiment of the inventive concept.

FIGS. 24A through 24F are schematic perspective views illustrating a method of manufacturing the coupler structure or device 1900 illustrated in FIG. 11, according to an embodiment of the inventive concept. Referring to FIG. 24A, a bulk semiconductor substrate 1920, such as a bulk silicon substrate, is provided. A trench 1985 having vertical sidewalls is formed in the bulk silicon substrate 1920 by selective etching. The depth of the trench 1985 is selected based on a desired thickness of the bottom cladding layer to be formed in the trench, and the desired height of the coupler and connected waveguide relative to the top surface of the substrate 1920.

Figure 24B:
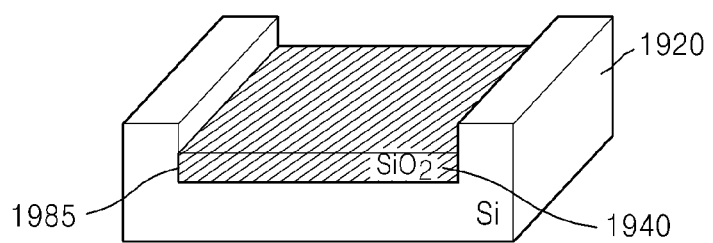

Referring to FIG. 24B, the bottom cladding layer 1940 is formed in the trench 1985 such that its top surface is below the top surface of the substrate 1620. The bottom cladding layer 1640 can be formed of for example, an insulating material such as silicon oxide, silicon nitride, or silicon oxynitride. The bottom cladding layer 1940 is formed to a predetermined thickness within the trench 1985 such that the top surface of the bottom cladding layer 1940 is below the top surface of the substrate 1920, such that the coupler structure and connected waveguide are recessed within the trench 1985. The thickness of the bottom cladding layer 1940 is determined based on desired performance characteristics of the coupler and the waveguide connected to the coupler.

Figure 24C:
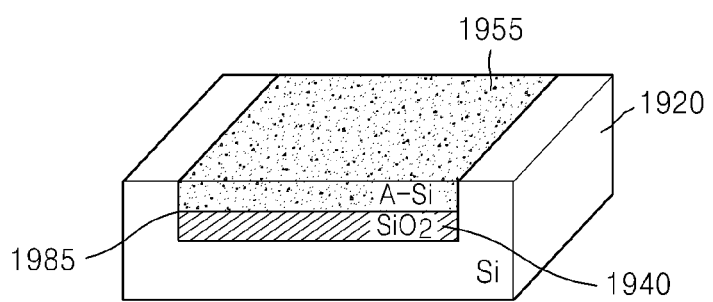
Figure 24D:
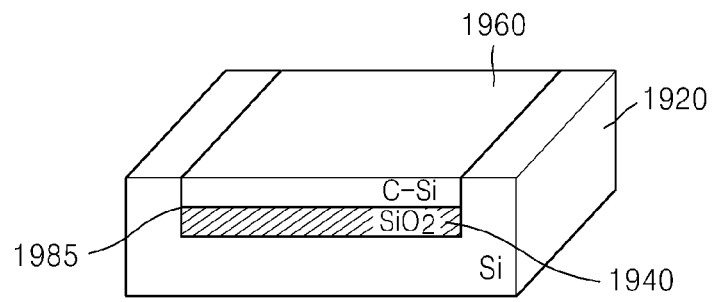

Referring to FIG. 24C, next, a layer of amorphous silicon 1955 is formed on the bottom cladding layer 1940 in the trench 1985. Referring to FIG. 24D, the layer of amorphous silicon 1955 is crystallized to transform the layer 1955 into a layer 1960 of defective single-crystalline silicon used for the core region of the coupler and the attached waveguide. The crystallization method used can be one of laser epitaxial growth (LEG), solid phase epitaxy (SPE), epitaxial lateral overgrowth (ELO), selective epitaxial growth (SEG) or solid phase crystallization (SPC).

Figure 24E:
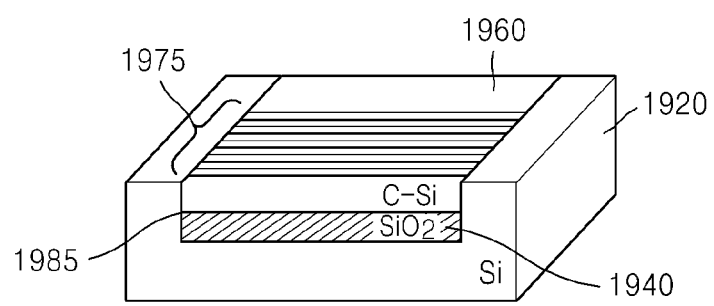

Referring to FIG. 24E, a mask made of photoresist and/or a hard mask material is formed on the crystallized silicon layer 1960 and patterned to the desired pattern of the grating 1975 to be formed on the core region of the coupler. The core region layer 1960 is etched using the patterned mask to form the grating 1975 in the core region layer 1960.

Figure 24F:
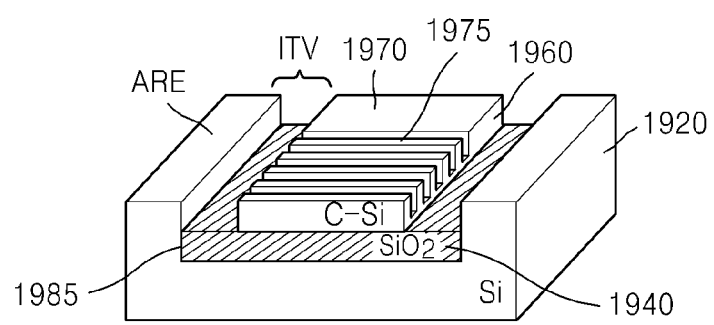

Referring to FIG. 24F, the core region layer 1960 is selectively etched to produce the final core region 1960 having the grating 1975 for the coupler. At the same time, the core region for the connected waveguide 1970 may be formed. The optional upper cladding layer 1180 may then be formed over the structure. The upper cladding layer 1180 may be made of the same material of which the bottom cladding layer 1940 is made.

It is noted that FIGS. 23A through 24F describe a process for fabricating the device 1600 of FIG. 10, and FIGS. 24A through 24F describe a process for fabricating the device 1900 of FIG. 11. The devices 1600 and 1900 may have substantially similar or identical structures. The differences between the two embodiments are primarily in their manufacturing processes, as described above in detail.

Figure 25A:
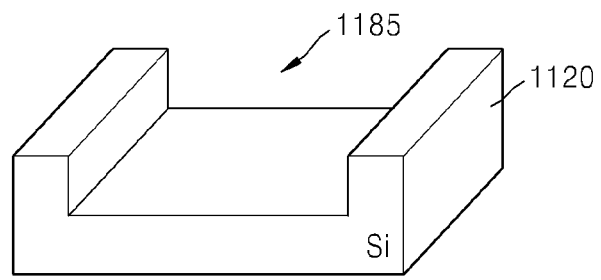
FIGS. 25A through 25E are schematic perspective views illustrating a method of manufacturing the coupler structure or device illustrated in FIG. 12, according to an embodiment of the inventive concept.

FIGS. 25A through 25E are schematic perspective views illustrating a method of manufacturing the coupler structure or device 11000 illustrated in FIG. 12, according to an embodiment of the inventive concept. Referring to FIG. 25A, a bulk semiconductor substrate 1120, such as a bulk silicon substrate, is provided. A trench 1185 having vertical sidewalls is formed in the bulk silicon substrate 1120 by selective etching. The depth of the trench 1185 is selected based on a desired thickness of the bottom cladding layer to be formed in the trench, which thickness is determined based on desired performance characteristics of the coupler and the waveguide connected to the coupler.

Figure 25B:
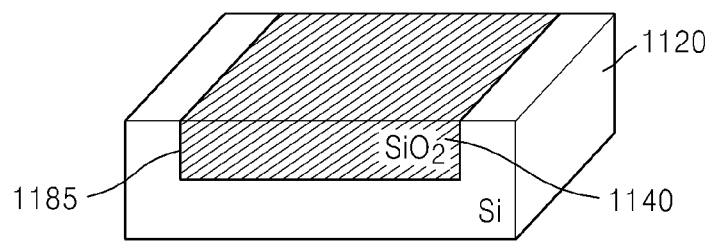

Referring to FIG. 25B, the bottom cladding layer 1140 is formed in the trench 1185 such that its top surface is even or level with the top surface of the substrate 1120. The bottom cladding layer 1140 can be formed of, for example, an insulating material such as silicon oxide, silicon nitride, or silicon oxynitride.

Figure 25C:
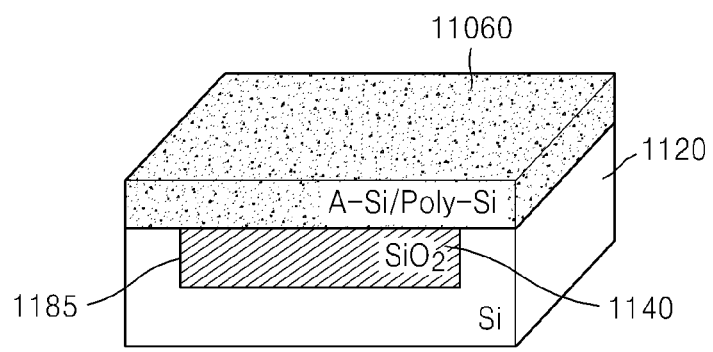
Figure 25D:
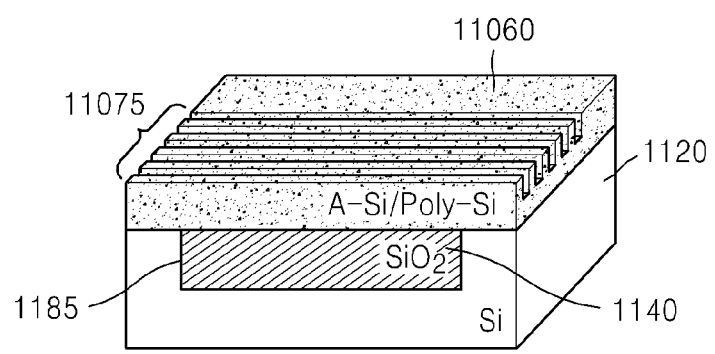

Referring to FIG. 25C, a layer of amorphous silicon or polysilicon 11060 is formed on the bottom cladding layer 1140 and the top surface of the substrate 1120. Referring to FIG. 25D, a mask made of photoresist and/or a hard mask material is formed on the layer 11060 and patterned to the desired pattern of the grating 11075 to be formed on the core region of the coupler. The core region layer 11060 is etched using the patterned mask to form the grating 11075 in the core region layer 11060.

Figure 25E:
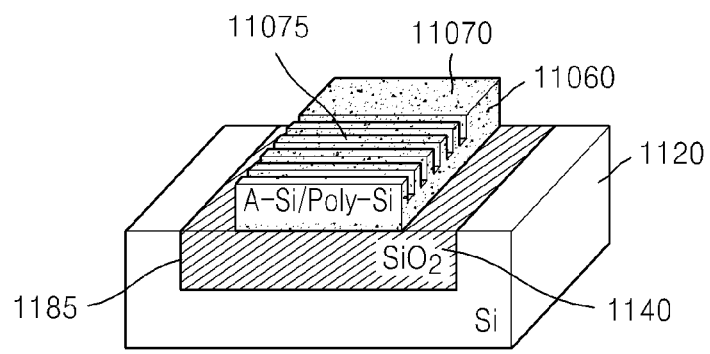

Referring to FIG. 25E, the core region layer 11060 is selectively etched to produce the final core region 11060 having the grating 11075 for the coupler. At the same time, the core region for the connected waveguide 11070 may be formed. The optional upper cladding layer 1180 may then be formed over the structure. The upper cladding layer 1180 may be made of the same material of which the bottom cladding layer 1140 is made.

As described above, the optical coupler structure and device of the inventive concept may include a reflective element, e.g., a Distributed Bragg Reflector (DBR), to improve optical coupling and transmission efficiency and reduce optical loss. The DBR can be formed in or under the coupler and/or the waveguide according to the inventive concept. As further described above, a DBR is a multiple-layer structure formed by alternating materials with different refractive indices. In the exemplary embodiments of the inventive concept described herein, the DBR structures are shown to have three layers, two of which are labelled as A and B and are separated by a third layer having a different index of refraction than the layers A and B. It will be understood that any number of layers can be used for the DBR, depending on the desired reflectivity of the DBR. The refractive indices of layers A and B are typically identical, but they can also be different, depending on the desired performance of the DBR.

In some embodiments, the DBR is formed on a portion of the bottom cladding layer isolating the DBR from the substrate. Another portion of the bottom cladding immediately under the core layer is formed on the DBR. This portion of the bottom cladding layer performs the same function as the bottom cladding in some embodiments in which the DBR is not formed. This layer is also used to make the optical wave reflected from the DBR constructively interfere with the optical wave directly outcoupled from the grating coupler by adjusting its thickness.

Figure 26A:
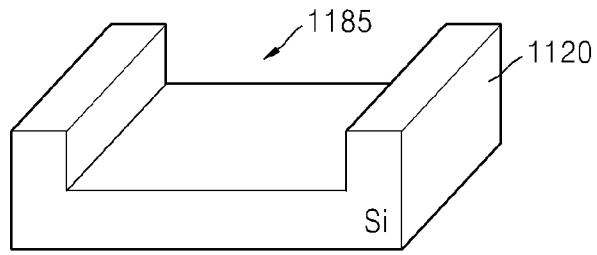
FIGS. 26A through 26I contain schematic perspective views illustrating a method of manufacturing the coupler structure or device illustrated in FIG. 13, according to an embodiment of the inventive concept.

FIGS. 26A through 26I contain schematic perspective views illustrating a method of manufacturing the coupler structure or device 1100A illustrated in FIG. 13, according to an embodiment of the inventive concept. Referring to FIG. 26A, a bulk semiconductor substrate 1120, such as a bulk silicon substrate, is provided. A trench 1185 having vertical sidewalls is formed in the bulk silicon substrate 1120 by selective etching. The depth of the trench 1185 is selected based on a desired thickness of the bottom cladding layer to be formed in the trench, which thickness is determined based on desired performance characteristics of the coupler and the waveguide connected to the coupler.

Figure 26B:
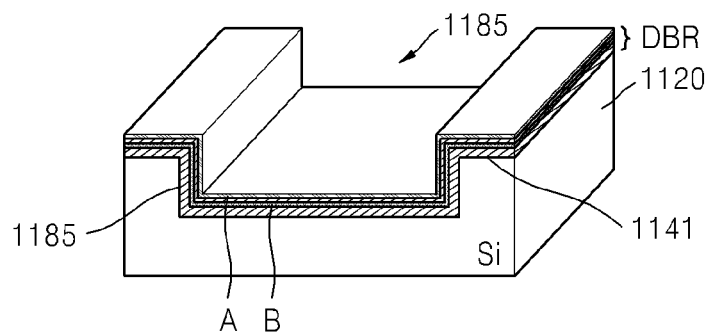
Figure 26C:
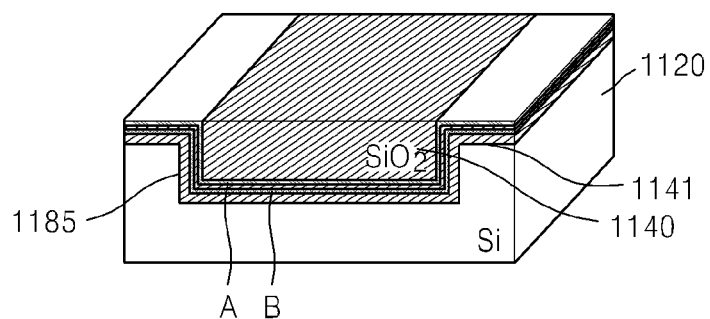
Figure 26D:
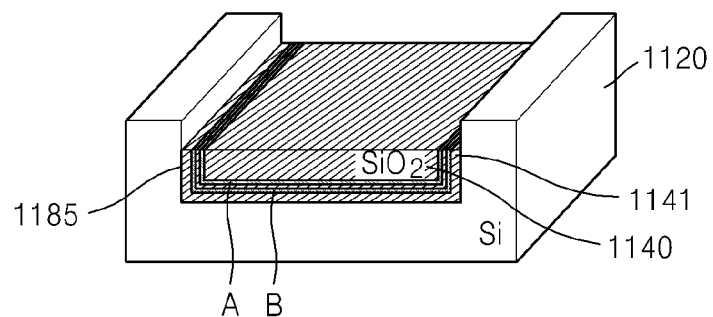
Figure 26E:
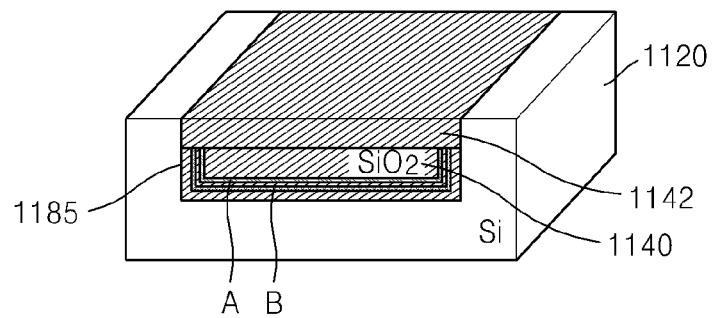

Referring to FIG. 26B, a layer 1141 of material that can be the same material as the bottom cladding layer, is formed in the trench 1185. The DBR structure, which includes the three-layer structure of the layers A and B separated by a layer of material having a different index of refraction than the layers A and B, is formed on the layer 1141. Referring to FIG. 26C, the bottom cladding layer 1140 is formed in the trench 1185 over the DBR such that its top surface is even or level with the top surface of the substrate 1120. The bottom cladding layer 1140 can be formed of for example, an insulating material such as silicon oxide, silicon nitride, or silicon oxynitride. Referring to FIG. 26D, The bottom cladding layer 1140, layer 1141 and sidewall portions of the DBR are etched to a predetermined thickness based on the desired configuration and performance characteristics of the device. Referring to FIG. 26E, an additional cladding layer 1142 is formed over the bottom cladding layer 1140, the layer 1141 and the DBR to fill up the trench such that the top surface of the additional cladding layer 1142 is even or level with the top surface of the substrate.

Figure 26F:
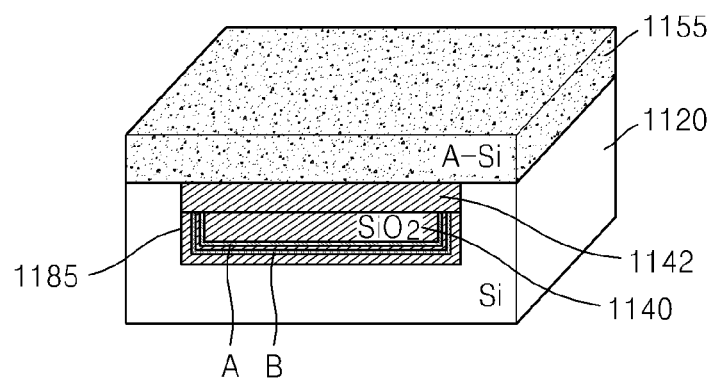
Figure 26G:
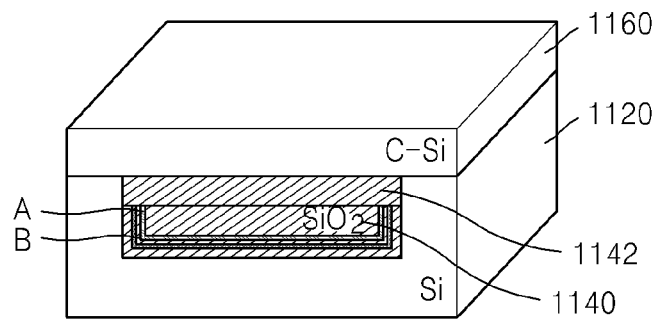

Referring to FIG. 26F, a layer of amorphous silicon 1155 is formed over the structure. Referring to FIG. 26G, the layer of amorphous silicon 1155 is crystallized to transform the layer 1155 into a layer 1160 of defective single-crystalline silicon used for the core region of the coupler and the connected waveguide. The crystallization method used can be one of laser epitaxial growth (LEG), solid phase epitaxy (SPE), epitaxial lateral overgrowth (ELO), selective epitaxial growth (SEG) or solid phase crystallization (SPC).

Figure 26H:
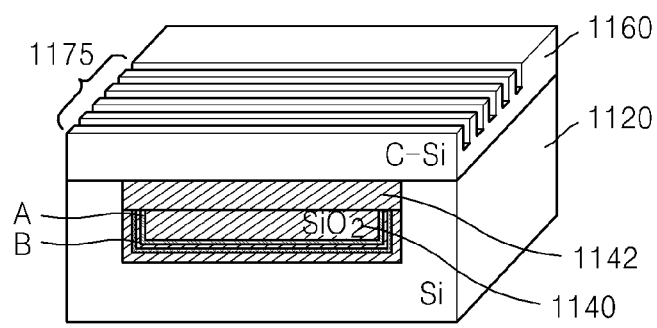

Referring to FIG. 26H, a mask made of photoresist and/or a hard mask material is formed on the crystallized silicon layer 1160 and patterned to the desired pattern of the grating 1175 to be formed on the core region of the coupler. The core region layer 1160 is etched using the patterned mask to form the grating 1175 in the core region layer 1160.

Figure 26I:
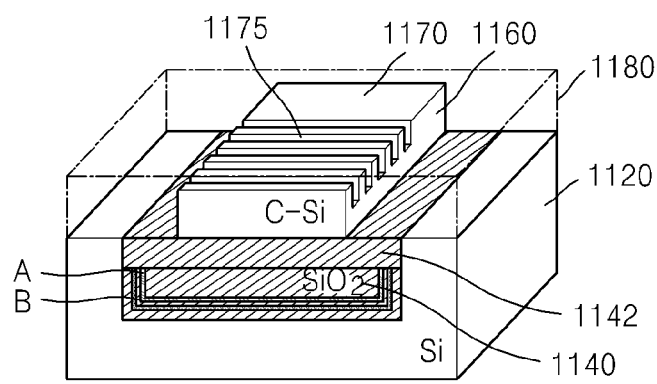
Figure 27A:
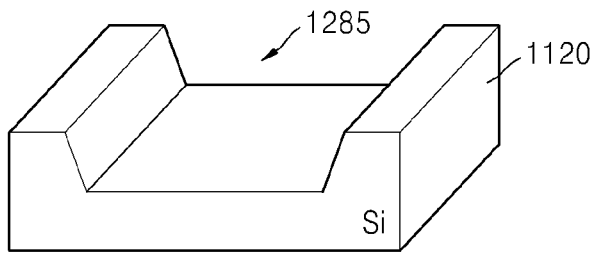
FIGS. 27A through 27G contain schematic perspective views illustrating a method of manufacturing the coupler structure or device illustrated in FIG. 14, according to an embodiment of the inventive concept.
Figure 27B:
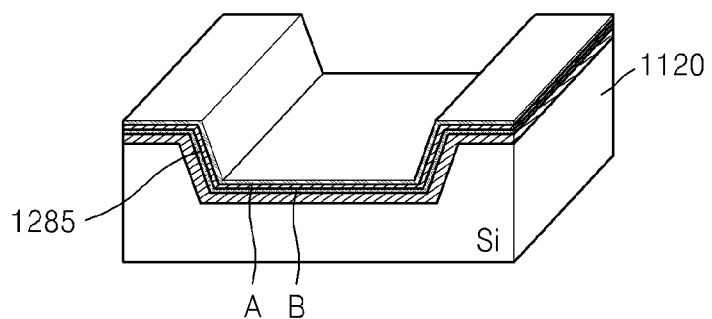
Figure 27C:
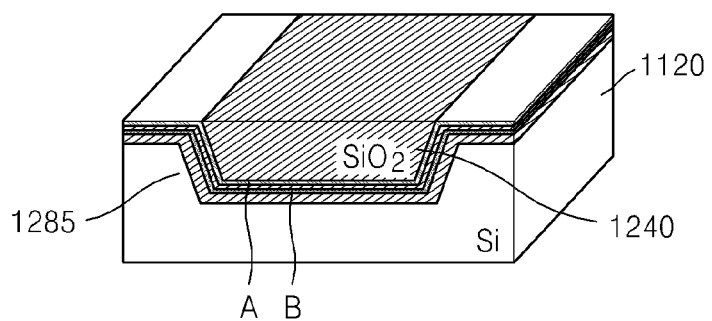
Figure 27D:
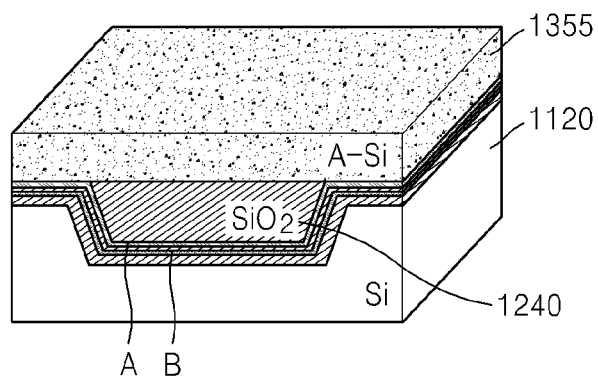
Figure 27E:
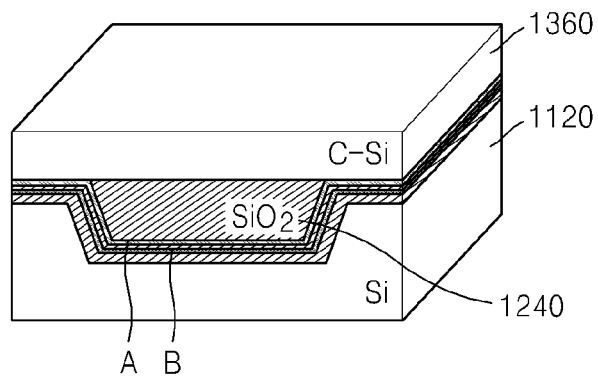
Figure 27F:
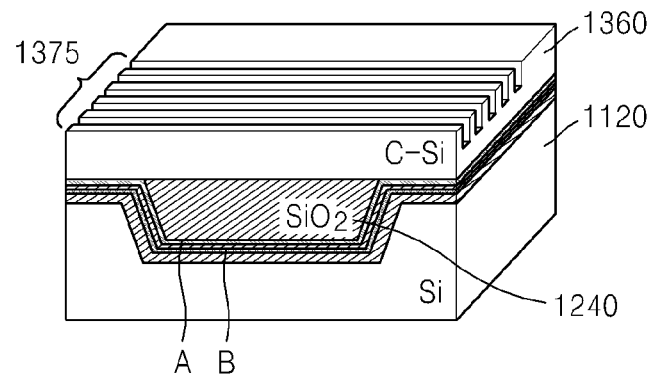
Figure 27G:
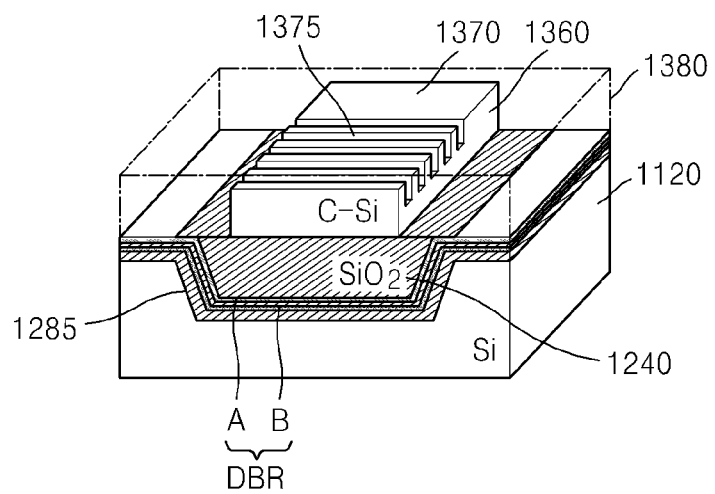

Referring to FIG. 26I, the core region layer 1160 is selectively etched to produce the final core region 1160 having the grating 1175 for the coupler. At the same time, the core region for the connected waveguide 1170 may be formed. The optional upper cladding layer 1180 may then be formed over the structure. The upper cladding layer 1180 may be made of the same material of which the bottom cladding layer 1140 is made.

FIGS. 27A through 27G contain schematic perspective views illustrating a method of manufacturing the coupler structure or device 1200A illustrated in FIG. 14, according to an embodiment of the inventive concept. The method of FIGS. 27A through 27G are analogous to the method illustrated and described above in connection with FIGS. 26A through 26I and the method illustrated and described above in connection with FIGS. 21A through 21F. One of skill in the art would understand the method of manufacturing illustrated in FIGS. 27A through 27G from FIGS. 21A through 21F and 26A through 26I and the detailed description thereof contained herein. Accordingly, detailed description of the method illustrated in FIGS. 27A through 27G will not be repeated.

Figure 28A:
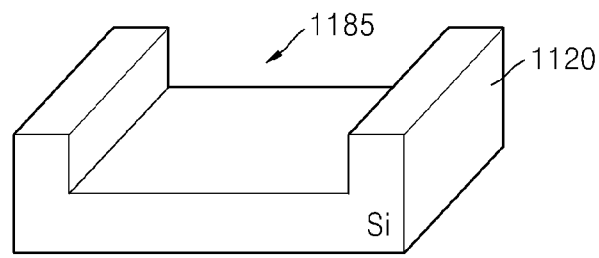
FIGS. 28A through 28I contain schematic perspective views illustrating a method of manufacturing the coupler structure or device illustrated in FIG. 15, according to an embodiment of the inventive concept.
Figure 28B:
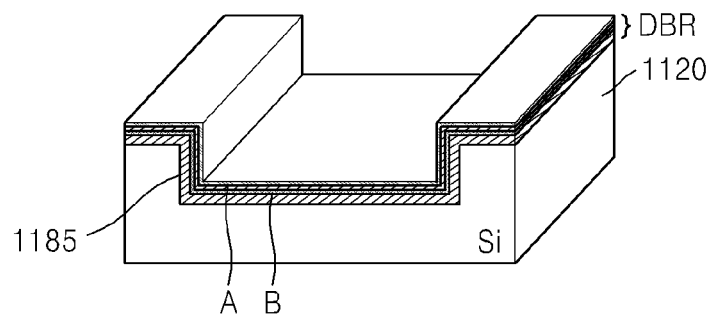
Figure 28C:
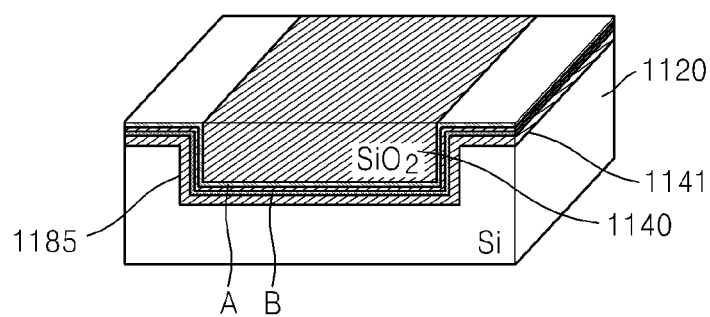
Figure 28D:
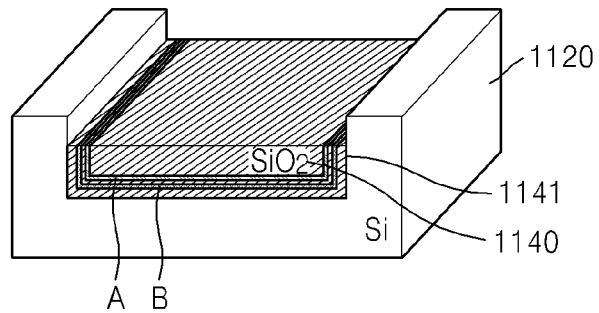
Figure 28E:
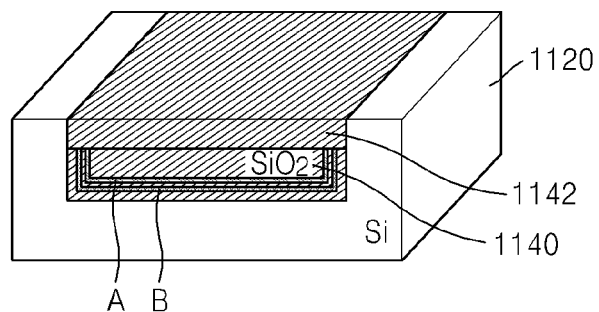
Figure 28F:
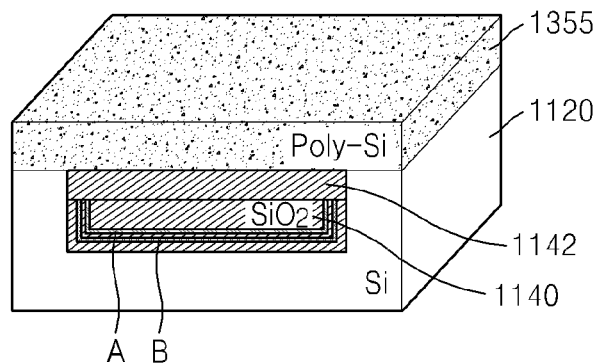
Figure 28G:
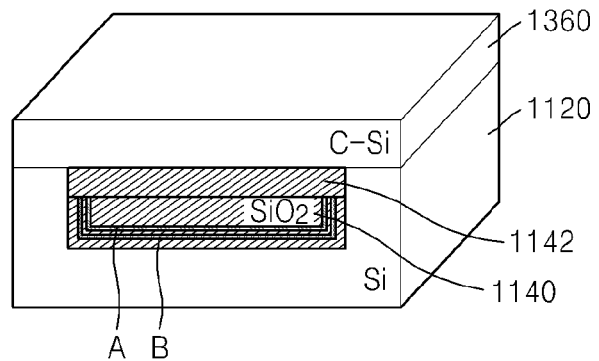
Figure 28H:
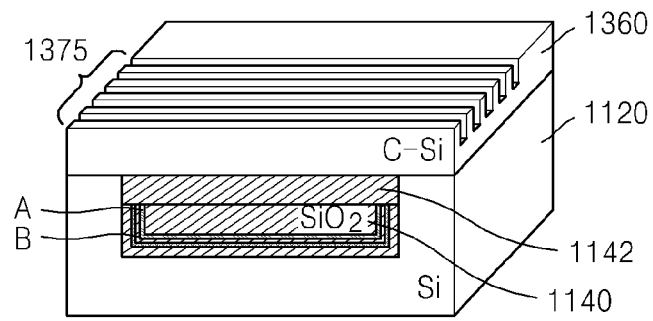
Figure 28I:
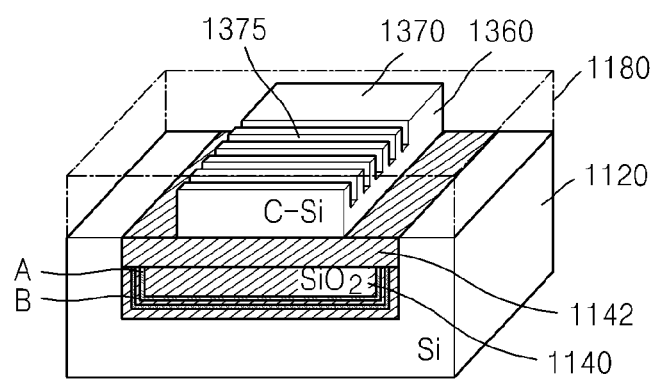
Figure 29A:
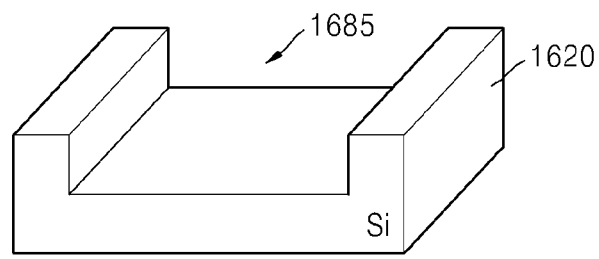
FIGS. 29A through 29H contain schematic perspective views illustrating a method of manufacturing the coupler structure or device illustrated in FIG. 16, according to an embodiment of the inventive concept.
Figure 29B:
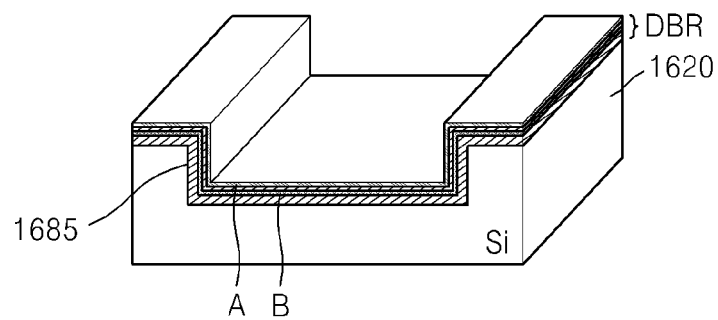
Figure 29C:
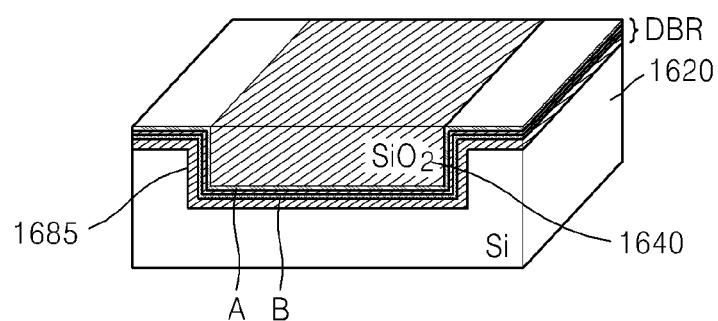
Figure 29D:
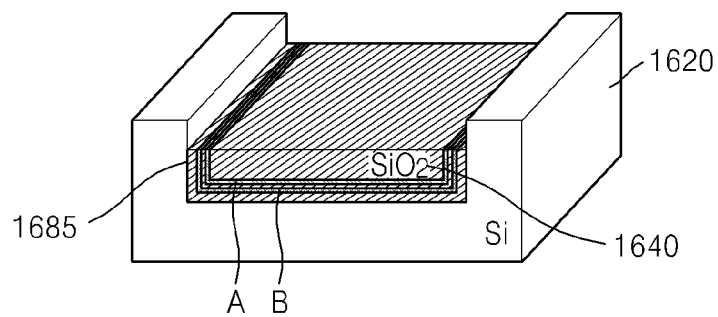
Figure 29E:
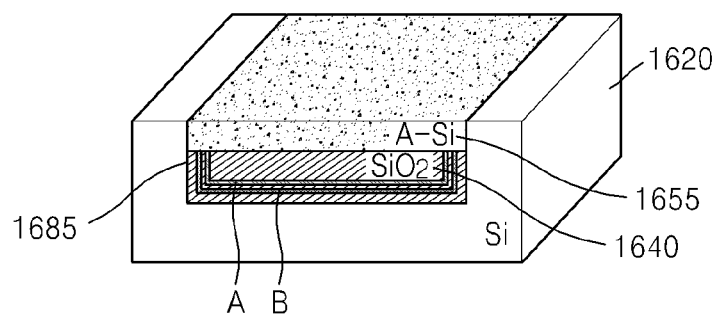
Figure 29F:
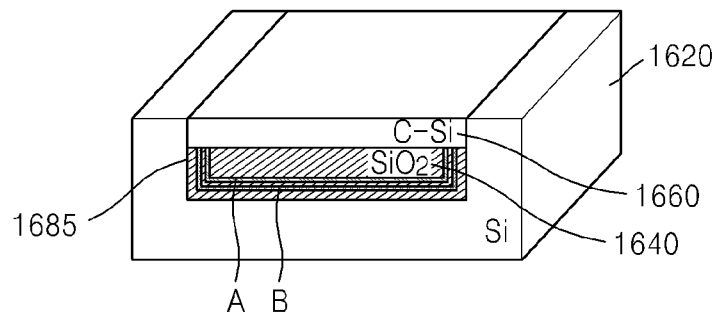
Figure 29G:
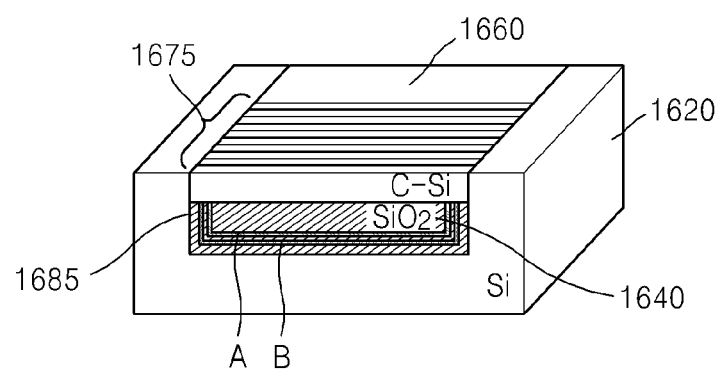
Figure 29H:
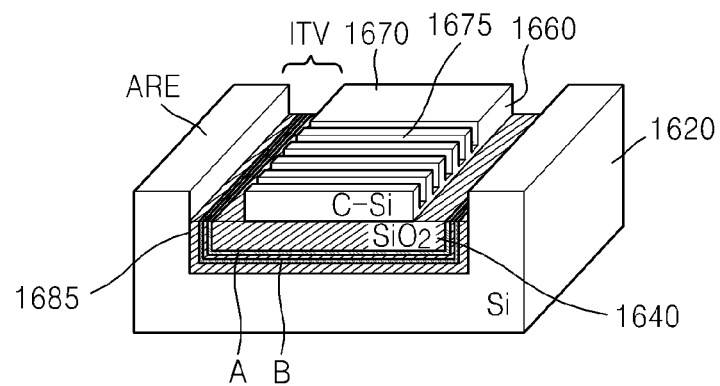
Figure 30A:
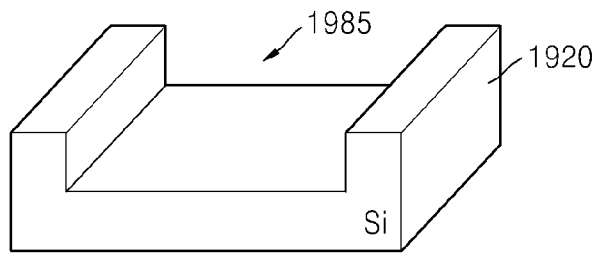
FIGS. 30A through 30H contain schematic perspective views illustrating a method of manufacturing the coupler structure or device illustrated in FIG. 17, according to an embodiment of the inventive concept.
Figure 30B:
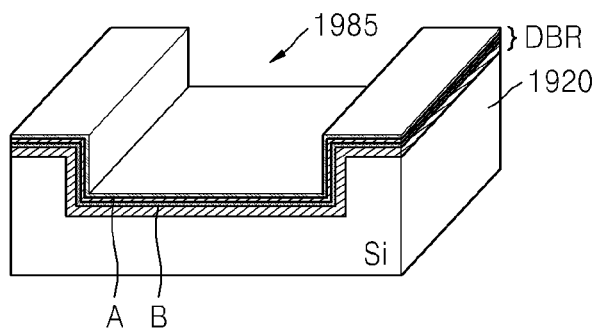
Figure 30C:
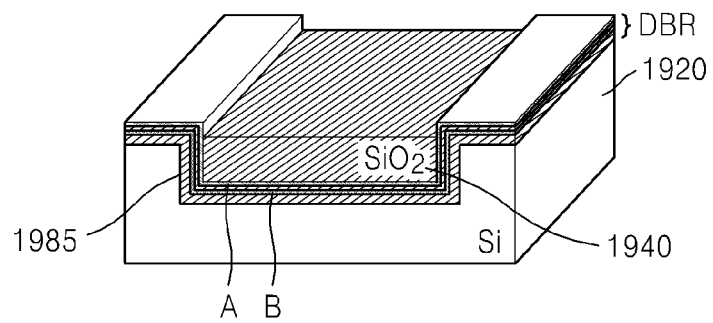
Figure 30D:
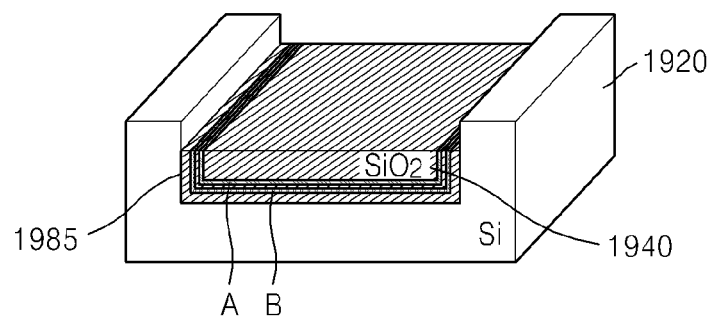
Figure 30E:
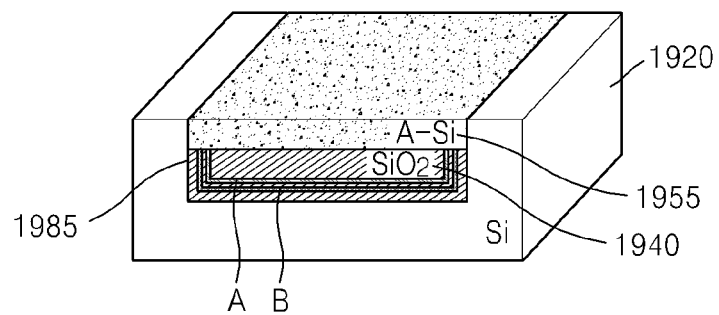
Figure 30F:
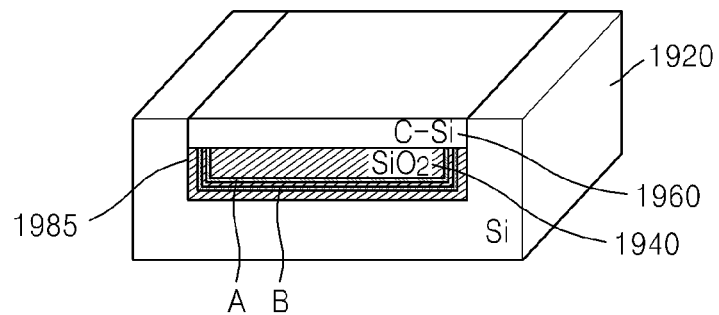
Figure 30G:
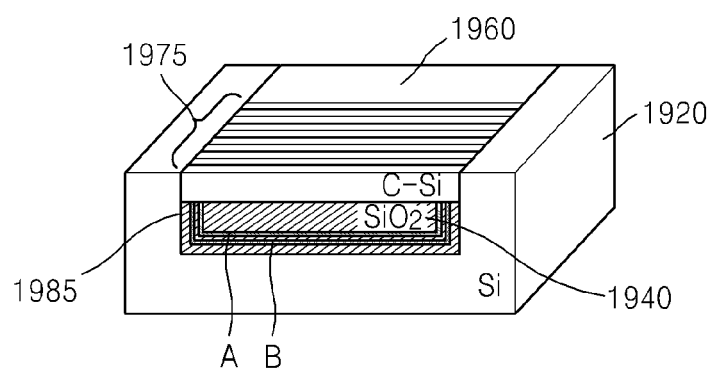
Figure 30H:
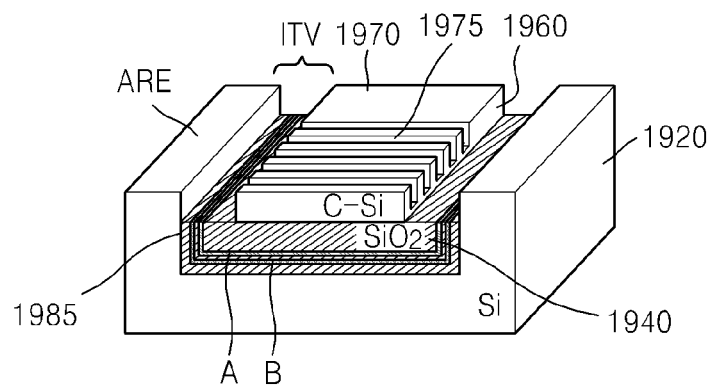

FIGS. 28A through 28I contain schematic perspective views illustrating a method of manufacturing the coupler structure or device 1300A illustrated in FIG. 15, according to an embodiment of the inventive concept. The steps used to manufacture the embodiment of FIG. 15, illustrated in FIGS. 28A through 28I, are the same as those described above and illustrated in connection with FIGS. 26A through 26I, with the exception of FIGS. 28F and 28G. As shown in FIG. 28F, a layer 1355 of polysilicon is formed instead of the layer 1155 of amorphous silicon shown in FIG. 26C. As shown in FIG. 28G, the layer 1355 is crystallized to form the layer 1360 of defective single-crystalline silicon. Since the remaining steps are the same as those described above in connection with FIGS. 26A through 26I, except as noted above, detailed description of the remaining steps in the method of manufacturing the embodiment of FIG. 15 will not be repeated.

FIGS. 29A through 29H contain schematic perspective views illustrating a method of manufacturing the coupler structure or device 1600A illustrated in FIG. 16, according to an embodiment of the inventive concept. The method steps of FIGS. 29A through 29H are analogous to the method steps illustrated and described above in connection with FIGS. 26A through 26I and the method steps illustrated and described above in connection with FIGS. 23A through 23F. One of skill in the art would understand the method of manufacturing illustrated in FIGS. 29A through 29H from FIGS. 23A through 23F and 26A through 26I and the detailed description thereof contained herein. Accordingly, detailed description of the method illustrated in FIGS. 29A through 29H will not be repeated.

FIGS. 30A through 30H contain schematic perspective views illustrating a method of manufacturing the coupler structure or device 1900A illustrated in FIG. 17, according to an embodiment of the inventive concept. The method steps of FIGS. 30A through 30H are analogous to the method steps illustrated and described above in connection with FIGS. 26A through 26I and the method steps illustrated and described above in connection with FIGS. 24A through 24F. One of skill in the art would understand the method of manufacturing illustrated in FIGS. 30A through 30H from FIGS. 24A through 24F and 26A through 26I and the detailed description thereof contained herein. Accordingly, detailed description of the method illustrated in FIGS. 30A through 30H will not be repeated.

It is noted that the embodiment of the coupler structure or device 11000A illustrated in FIG. 18 is manufactured in the same manner as the embodiment illustrated in FIGS. 30A through 30H, except that in the embodiment 11000A, the core layer 11060 is amorphous silicon or polysilicon, and the layer 11060 is not crystallized after it is formed.

Figure 31:
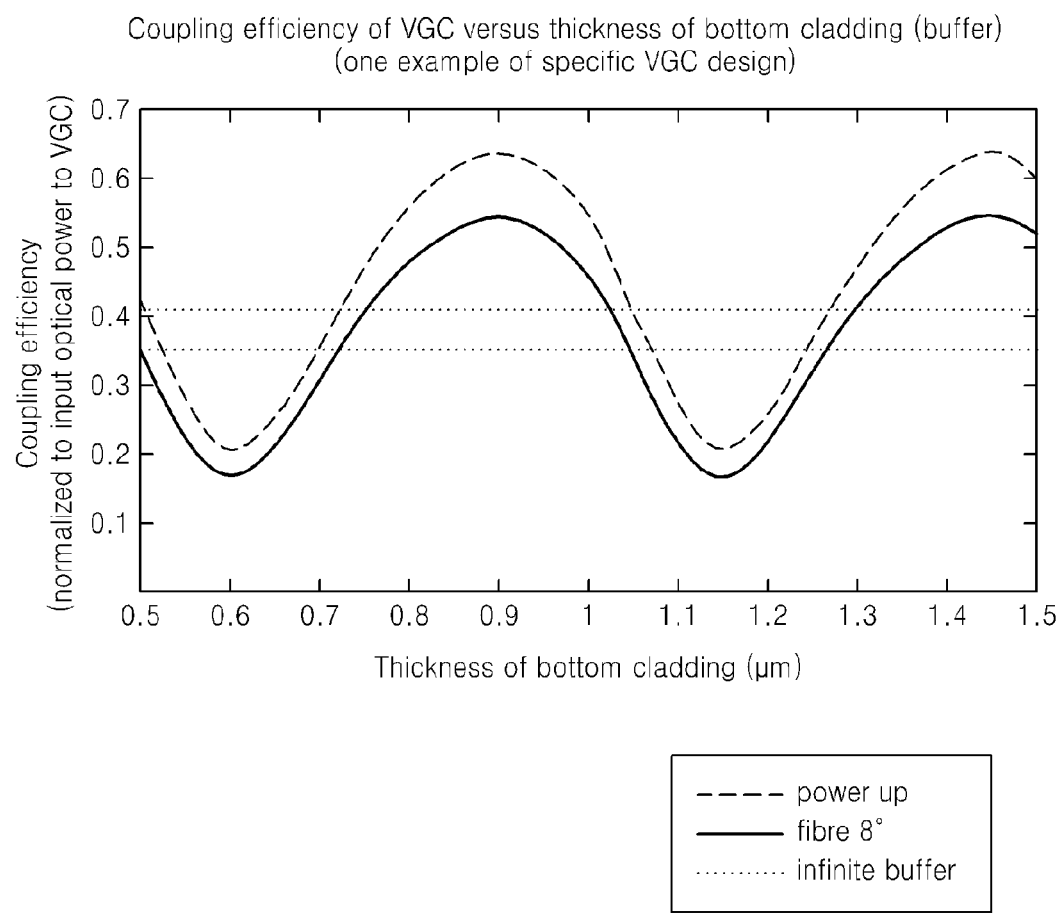
FIG. 31 contains a graph of optical coupling efficiency versus thickness of the bottom cladding layer, which is applicable to the embodiments of the inventive concept described herein.

The vertical grating coupler (VGC) devices of embodiments of the inventive concept described herein exhibit variation in optical coupling efficiency with thickness of the bottom cladding layer. FIG. 31 contains a graph of optical coupling efficiency versus thickness of the bottom cladding layer, which is applicable to the embodiments of the inventive concept described herein. In the graph of FIG. 31, the wavelength was assumed to by 1.58 µm, a grating period of 630 nm, and a grating etch depth of 70 nm. The results illustrated in the graph of FIG. 31 vary with variations in these parameters.

The optical waveguide and coupler of the inventive concept are applicable to many circuits, modules and systems in which optical communication and transfer of optical signals are used. For example, the devices and methods of the inventive concept are applicable to interconnection systems and devices used in memory systems. That is, the optical devices and methods of the inventive concept can be used to implement optical communication between a central processing unit (CPU) and one or more memory modules, between a plurality of memory modules, between a plurality of memory devices on one or more memory modules, and/or between a plurality of circuits formed on a single memory device.

Figure 32:
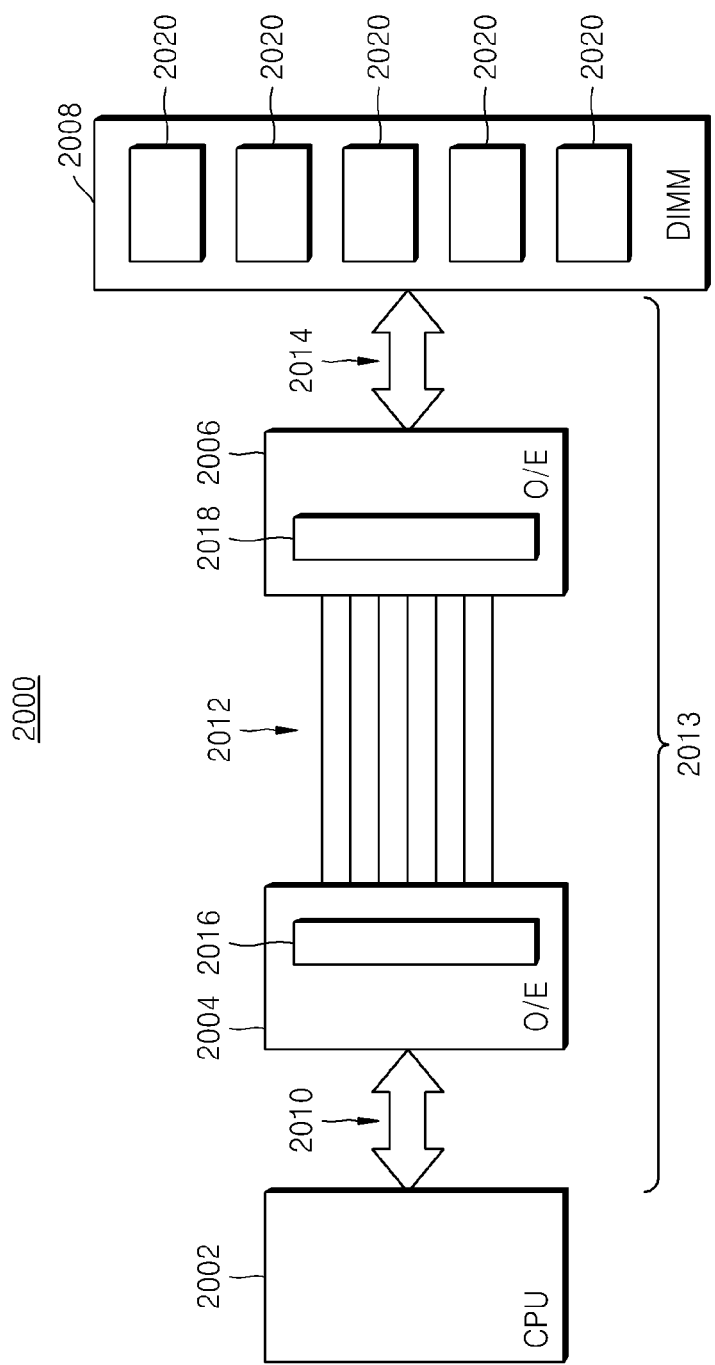
FIG. 32 contains a schematic block diagram of a processing system to which the optical waveguide and optical coupler devices and methods can be applied, according to an embodiment of the inventive concept.

FIG. 32 contains a schematic block diagram of a processing system 2000 to which the optical waveguide and optical coupler devices and methods can be applied, according to an embodiment of the inventive concept. Referring to FIG. 32, the system 2000 includes a CPU 2002 communicating with at least one memory module 2008 via an interconnection system 2013. The memory module 2008 can be, for example, a dual inline memory module (DIMM). Specifically, the DIMM 2008 can be, for example, a DRAM DIMM 2008. The DIMM 2008 includes a plurality of individual memory circuits 2020, for example, DRAM memory circuits, mounted thereon.

In this embodiment, the CPU 2002 and the DIMM 2008 generate and process electrical signals. The interconnection system 2013 includes optical communication channels 2012 which carry optical signals between the CPU 2002 and the DIMM 2008, and which can be, for example, optical fibers. Because the CPU 2002 and the DIMM 2008 use electrical signals, electrical-to-optical conversion is required to convert the electrical signals of the CPU 2008 and DIMM 2008 to optical signals for transfer over the optical communication channels 2012. Also, optical-to-electrical conversion is required to convert the optical signals on the optical communication channels 2012 to electrical signals for processing by the CPU 2002 and the DIMM 2008. To that end, the interconnection system 2013 also includes optical/electrical (O/E) conversion units 2004 and 2006 at opposite ends of the optical communication channels 2012. The CPU 2002 transfers electrical signals to and from the O/E conversion unit 2004 via an electrical bus 2010, and the DIMM 2008 transfers electrical signals to and from the O/E conversion unit 2006 via an electrical bus 2014.

In this embodiment, the O/E conversion units 2004 and 2006 include the optical communication devices of the inventive concept, which are collectively referred to in FIGS. 32 as 2016 and 2018, respectively. That is, the optical circuits 2016 and 2018 include one of more of the optical coupler devices of the inventive concept described herein, which send and receive optical signals to and from the optical communication channels 2012, e.g., optical fibers. The optical circuits 2016 and 2018 also include one or more of the optical waveguide devices of the inventive concept described herein. The optical couplers in the O/E conversion units 2004 and 2006 couple the optical signals on the optical communication channels 2012 to and from one or more of the optical waveguide devices of the inventive concept. The optical couplers and waveguides of the inventive concept may be integrated in one or more semiconductor integrated circuits formed on one or more bulk semiconductor substrates as described above in detail, along with other circuits used to implement the O/E conversion operations of the O/E conversion units 2004 and 2006.

Figure 33:
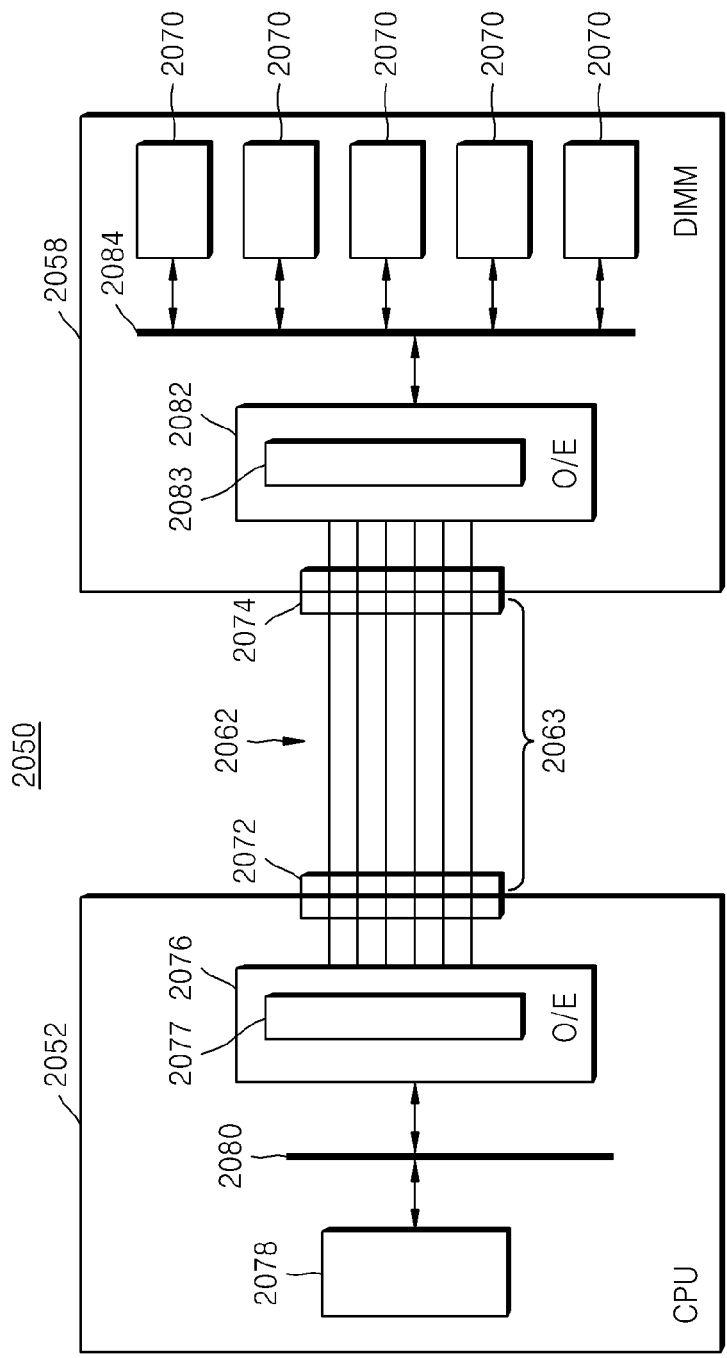
FIG. 33 contains a schematic block diagram of a processing system to which the optical waveguide and optical coupler devices and methods can be applied, according to another embodiment of the inventive concept.

FIG. 33 contains a schematic block diagram of a processing system 2050 to which the optical waveguide and optical coupler devices and methods can be applied, according to another embodiment of the inventive concept. Referring to FIG. 33, the system 2050 includes a CPU 2052 communicating with at least one memory module 2058 via an interconnection system 2063. The memory module 2058 can be, for example, a dual inline memory module (DIMM). Specifically, the DIMM 2058 can be, for example, a DRAM DIMM 2058. The DIMM 2058 includes a plurality of individual memory circuits 2070, for example, DRAM memory circuits, mounted thereon.

In this embodiment, the CPU 2052 and the DIMM 2058 generate and process both electrical signals and optical signals. Unlike the embodiment of FIG. 32, in the embodiment of FIG. 33, the O/E conversion operation can be carried out on CPU 2052 and/or on the DIMM 2058. Accordingly, the CPU 2052 can include an O/E conversion unit 2076, and the DIMM 2058 can include an O/E conversion unit 2082. The electrical circuitry in the CPU 2052, generally referred to as 2078, communicates electrical signals to and from the O/E conversion unit 2076 via an electrical bus 2080. The electrical circuitry in the DIMM 2058, including the plurality of memory circuits 2070, communicates electrical signals to and from the O/E conversion unit 2082 via an electrical bus 2084.

The interconnection system 2063 includes optical communication channels 2062 which carry optical signals between the CPU 2052 and the DIMM 2058, and which can be, for example, optical fibers. The CPU 2052 includes an optical connector 2072 through which optical signals are transferred to and from the optical communication channels 2062 from and to the O/E conversion unit 2076. The DIMM 2058 includes an optical connector 2074 through which optical signals are transferred to and from the optical communication channels 2062 from and to the O/E conversion unit 2082.

In this embodiment, the O/E conversion units 2076 and 2082 include the optical communication devices of the inventive concept, which are collectively referred to in FIGS. 33 as 2077 and 2083, respectively. That is, the optical circuits 2077 and 2083 include one of more of the optical coupler devices of the inventive concept described herein, which send and receive optical signals to and from the optical communication channels 2062, e.g., optical fibers. The optical circuits 2077 and 2083 also include one or more of the optical waveguide devices of the inventive concept described herein. The optical couplers in the O/E conversion units 2076 and 2082 couple the optical signals on the optical communication channels 2062 to and from one or more of the optical waveguide devices of the inventive concept. The optical couplers and waveguides of the inventive concept may be integrated in one or more semiconductor integrated circuits formed on one or more bulk semiconductor substrates as described above in detail, along with other circuits used to implement the O/E conversion operations of the O/E conversion units 2076 and 2082.

Figure 34:
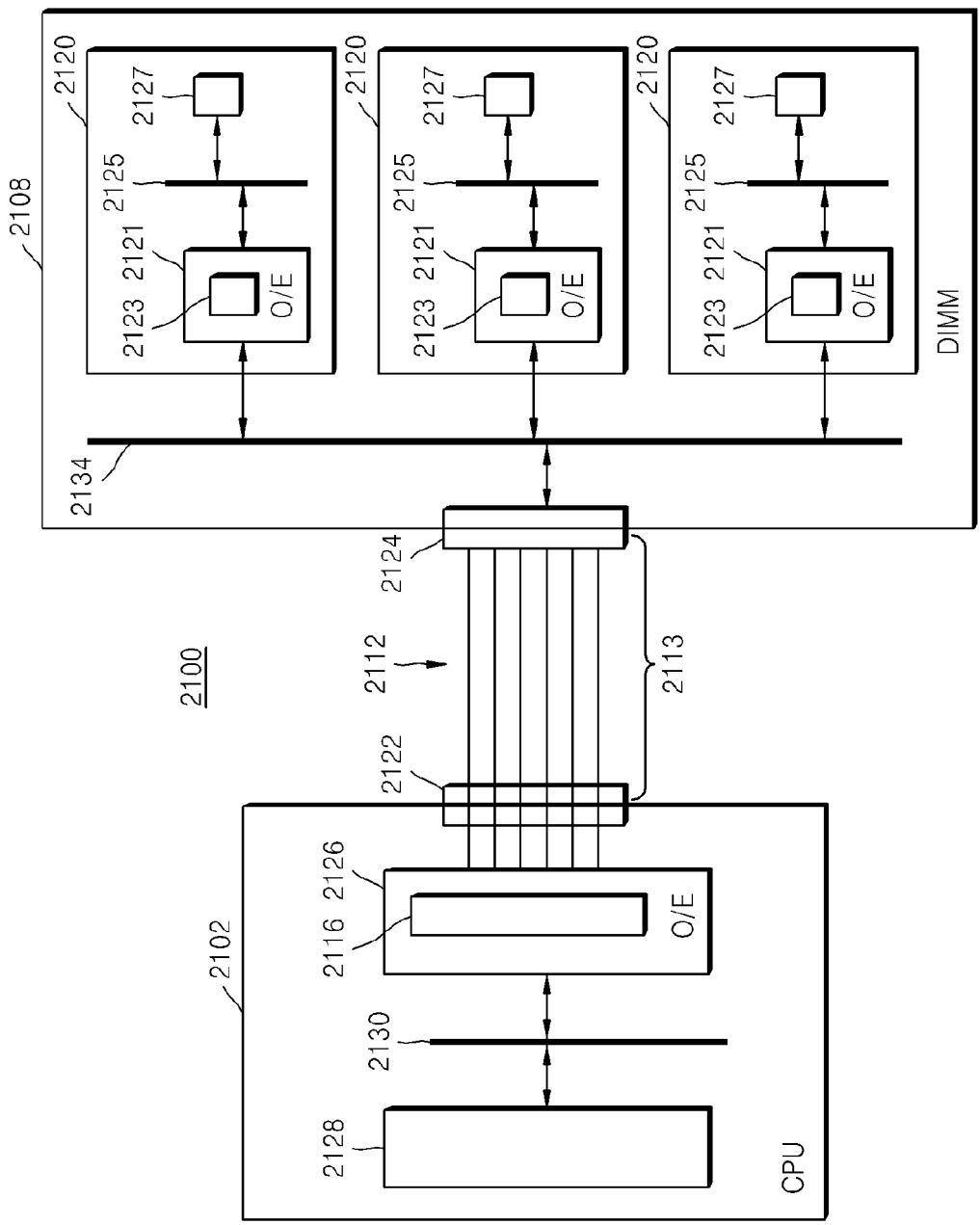
FIG. 34 contains a schematic block diagram of a processing system to which the optical waveguide and optical coupler devices and methods can be applied, according to another embodiment of the inventive concept.

FIG. 34 contains a schematic block diagram of a processing system 2100 to which the optical waveguide and optical coupler devices and methods can be applied, according to another embodiment of the inventive concept. Referring to FIG. 34, the system 2100 includes a CPU 2102 communicating with at least one memory module 2108 via an interconnection system 2113. The memory module 2108 can be, for example, a dual inline memory module (DIMM). Specifically, the DIMM 2108 can be, for example, a DRAM DIMM 2108. The DIMM 2108 includes a plurality of individual memory circuits 2120, for example, DRAM memory circuits, mounted thereon.

In this embodiment, the CPU 2102 and the DIMM 2108 generate and process both electrical signals and optical signals. Unlike the embodiment of FIG. 32, in the embodiment of FIG. 34, the O/E conversion operation can be carried out on CPU 2102 and/or on the DIMM 2010, specifically, on each of the DIMM memory circuits 2120. Accordingly, the CPU 2102 can include an O/E conversion unit 2126, and each of the memory circuits 2120 can include an O/E conversion unit

2121. The electrical circuitry in the CPU 2102, generally referred to as 2128, communicates electrical signals to and from the O/E conversion unit 2126 via an electrical bus 2130. The electrical circuitry in the each of the memory circuits 2120, referred to generally by 2127, communicates electrical signals to and from the respective O/E conversion unit 2121 via an electrical bus 2125.

The interconnection system 2113 includes optical communication channels 2112 which carry optical signals between the CPU 2102 and the DIMM 2108, and which can be, for example, optical fibers. The CPU 2102 includes an optical connector 2122 through which optical signals are transferred to and from the optical communication channels 2112 from and to the O/E conversion unit 2126. The DIMM 2108 includes an optical connector 2124 through which optical signals are transferred to and from the optical communication channels 2112 from and to the O/E conversion units 2121, via an optical bus 2134. The optical bus 2134 can include, for example, optical fibers and/or optical waveguides and optical couplers formed on or in the substrate of the DIMM 2108.

In this embodiment, the O/E conversion units 2126 and 2121 include the optical communication devices of the inventive concept, which are collectively referred to in FIGS. 34 as 2116 and 2123, respectively. That is, the optical circuits 2116 and 2123 include one or more of the optical coupler devices of the inventive concept described herein, which send and receive optical signals to and from the optical communication channels 2112, e.g., optical fibers. The optical circuits 2116 and 2123 also include one or more of the optical waveguide devices of the inventive concept described herein. The optical couplers in the O/E conversion units 2116 and 2123 couple the optical signals on the optical communication channels 2112 to and from one or more of the optical waveguide devices of the inventive concept. The optical couplers and waveguides of the inventive concept may be integrated in one or more semiconductor integrated circuits formed on one or more bulk semiconductor substrates as described above in detail, along with other circuits used to implement the O/E conversion operations of the O/E conversion units 2126 and 2121. Specifically, the optical couplers and waveguides of the inventive concept may be integrated on the same chip or die as the individual memory circuits 2120, for example, DRAM memory circuits.

Figure 35:
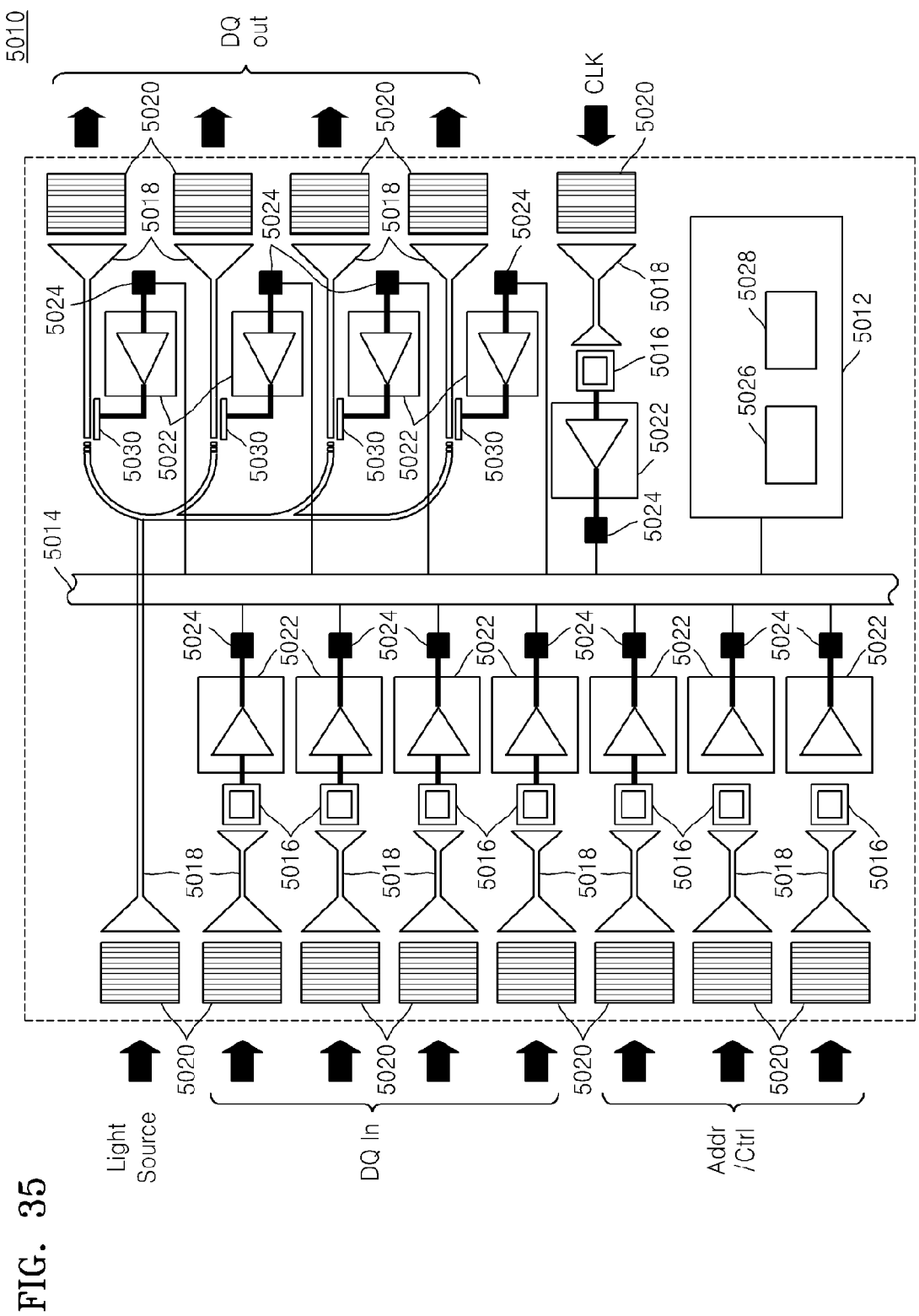
FIG. 35 is a schematic functional diagram of a memory circuit, for example, a DRAM memory circuit, having the optical coupler and waveguide devices of the inventive concept integrated on the same chip or die as the chip or die on which the memory circuit is formed.

FIG. 35 is a schematic functional diagram of a memory circuit 5010, for example, a DRAM memory circuit, having the optical coupler and waveguide devices of the inventive concept integrated on the same chip or die as the chip or die on which the memory circuit is formed. The memory circuit 5010 includes the electrical circuitry 5012 for the DRAM memory, including a memory cell array 5026 and peripheral and other associated electrical circuitry 5028. All of the electrical circuitry on the device 5010 is connected to and communicates via one or more electrical buses via electrical contact pads 5024. The one or more electrical buses on the device are generally identified in FIG. 35 by electrical bus 5014.

Optical signals, including input data signals (DQ In), address and control signals (Addr/Ctrl), a clock signal (CLK), and a light source are optically coupled to the device 5010, e.g., from optical fibers, by optical coupling devices 5020 according to one or more embodiments of the inventive concept. Optical signals from the optical couplers 5020 are coupled to optical waveguides 5018 according to one or more embodiments of the inventive concept. The optical waveguides 5018 transfer the optical signals throughout the device via an optical bus.

Optical signals input to the device are coupled by the waveguides 5018 to photodetectors 5016 which demodulate the optical signals and convert them to electrical signals. The demodulated and converted electrical signals are input to CMOS driver circuits 5022 which drive the electrical signals on the electrical bus 5014.

Optical signals being transmitted from the device 5010, for example output data signals DQ Out, are generated from a continuous unmodulated optical signal coupled to the device 5010 from the light source. Electrical signals from the various electrical components of the device 5010 are used to modulate the continuous optical signal in optical modulators 5030. The electrical signals are routed from the electrical bus 5014 to the modulators 5030, which use the electrical signals to create modulated optical signals, which are transmitted along the optical waveguides 5018 and are coupled by coupling devices 5020 to optical fibers.

Figure 36:
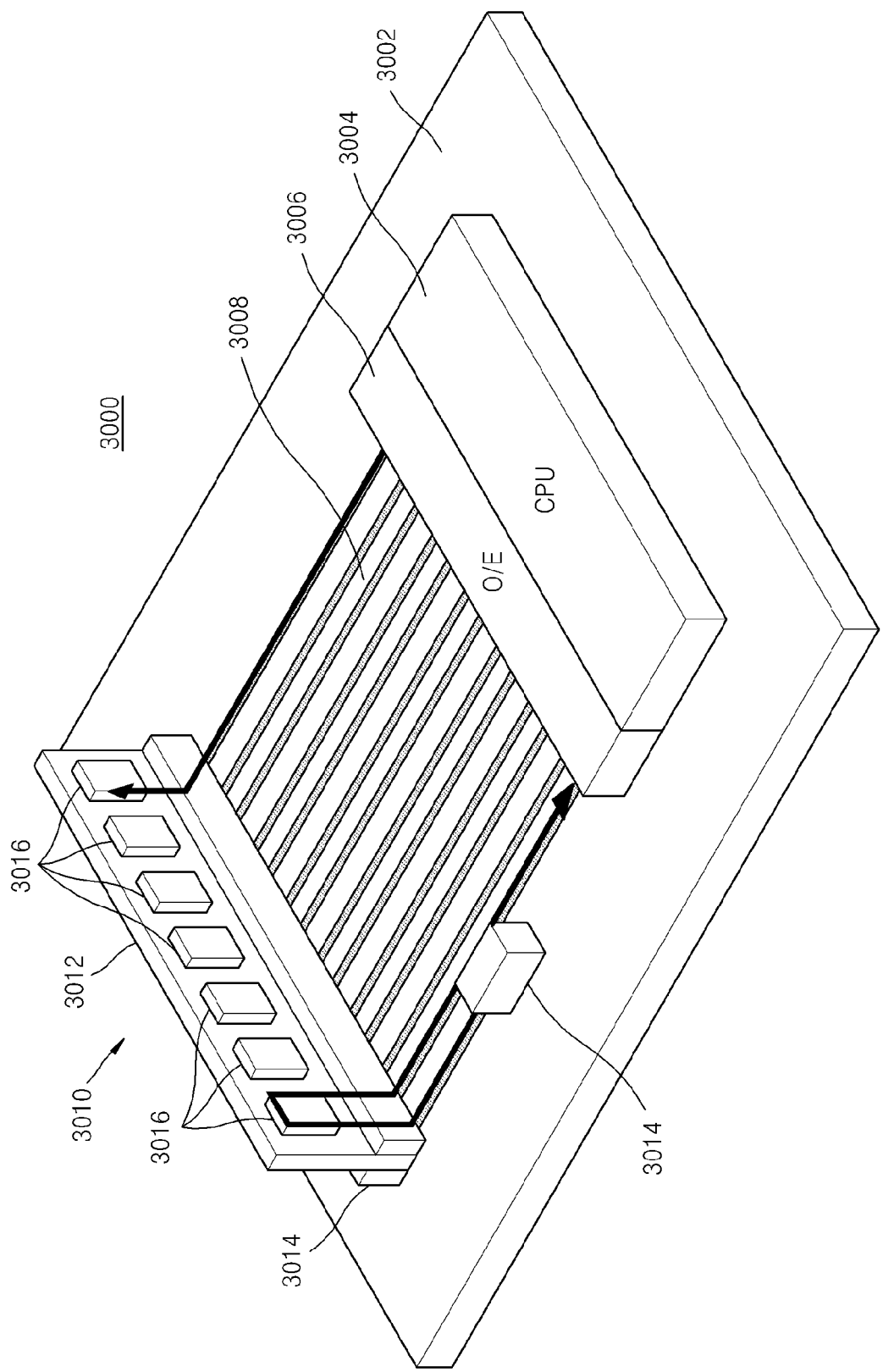
FIG. 36 is a schematic perspective view of a portion of a computing or processing system to which the optical waveguide and optical coupler of the inventive concept can be applied, according to an embodiment of the inventive concept.

FIG. 36 is a schematic perspective view of a portion of a computing or processing system 3000 to which the optical waveguide and optical coupler of the inventive concept can be applied, according to an embodiment of the inventive concept. Referring to FIG. 36, the system 3000 includes a main or mother printed circuit board (PCB) 3002, which can be an optical PCB. A CPU 3004 is mounted on the PCB 3002 and is coupled to an O/E conversion unit 3006, which is also mounted on the PCB 3002. The O/E conversion unit 3006 is coupled to an optical interconnection system 3008, which can include one or more optical waveguides formed on or in the PCB 3002. The optical interconnection system 3008 is connected to a DIMM 3010, for example, a DRAM DIMM, through an optical socket or connector 3014. The DIMM 3010 includes multiple circuits 3016, such as DRAM memory circuits, mounted on a DIMM PCB 3012, which can be an optical PCB. A light source 3014, such as a laser diode, provides light for the system 3000.

Each memory circuit 3016 includes an optical signal input/output (I/O) interface (I/F) unit, which, as described above in detail, provides E/O conversion for the circuit. Each I/O I/F unit also provides the necessary optical devices, such as the optical waveguides and couplers according to the inventive concept, to provide transfer of optical signals throughout the device.

The source 3014 provides a supply of preferably collimated light to the E/O conversion circuitry in the memory devices 3016, which modulate the source light according to data signals to be transmitted to the CPU 3004. The modulated optical data signals are transferred to the CPU 3004 along the waveguides of the optical interconnection system 3008 via the O/E conversion unit 3006 coupled to the CPU 3004. The source 3014 also provides light to the E/O conversion unit 3006 such that data signals from the CPU 3004 can be transferred to the DIMM 3010 via the optical interconnection system 3008.

Figure 37:
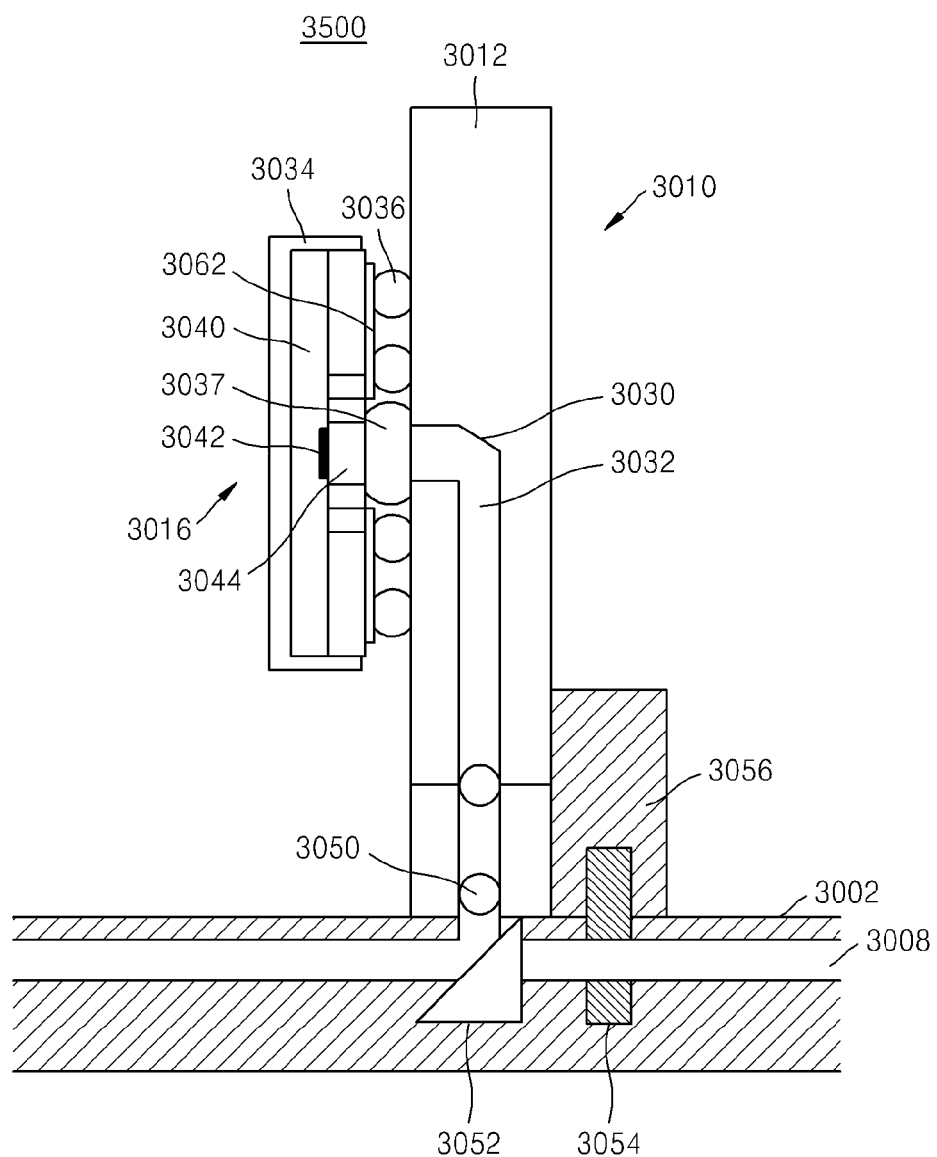
FIG. 37 contains a schematic cross-sectional view of a portion of a computing or processing system to which the optical waveguide and optical coupler of the inventive concept can be applied, according to an embodiment of the inventive concept.

FIG. 37 contains a schematic cross-sectional view of a portion of a computing or processing system 3500 to which the optical waveguide and optical coupler of the inventive concept can be applied, according to an embodiment of the inventive concept. Referring to FIG. 37, the system 3500 includes a DIMM 3010 mounted on and optically coupled to a main or mother PCB 3002. A mounting member 3056, which may be part of a socket 3014, includes a guide pin 3054 captured in a guide hole on the mother board 3002. The DIMM 3010 includes a circuit device 3016, such as a DRAM memory device, mounted on the DIMM optical PCB 3012. The circuit device 3016 may be the device according to the inventive concept in which the optical waveguide and/or optical coupler of the inventive concept is integrated with other circuitry, such as DRAM memory circuitry, on a single chip or die.

The device 3016 includes a circuit chip or die 3040, such as a DRAM chip or die, which includes an optical I/O section 3042, which is integrated according to silicon photonics n the chip or die 3040. The I/O section 3042 may include one or more optical waveguide and/or coupler structures according to the inventive concept. Optical signals are coupled to the chip 3040 via the I/O section 3042. The I/O section 3042 is located over a transparent window section 3044 which allows optical signals to pass to and from the I/O section 3042. Light also passes though an index matching glue 3037 which minimizes reflection of light passing to and from the I/O section 3042 while providing attachment of the device 3016 to the top of the optical PCB 3012.

Optical signals to and from the I/O section 3042 of the device travel through a waveguide 3032 formed in the optical PCB 3012. The waveguide 3032 may include a 90 degree bend under the device 3016 and may include a 45 degree reflector 3030 to direct optical signals between the I/O section 3042 and the waveguide 3032.

The DIMM 3010 is optically coupled to the mother PCB 3002 by a micro ball lens array 3050, which conducts optical signals between the waveguide 3032 formed in the optical PCB 3012 of the DIMM 3010 and another waveguide 3008 formed in the optical mother PCB 3002. A partially reflective element 3052 directs the optical signals between the waveguide 3008 and the waveguide 3032.

The device 3016 may also be electrically and mechanically coupled to the PCB 3012 by solder balls 3036 and metal lines 3062. The device is encapsulated in a polymer mold material 3034.

Figure 38A:
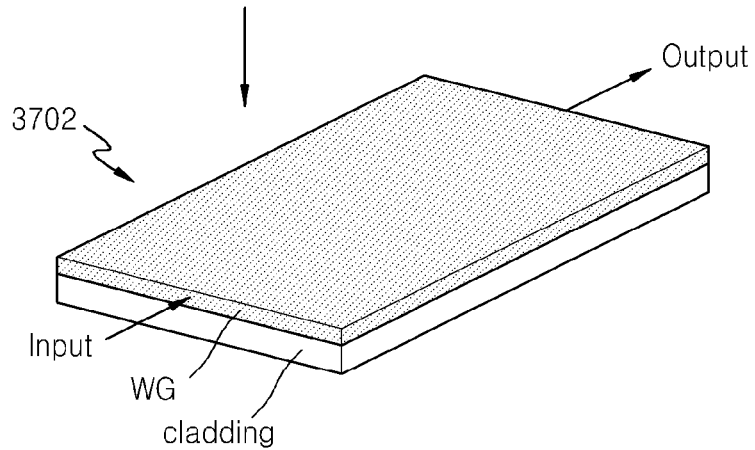
FIGS. 38A through 38C are schematic perspective views of optical interconnection, e.g., waveguide, structures to which the inventive concept is applicable.
Figure 38B:
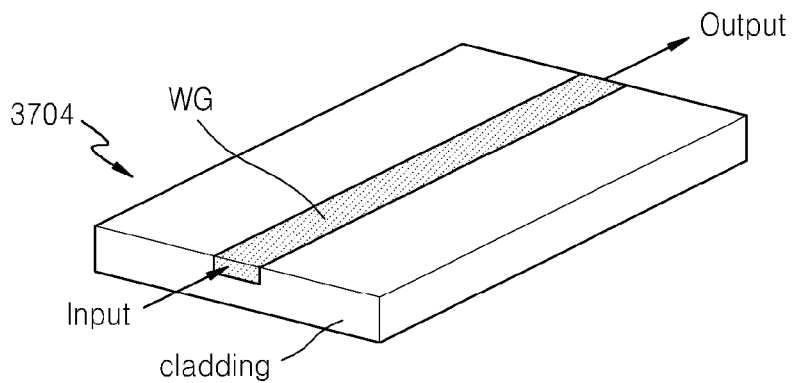
Figure 38C:
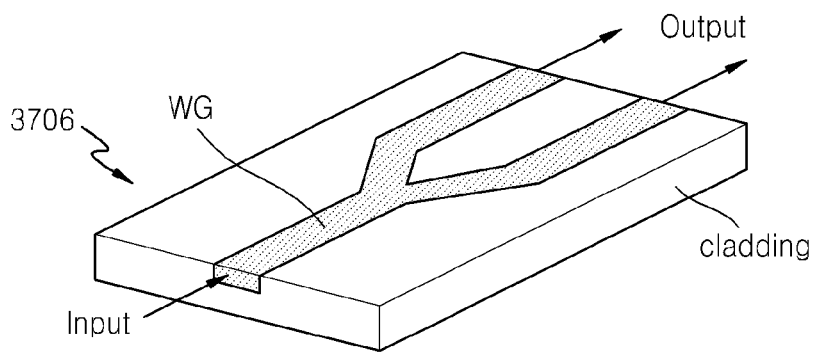

The optical devices of the inventive concept described herein are applicable to all types of optical communication and interconnection devices and systems. Although line-type waveguide structures have been described for the purpose of illustrating the inventive concept, the inventive concept is also applicable to other types of structures. FIGS. 38A through 38C are schematic perspective views of optical interconnection, e.g., waveguide, structures to which the inventive concept is applicable. FIG. 38A illustrates a planar type waveguide structure 3702; FIG. 38B illustrates a line-type waveguide structure 3704; and FIG. 38C illustrates an optical splitter structure 3706. All of the structures include a core region (labelled WG) through which optical signals propagate and a cladding region having a lower index of refraction than the core region to confine the optical signals within the core region.

Figure 39:
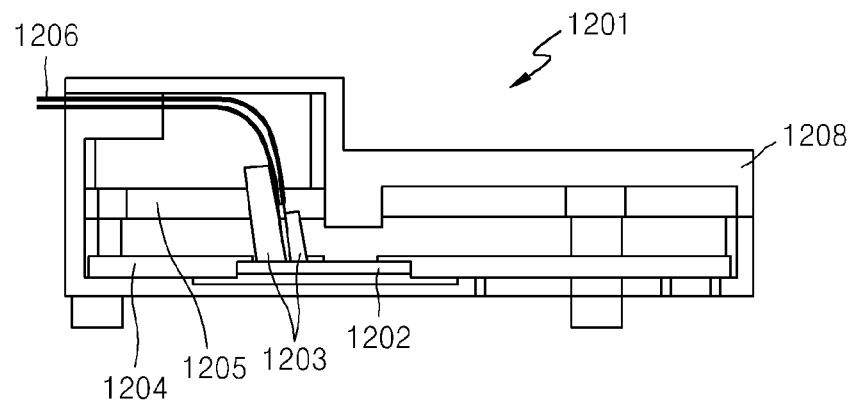
FIG. 39 is a schematic cross-sectional view of a packaged device which includes the optical devices according to embodiments of the inventive concept.

FIG. 39 is a schematic cross-sectional view of a packaged device 1201 which includes the optical devices according to embodiments of the inventive concept. The packaged device 1200 includes a printed circuit board 1204 on which an integrated circuit chip or device 1202, according to embodiments of the inventive concept, is mounted. The integrated circuit device 1202 can include one or more of the optical waveguide and/or optical coupler devices of the inventive concept integrated with other electrical integrated circuits, e.g., Si photonics circuits, on the circuit die. The printed circuit board 1204 is mounted within an integrated circuit package 1208.

Optical signals to and from the integrated circuit device 1202 are coupled to the device 1202 by one or more optical fibers 1206. The ends of the fibers 1206 are coupled to the device 1202 by optical coupling devices according to embodiments of the inventive concept described herein. A frame 1205 and 1203 within the package holds the fibers 1206 stationary and at the appropriate angle with respect to the integrated device 1202.

Figure 40:
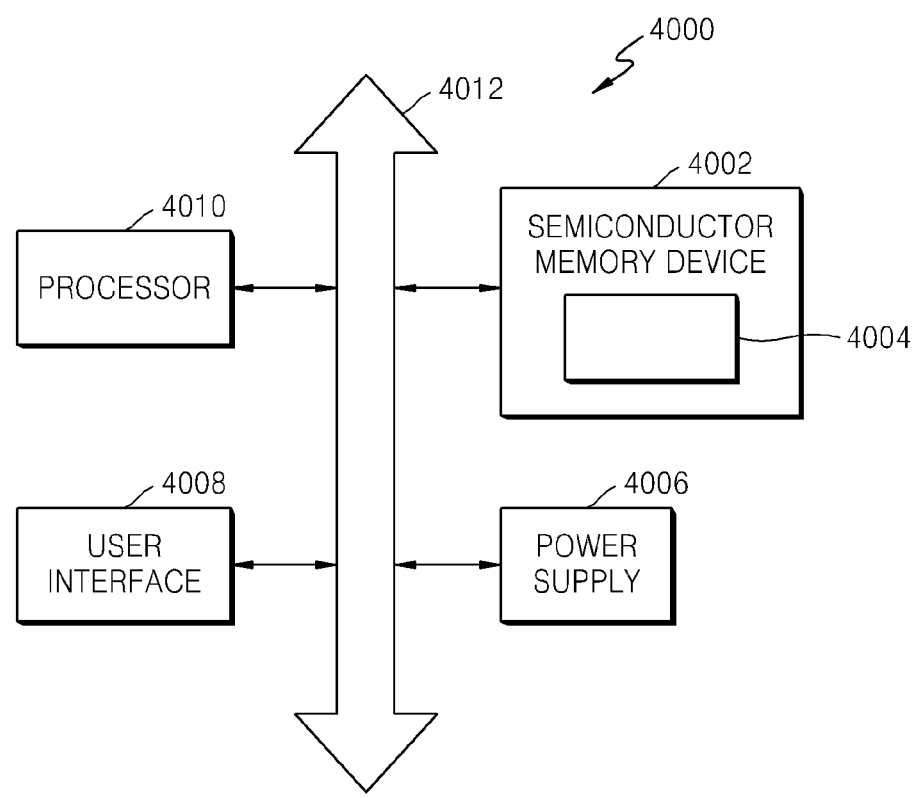
FIG. 40 is a schematic block diagram of a general processing, communication or display system to which the inventive concept is applicable.

The present invention is applicable to any type of processing system, display system, communication system or other such system in which signals can be transferred optically. FIG. 40 is a schematic block diagram of a general processing, communication or display system 4000 to which the inventive concept is applicable. Referring to FIG. 40, the system 4000 includes a processor 4010 which communicates optically with the other components of the system 4000 via an optical bus 4012. The processor 4010 can include O/E conversion circuitry which includes one or more of the optical waveguide and coupler devices according to the inventive concept. One or more semiconductor memory devices 4002 are also coupled optically to the optical bus 4012. The memory devices can include O/E conversion circuitry which includes one or more of the optical waveguide and coupler devices according to the inventive concept. A power supply 4006 can also be coupled to the system bus 4012. A user interface 4008 provides input/output from/to a user.

The present inventive concept has been described herein as being fabricated on or in a bulk semiconductor substrate, in particular, a bulk silicon substrate. The present inventive concept is not limited to optical devices fabricated in bulk silicon. Other materials can be used. For example, other semiconductor materials such as germanium can be used as the substrate for the integrated optical devices of the inventive concept.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An optical device, comprising:
   a trench having a substantially flat bottom surface formed in a semiconductor substrate;
   a first cladding layer disposed in the trench, the first cladding layer having a flat top surface extending entirely from one sidewall of the trench to an opposite sidewall of the trench; and
   at least one core region disposed above only a portion of the first cladding layer.

2. The optical device of claim 1, wherein the semiconductor substrate comprises bulk single crystal silicon and the trench includes sidewalls that are substantially perpendicular to a top surface of the semiconductor substrate.

3. The optical device of claim 2, wherein the optical device includes at least one waveguide structure and at least one optical coupler structure, a first sidewall of the core region is a distance d1 from a first sidewall of the trench, and a second sidewall of the core region is a distance d2 from a second sidewall of the trench.

4. The optical device of claim 3, wherein distances d1 and d2 are greater than about 0.27 μm, and a leakage loss in the waveguide is less than 1 dB/mm.

5. The optical device of claim 3, wherein a top surface of the first cladding layer is lower than the top surface of the semiconductor substrate, and distances d1 and d2 are greater than about 0.35 μm, and a leakage loss in the waveguide is less than 1 dB/mm.

6. The optical device of claim 3, wherein:
   the waveguide structure is coupled to the optical coupler structure, the optical coupler structure comprising at least one of a grating disposed in a portion of a top surface of the first cladding region, a vertical grating coupler, an optical beam direction changing device, an optical transceiver, and an optical-to-electrical conversion device; and the optical coupler structure includes a top surface disposed substantially coplanar with a top surface of the waveguide structure.

7. The optical device of claim 1, further comprising a reflective element at least one of disposed adjacent to the first cladding layer and disposed in the first cladding layer, and comprising at least one of a metallic reflector, a Bragg reflector, a distributed Bragg reflector, and a structure including at least a first and a second material layer, each contacting a third material layer having a different index of refraction from the first and second material layers.

8. The optical device of claim 1, further comprising a second cladding layer disposed to cover at least a portion of a top surface and sidewalls of the core region.

9. The optical device of claim 1, wherein the core region comprises at least one of defective single-crystal silicon, single-crystal silicon, large-grain polycrystalline silicon, and crystallized amorphous silicon.

10. An optical device, comprising:
a trench disposed in a bulk single-crystal silicon, the trench sidewalls being one of substantially perpendicular to a surface of the silicon substrate, and sloping outwardly to have a greater trench width at the surface than at a flat bottom of the trench;
a first cladding layer disposed in the trench having a flat top surface that is one of substantially coplanar with, below, and above the surface of the silicon substrate, the first cladding layer having the flat top surface extending entirely from one sidewall of the trench to an opposite sidewall of the trench;
a core region comprising at least one of defective single-crystal silicon, single-crystal silicon, large-grain polycrystalline silicon, and crystallized amorphous silicon disposed above only a portion of the first cladding layer, wherein the core region is disposed to provide at least one waveguide coupled to at least one vertical optical coupler having a top surface substantially coplanar with a top surface of the waveguide; and
a second cladding layer disposed to cover at least a portion of a top surface and sidewalls of the core region.

11. A method of manufacturing an optical device, comprising:
forming a trench having a substantially flat bottom in a silicon substrate;
forming a first cladding layer substantially inside the trench, the first cladding layer having a flat top surface extending entirely from one sidewall of the trench to an opposite sidewall of the trench; and
forming a core region on only a portion of the first cladding layer.

12. The method of claim 11, wherein:
the first cladding layer is formed of a dielectric material having a general formula of $Si_XN_YO_Z$;
a top surface of the first cladding layer is one of substantially coplanar with and lower than a top surface of the silicon substrate; and
the silicon substrate comprises bulk single crystal silicon.

13. The method of claim 11, further comprising forming at least one waveguide and at least one optical coupler using the core region.

14. The method of claim 13, further comprising forming a reflective layer disposed in one of below, above and within the first cladding layer, and disposed adjacent to at least a portion of at least one of the waveguide, the optical coupler, and a region coupling the waveguide to the optical coupler.

15. The method of claim 11, further comprising forming a second cladding layer covering at least a portion of a top surface and a side surface of the core region.

16. The method of claim 11, wherein forming the core region further comprises forming a layer of at least one of defective single-crystal silicon, single-crystal silicon, large grain polycrystalline silicon, crystallized polycrystalline silicon and crystallized amorphous silicon.

17. The method of claim 12, further including forming the trench with substantially vertical sidewalls substantially perpendicular to the top surface of the silicon substrate.

18. The method of claim 13, further including forming the optical coupler to have a top surface coplanar with a top surface of the waveguide.

19. The method of claim 11, further including forming at least one of an optical grating, a vertical grating coupler, an optical-to-electrical converter, an electrical-to-optical converter, and an optical transceiver.

20. The method of claim 14, wherein forming the reflective layer comprises forming at least one of a metallic reflective layer, a Bragg reflector, a distributed Bragg reflector, and a structure including at least a first material layer and a second material layer, each of the first and second material layers formed to directly contact a third material layer, the third material layer having a different index of refraction from the first and second material layers.

* * * * *